(12) United States Patent
Wettlaufer et al.

(10) Patent No.: US 12,507,824 B2
(45) Date of Patent: Dec. 30, 2025

(54) JUICING DEVICES AND METHODS

(71) Applicant: Goodnature Products, Inc., Buffalo, NY (US)

(72) Inventors: Eric M. Wettlaufer, Buffalo, NY (US); Dale Wettlaufer, Sarasota, FL (US); Thomas Heyden, Glenwood, NY (US); John Fritz, Buffalo, NY (US)

(73) Assignee: Goodnature Products, Inc., Buffalo, NY (US)

( * ) Notice: Subject to any disclaimer, the term of this patent is extended or adjusted under 35 U.S.C. 154(b) by 378 days.

(21) Appl. No.: 18/153,964

(22) Filed: Jan. 12, 2023

(65) Prior Publication Data

US 2023/0218102 A1    Jul. 13, 2023

Related U.S. Application Data

(60) Provisional application No. 63/299,382, filed on Jan. 13, 2022.

(51) Int. Cl.
*A47J 19/06* (2006.01)
*A47J 19/02* (2006.01)
*B30B 1/18* (2006.01)
*B30B 9/04* (2006.01)
*B30B 9/06* (2006.01)
*B30B 15/00* (2006.01)

(52) U.S. Cl.
CPC ............... *A47J 19/06* (2013.01); *A47J 19/02* (2013.01); *B30B 1/186* (2013.01); *B30B 9/04* (2013.01); *B30B 9/06* (2013.01); *B30B 15/0094* (2013.01)

(58) Field of Classification Search
CPC .......... A47J 19/02; A47J 19/06; B30B 1/186; B30B 9/04; B30B 9/02; B30B 9/047; B30B 9/06; B30B 9/062
See application file for complete search history.

(56) References Cited

U.S. PATENT DOCUMENTS

| | | | |
|---|---|---|---|
| 18,895 | A | 12/1857 | Eiberweiser |
| 194,457 | A | 8/1877 | Newsam |
| 241,348 | A | 5/1881 | Gilbert |
| 250,979 | A | 12/1881 | Russell |
| 260,542 | A | 7/1882 | Dannecker |
| 630,669 | A | 8/1899 | Green |
| D31,714 | S | 10/1899 | Carroll |
| 729,807 | A | 6/1903 | Stoveken et al. |
| 929,717 | A | 8/1909 | Self |

(Continued)

FOREIGN PATENT DOCUMENTS

| | | |
|---|---|---|
| CH | 359346 | 12/1961 |
| CN | 201115592 | 9/2008 |

(Continued)

OTHER PUBLICATIONS

3D Helical Ramp (R) for AutoCAD—AFV Software, Online, published date Mar. 25, 2014. Retrieved on Jan. 11, 2021 from URL: https:youtube.com/watch?v=I_uDyXcTsck (Year: 2014).

(Continued)

*Primary Examiner* — Bobby Yeonjin Kim
(74) *Attorney, Agent, or Firm* — Hodgson Russ LLP

(57) ABSTRACT

Various juicing devices, systems, and methods are disclosed. The juicing device has mechanical squeezers, combination blades, front trays, and/or control systems for effective pressing.

4 Claims, 45 Drawing Sheets

(56) References Cited

U.S. PATENT DOCUMENTS

| | | | |
|---|---|---|---|
| 982,516 A | 1/1911 | Marks | |
| 1,130,701 A | 3/1915 | Berrigan | |
| 1,131,032 A | 3/1915 | Berrigan | |
| 1,456,257 A | 5/1923 | Stevenson | |
| 1,841,413 A | 1/1932 | Macchia | |
| 2,022,679 A | 12/1935 | Leo | |
| 2,068,013 A | 1/1937 | Fridlender et al. | |
| 2,087,435 A | 7/1937 | Hubbert | |
| 2,416,043 A | 2/1947 | Bucher-Guyer | |
| 2,612,100 A | 9/1952 | Bates | |
| 3,032,087 A | 5/1962 | Rodwick | |
| 3,154,122 A | 10/1964 | Batchelor et al. | |
| 3,159,096 A | 12/1964 | Tocker | |
| 3,162,384 A | 12/1964 | Wright | |
| 3,334,790 A | 8/1967 | Eaton | |
| 4,191,103 A | 3/1980 | Wettlaufer | |
| 4,214,519 A | 7/1980 | Stollenwerk | |
| 4,273,035 A * | 6/1981 | Cusi | B30B 9/02 100/37 |
| 4,367,667 A | 1/1983 | Shibata | |
| 4,393,737 A | 7/1983 | Shibata | |
| 4,420,404 A | 12/1983 | Coate et al. | |
| 4,456,185 A | 6/1984 | Ribassin et al. | |
| 4,539,793 A | 9/1985 | Malek | |
| 4,674,690 A | 6/1987 | Ponikwia et al. | |
| 4,680,808 A | 7/1987 | Paleschuck | |
| 4,730,555 A | 3/1988 | Blanchot | |
| 4,778,117 A | 10/1988 | Karg | |
| 4,892,665 A | 1/1990 | Wettlaufer | |
| 4,986,912 A | 1/1991 | Fisch | |
| 5,031,524 A | 7/1991 | Wettlaufer | |
| 5,045,186 A | 9/1991 | Takashima | |
| 5,143,628 A | 9/1992 | Bott et al. | |
| 5,146,848 A | 9/1992 | Dufour | |
| 5,205,498 A | 4/1993 | Ostermeier et al. | |
| 5,207,152 A | 5/1993 | Wettlaufer | |
| 5,267,509 A | 12/1993 | Wettlaufer | |
| 5,275,097 A | 1/1994 | Wettlaufer | |
| 5,340,036 A | 8/1994 | Riley | |
| 5,356,083 A | 10/1994 | Wettlaufer | |
| 5,533,681 A | 7/1996 | Riley | |
| D373,705 S | 9/1996 | Austin | |
| 5,551,606 A | 9/1996 | Rai et al. | |
| 5,613,434 A | 3/1997 | Hartmann | |
| 6,123,018 A | 9/2000 | Wettlaufer et al. | |
| 6,159,527 A | 12/2000 | Wettlaufer | |
| 6,422,138 B1 | 7/2002 | Ballard | |
| 6,457,403 B1 | 10/2002 | Wettlaufer et al. | |
| D482,938 S | 12/2003 | Renault | |
| D554,441 S | 11/2007 | Malcolm et al. | |
| 7,337,996 B2 | 3/2008 | Hanson et al. | |
| 7,448,317 B2 | 11/2008 | Pinnow | |
| 7,607,599 B2 | 10/2009 | Jara-Almonte et al. | |
| 7,753,297 B2 | 7/2010 | Hanson et al. | |
| 7,866,583 B2 | 1/2011 | Jara-Almonte | |
| 8,387,520 B2 | 3/2013 | Backus | |
| 8,578,846 B2 | 11/2013 | Sherwood | |
| D725,439 S | 3/2015 | Kim | |
| 9,027,472 B2 | 5/2015 | Bertocchi | |
| D741,653 S | 10/2015 | Zhang | |
| D743,204 S | 11/2015 | Zhang | |
| D774,848 S | 12/2016 | Flotats Molinas et al. | |
| 9,763,470 B2 | 9/2017 | Feinberg et al. | |
| 9,763,471 B2 | 9/2017 | Wettlaufer et al. | |
| 9,844,229 B2 | 12/2017 | Wettlaufer et al. | |
| 9,888,802 B2 | 2/2018 | Holzbauer et al. | |
| D812,426 S | 3/2018 | Kociolek et al. | |
| 9,919,247 B2 | 3/2018 | Wettlaufer | |
| D830,795 S | 10/2018 | Phillips-Solomon | |
| 10,130,118 B2 | 11/2018 | Contell Albert et al. | |
| D840,770 S | 2/2019 | Wettlaufer et al. | |
| D841,409 S | 2/2019 | Wettlaufer et al. | |
| D841,410 S | 2/2019 | Wettlaufer et al. | |
| 10,645,966 B2 | 5/2020 | Wettlaufer et al. | |
| 10,701,958 B2 | 7/2020 | Wettlaufer et al. | |
| D914,464 S | 3/2021 | Wettlaufer et al. | |
| D914,465 S | 3/2021 | Wettlaufer et al. | |
| 10,939,696 B2 | 3/2021 | Wettlaufer et al. | |
| D915,156 S | 4/2021 | Wettlaufer et al. | |
| D916,565 S | 4/2021 | Wettlaufer et al. | |
| D918,656 S | 5/2021 | Wettlaufer et al. | |
| 11,344,052 B2 | 5/2022 | Wettlaufer et al. | |
| 2001/0031302 A1 | 10/2001 | Balkos et al. | |
| 2008/0098908 A1 | 5/2008 | Song | |
| 2008/0116305 A1 | 5/2008 | Hanson et al. | |
| 2011/0185921 A1 | 8/2011 | Lee | |
| 2012/0037013 A1 | 2/2012 | Bertocchi | |
| 2012/0048127 A1 | 3/2012 | Huang et al. | |
| 2012/0090478 A1 | 4/2012 | Lin | |
| 2013/0074708 A1 | 3/2013 | Asbury et al. | |
| 2014/0224137 A1 | 8/2014 | Wettlaufer et al. | |
| 2014/0306042 A1 | 10/2014 | Chesack et al. | |
| 2014/0314918 A1 | 10/2014 | Wettlaufer et al. | |
| 2015/0257435 A1 | 9/2015 | Feinberg et al. | |
| 2015/0359256 A1* | 12/2015 | Wettlaufer | B30B 9/045 206/557 |
| 2015/0374025 A1* | 12/2015 | Evans | A23N 1/02 99/495 |
| 2016/0199760 A1 | 7/2016 | Wettlaufer | |
| 2017/0295982 A1 | 10/2017 | Holzbauer et al. | |
| 2018/0084818 A1* | 3/2018 | Wettlaufer | B30B 9/045 |
| 2018/0103676 A1 | 4/2018 | Wettlaufer et al. | |
| 2018/0242769 A1 | 8/2018 | Chen et al. | |
| 2018/0297310 A1 | 10/2018 | Evans et al. | |
| 2018/0297313 A1 | 10/2018 | Katz et al. | |
| 2019/0159507 A1* | 5/2019 | Wettlaufer | A47J 19/06 |
| 2019/0193359 A1* | 6/2019 | Wettlaufer | A47J 19/00 |
| 2020/0367696 A1* | 11/2020 | Wettlaufer | A47J 43/0711 |
| 2020/0404958 A1 | 12/2020 | Wettlaufer et al. | |
| 2021/0267254 A1 | 9/2021 | Wettlaufer et al. | |
| 2022/0346430 A1 | 11/2022 | Wettlaufer et al. | |

FOREIGN PATENT DOCUMENTS

| | | |
|---|---|---|
| CN | 201245539 | 5/2009 |
| CN | 201604303 | 10/2010 |
| CN | 202515365 | 11/2012 |
| CN | 205727969 | 11/2016 |
| EP | 0644794 | 3/1995 |
| EP | 1364558 | 3/2005 |
| EP | 1632338 | 3/2006 |
| FR | 2806880 | 10/2001 |
| JP | 2006-094902 | 4/2006 |
| JP | 2015039493 | 3/2015 |
| KR | 20030004642 | 1/2003 |
| WO | WO 2015/191738 | 12/2015 |
| WO | WO 2019/108979 | 6/2019 |
| WO | WO 2019/112901 | 6/2019 |
| WO | WO 2019/126717 | 6/2019 |
| WO | WO 2020/242897 | 12/2020 |

OTHER PUBLICATIONS

Create curved ramp. Online, published date May 19, 2017. Retrieved on Jan. 11, 2021 from URL: https://forums.autodesk.com/t5/fusion-360-design-validate/create-curved-ramp/td-p/7088070 (Year: 2017).

Gauze, retrieved date Oct. 10, 2021. https://www.combatsports.com/ringside-super-gauze-single-roll.html?mkwid =_ dc&pcrid= 452569739406&pkw=&pmt=&gclid=EAlaIQobChMI57Klr_XA8wIVAr_ICh36pgJ6EAQYByABEgJxLfD_BwE.

Norwalk. 2014. Model 280 Features. Retrieved on Oct. 9, 2015 from http://wwww.norwalkjuicers.com/features/.

Norwalk. 2014. Model 280 Technical Specifications. Retrieved on Oct. 9, 2015 from http://wwww.norwalkjuicers.com/technical-specs/.

Pusher, Online, published date unknown, Retrieved on Jan. 11, 2021 from URL: https://www.goodnatureproducts.com/m1-pusher/ (Year 2021).

* cited by examiner

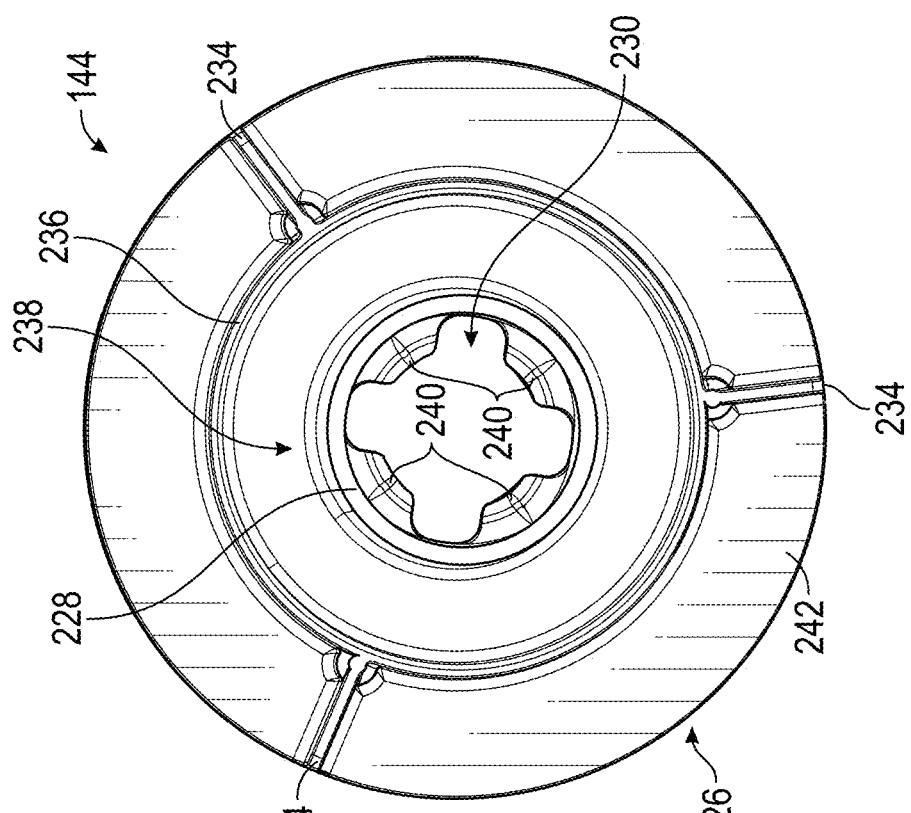
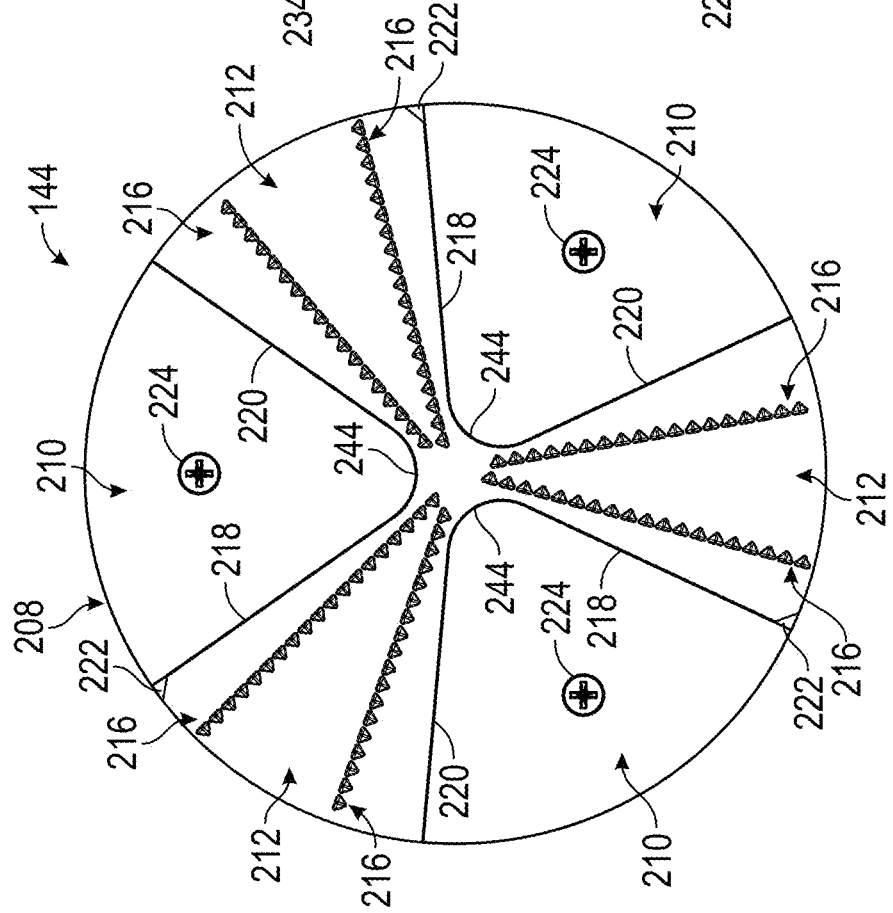
FIG. 7D
FIG. 7C

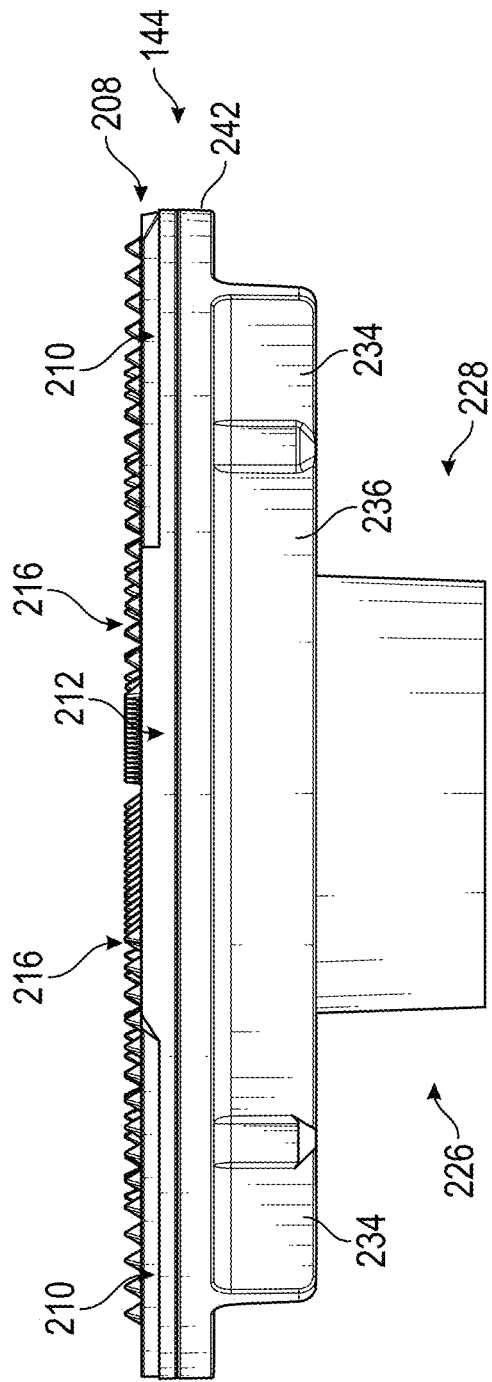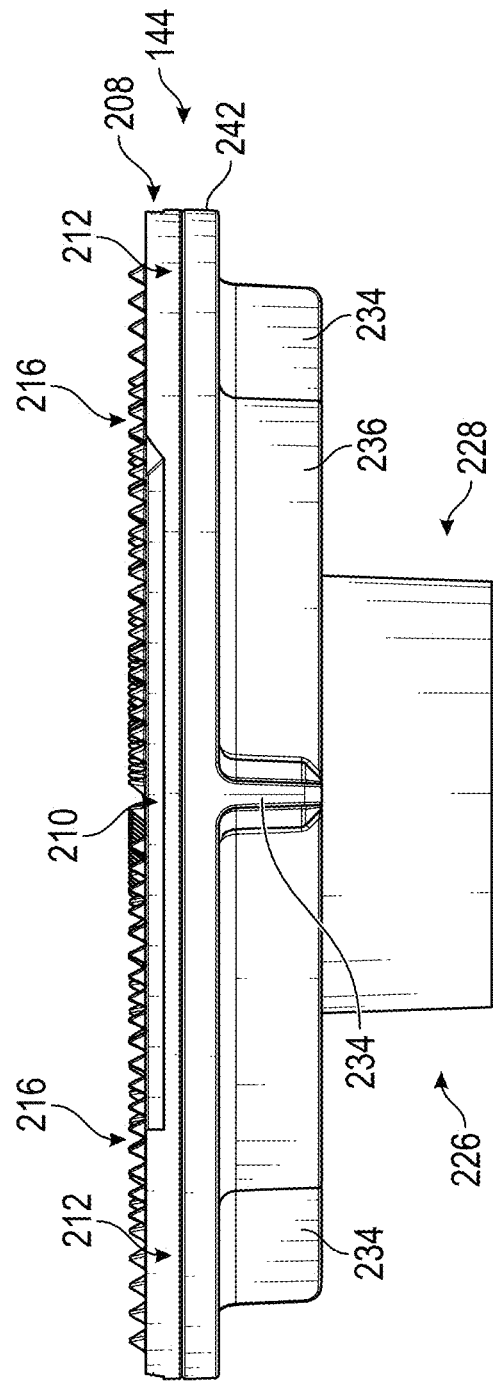

JUICING DEVICES AND METHODS

CROSS REFERENCE

This application claims the priority benefit of U.S. Provisional Application No. 63/299,382, filed Jan. 13, 2022, which is hereby incorporated by reference in its entirety. All applications for which a foreign or domestic priority is identified in the Application Data Sheet as filed with the present application are hereby incorporated by reference under 37 CFR 1.57. Additionally, the juicing devices and methods disclosed herein can include any of the features disclosed in U.S. Patent Application Publication No. 2020/0367696, which is also incorporated by reference in its entirety.

FIELD

This disclosure relates to juicing devices, such as cold press juicing devices with mechanical squeezers, combination blades, front trays, and/or control systems for effective pressing.

SUMMARY OF CERTAIN FEATURES

Juice is a natural way to provide not only a delicious beverage but also valuable nutrition to the human body. For example, juice can provide essential minerals, vitamins, and other beneficial compounds. Because different foods produce different kinds of juice, each with a unique flavor and nutritional profile, there is a demand for juice produced from an increasingly wide assortment of foods, such as fruits, spongy greens, hard root vegetables, and others. Indeed, consumers are increasingly demanding a diverse assortment of high-quality juices.

Some juicing devices have detrimental effects on juice quality or other drawbacks. For example, some juicing devices produce juice using centrifugal force by spinning pulp against a screen. However, centrifugally spinning the pulp against a screen, and other methods that shred and press at the same time, result in heating of the juice, aerating the juice, and/or introducing significant particulates in the juice. This decreases the quality of the juice and/or misses an opportunity for self-filtration. Other juicing devices are time-consuming, complicated to assemble, and/or difficult to clean.

Furthermore, some juicing devices that rely on a screen, cloth, and/or similar device can retain food particulate or juice, which leaves residual color and flavor in the juicing device. Some juicing devices can have holes, slots, crevices, corners, and/or anchor points onto which food fibers, particulates, and/or juices are retained, which can result in the same residual color and flavor issues or even health concerns. This residual flavor and/or color can be problematic as the juicing device is required to produce a variety of different juices that are expected to have a specific flavor and/or color. Accordingly, the juicing device must be cleaned to remove the residual color and/or flavor. Removing the residual color and/or flavor can take significant time as significant scrubbing, washing, and/or caustic may be needed, which can be costly and inconvenient at a busy juice bar or other setting.

Many juicing devices are not well suited for use with a variety of foods, which each bring unique demands and challenges. For example, hard root vegetables, like carrots and beets, are used in juicing and put a very high load on the juicing device, causing juicing devices to overheat, jam, and/or grind so inefficiently that little juice is extracted. Certain heterogeneous fibrous foods, like ginger or celery, contain long fibers that tend to snag on holes, slots, crevices, corners, and/or anchor points. Some juicing devices utilize a cheese grater style blade that fiber hooks onto and lays over the cutting edges of the blade holes. This can blunt the blades and inhibit the movement of food through the blade holes. Fleshy and fragile produce, such as cucumber, watermelon, and apples, can deteriorate, separate out in juice, froth, and/or introduce foam if over processed. Spongy leafy greens, like kale, can be squished down into a tough but flexible mass that will skim over teeth or blades such that the kale will continue to build up inside a juicer until the juicing device jams. Leafy greens can also have a low specific density compared to other foods. Unlike foods with higher specific densities (e.g., apples), a juicing device may be unable to use the inertia of the leafy greens to move the leafy greens around the grinder, which can inhibit proper processing of the leafy greens.

Various juicing devices are disclosed herein that address one or more of the problems detailed above, or other problems.

Certain implementations of the juicing devices disclosed herein can produce single serving juices (e.g., less than or equal to about 16 fluid ounces), larger quantities (e.g., 12-32 fluid ounces), and/or other quantities cleanly, easily, and at a high quality. The juicing devices disclosed herein can employ a cold pressing method. The resulting juice can be smooth, nutritionally dense, and close in color and flavor to the food from which the juice was extracted. The food can be cleaned, such as before being loaded into the juicing device. The food can be shredded and pressed in separate mechanisms, resulting in a high-quality juice. Food can include any consumable or food that has a consumable juice.

The juicing devices disclosed herein can employ a disposable filter, such as a screen, cloth, or similar device. The filter can be separate from (e.g., readily removable from and/or not permanently attached to) the juicing device and/or can be readily replaceable. The disposable filter can reduce or eliminate issues with residual color and/or flavor from previous pressings. The disposable filter can be single use, eliminating the need to wash and sanitize bags altogether.

Certain implementations of the juicing devices disclosed herein can enable "self-filtration" of the juice. In self-filtration, fibers of the food from which juice is being extracted form a network of fibers that act as a filter for juice passing though the network. This can provide an initial and/or additional filter compared to any filters of the juicing device itself. The juicing device of the present disclosure can be configured to promote the formation of such a network and/or to maintain the network (e.g., by substantially not disturbing the network) during processing. This can enable the network to filter juice being extracted from the food material during the pressing operation. This is in contrast to other methods, such as centrifugal spinning with a screen, which can inhibit the network from forming and/or disturb the network and thus fail to benefit from self-filtration.

The juicing devices disclosed herein can be free or substantially free of features upon which food fibers, particulates, and/or juice can be retained or stuck. For example, in some embodiments, during operation of the juicing device to process a commercially reasonable amount of ginger for at least a single serving of juice or larger quantity, substantially no ginger fibers stick to or wrap around a cutting mechanism and/or other feature of the device.

In several implementations, even when cleaning is necessary, all components of the juicing devices that contact food and/or juice are easily removable. This can facilitate transporting the components to a cleaning area, such as a sink. In certain variants, the grinder assembly, while still assembled as a sub-assembly, can be removed from the juicing device as one unit and/or transported (e.g., to a cleaning area for cleaning) separately from the rest of the juicing device. This can reduce or eliminate the need to disassemble the entire grinder assembly to its components.

In some variants, the grinder assembly can quickly and efficiently be decoupled, which can enable washing of individual pieces separately. In some embodiments, the juicing devices disclosed herein shred and press in a closed process, which can reduce the mess that is frequently created when using other juicing devices.

In some embodiments, the juicing devices disclosed herein can effectively process a wide variety of foods (such as the foods detailed above). For example, some embodiments have a grinder assembly that is configured with teeth, and/or a motor with enough speed and power, to enable the processing of large chunks of root vegetables.

In some embodiments, the juicing devices are free from holes, slots, crevices, corners, and/or anchor points in the pathway of the processed food. The juicing devices can provide a path out of the juicing device.

In some embodiments, the juicing devices are configured to grind the food material slowly enough, and/or have large enough components and/or be configured to be gentle enough, to preserve fragile produce.

In some embodiments, the juicing devices have no shoulders under which fibers and particulate can build up (e.g., in the pathway of the food in the device).

In some embodiments, the juicing devices are configured to mechanically clear an infeed or outfeed section and/or to not rely on gravity or centrifugal force to clear the infeed or outfeed.

The juicing device can include a grinder assembly, a press chamber, and/or a drip tray. The grinder assembly can be configured to receive and grind food. The grinder assembly can have a hopper to receive food for processing. The hopper can receive food through an opening that leads to an inner cavity. A cover can obstruct the opening, thereby inhibiting or preventing access to the inner cavity and/or inhibiting or preventing food from escaping through the opening. The cover can pivot up or down about a cover joint. A pusher can be used to push food down through the chute or hopper.

The hopper can be releasably coupled to the grinder housing such that a user can remove the hopper, cover, and/or a pusher quickly and conveniently. The hopper can be releasably coupled to the grinder housing with a twist-lock connection. This can be advantageous for cleaning as the user can remove the hopper to carry over to a cleaning area, such as a sink. In some embodiments, the motor unit, which can include a motor and a housing, will not drive the grinder plate unless the hopper is releasably coupled to the grinder housing, which can be detected by a magnetic switch. The grinder housing can be releasably coupled to motor unit such that a user can remove the grinder housing from the motor unit quickly and conveniently, which can be advantageous for cleaning. The grinder housing can be releasably coupled to the motor unit with a twist-lock connection. In some embodiments, the motor unit will not drive the grinder plate unless the grinder housing is releasably coupled to the motor unit, which can be detected by a magnetic or electric switch.

The pusher can push food down through the chute or hopper and into a grind plate. The grind plate can be housed within a grinder housing and rotated by a motor unit. The grind plate can include a lopper, raised and lowered platforms, teeth, and/or other features that are configured to cut food and/or an agitator to distribute food away from a center of the grind plate. The rotation of the grind plate can cause food to be thrown radially, relative to the axis of rotation of the grinder plate. The food can be thrown toward a grinding area. The grinding area can include a plurality of fixed teeth (such as a ring of fixed teeth formed into an inner surface of the chute or hopper or cut into a wall of the chute or hopper) and a plurality of spinning teeth (such as on a lower portion of the grinder plate) for grinding. The ground food can fall into the grinder housing. In some embodiments, the grinder does not have a lopper and/or lower teeth on the blade. Certain variants of the grinder do not have a grind ring in the hopper. In some implementations, substantially all or all of the cutting is done by small barbs and/or low loppers created by recesses. Some implementations have no fixed teeth for grinding the food. Some implementations include one, two, three, four, or more fixed teeth for grinding the food.

The grinder assembly can be configured to deliver ground food to the press chamber (e.g., directly). The grinder housing can have a food exit ramp through which ground food can exit the grinder housing and enter the press chamber via an opening. In various embodiments, the grinder assembly can be rotated to different positions about the grinder assembly joint or hinge. For example, the grinder assembly can be rotated upward to a first position relative to the press chamber (e.g., to a position in which the exit ramp is spaced apart from the press chamber). As another example, the grinder assembly can be rotated downward to a second position relative to the press chamber (e.g., to a position in which the exit ramp is aligned and/or in engagement with the press chamber). The grinder assembly can be rotated by hand and/or with a motor.

The press chamber can be configured to press the ground food to extract juice. The press chamber can be supported by one or more (e.g., a pair of) front arms of a frame such that the press chamber is positioned over the drip tray. The opening can be covered by hopper support flanges and/or grinder housing support flange when the grinder assembly is rotated to the second position. In some implementations, the motor unit will not operate if the grinder assembly is not in the second position (e.g., the hopper support flanges and/or grinder housing support flange are not closing the opening), which can be detected by a magnetic or electric switch.

The ground food can pass through the opening into a press box. A disposable filter, such as a single-use bag, can be placed through the opening and into the press box. Food exiting the grinder housing can be directed into the disposable filter. The disposable filter can inhibit or prevent particulate from being included in the finished juice for drinking.

A moveable platen can be positioned in the press box and used to press the ground food to extract juices. The moveable platen can move toward a front wall of the press box, a front comb, and/or a fixed platen. The front comb can be positioned between the movable platen and the fixed platen. In some embodiments, the fixed platen can be coupled to the pair of front arms. The arms and/or fixed platen can be configured to inhibit or prevent movement of the press box as the moveable platen moves toward the front wall of the press box, front comb, and/or fixed platen.

Fluid extracted by compression within the press chamber can flow down to the drip tray. The extracted fluid can be collected by a vessel placed on the drip tray. The drip tray can collect spilled fluid or food to enable a user to conveniently and quickly clean after use. The drip tray can be removably secured between one or more (e.g., a pair of) fixed front legs of the frame such that the drip tray can be removed and carried to a cleaning area without requiring movement of the entire juicing device.

As mentioned above, the frame can support the various features and components of the juicing device, such as the press chamber. The frame can include front legs, back legs, front arms, and back arms that extend away from a central support. The frame can support a housing that can house electronics, motors, and/or other components used to operate the juicing device.

The juicing device can include a user interface that can enable a user to control the juicing device. The user interface can include a plurality of input devices, such as buttons, switches, electronic screens, or otherwise. The user interface can include a shred button, a press button, and a stop button. The shred button can cause the motor unit to drive, which can in turn cause a grinder plate to rotate. In some implementations, the shred button can cause the motor unit to drive at a single speed, such as a single speed that is configured to process a variety of foods. The press button can cause the press chamber to press the food to extract juice. For example, a shaft (e.g., a rod), can extend to push or move the movable platen toward the front wall of the press box, front comb, and/or fixed platen to press ground food. The stop button can stop operation of the device, such as by stopping the juicing device from driving the motor unit and/or stopping the shaft from moving movable platen. In various embodiments, in response to a user pushing the shred button, the juicing device will operate automatically to grind the food, move the ground food from the grinder to the press box, press the ground food in the press box, and collect the extracted juice.

In various embodiments, all the components of the juicing device that contact food or juice can be quickly and easily disassembled, cleaned, and reassembled between juicing operations with negligible carryover of flavor and color between juicing. For example, in some embodiments, the disassembling, cleaning, and reassembling can be accomplished in less than about 2 minutes, about 1 minute, about 30 seconds, or otherwise. The various components of the juicing device can be manufactured using a variety of techniques. For example, certain components can be made by injection molding, additive manufacturing (e.g., 3D printing), machining, and/or other manufacturing processes. The various components described herein can be made from a variety of materials, which can at least include polymers, such as plastic (e.g., polypropylene, high density polyethylene, etc.), metal (e.g., stainless steel, aluminum, etc.), and/or metal alloys.

In some embodiments, a juicer machine is disclosed herein. The juicer machine may include a grinder assembly that can grind food. The grinder assembly can include a hopper, a motor, and/or a blade unit. The blade unit can be rotatable by the motor about an axis of rotation. The blade unit can include a front and a rear. The front of the blade unit can include a first platform. The first platform can be generally perpendicular to the axis of rotation. The front of the blade unit can include a second platform. The second platform can be generally parallel to the first platform. The second platform can be non-planar with the first platform. The front of the blade unit can include an edge extending between the first platform and the second platform. The front of the blade unit can include a plurality of teeth extending from the first platform. The juicer machine can include a press assembly that can receive the ground food from the grinder assembly and press juice from the ground food.

In some embodiments, at the blade unit can be liquid impermeable.

In some embodiments, the front of the blade unit may include a plurality of the first platform and a plurality of the second platform. Each of the first platforms can be bordered by at least two of the second platforms.

In some embodiments, the edge may be generally parallel to the axis of rotation.

In some embodiments, the second platform can be recessed, in a direction along the axis of rotation, relative to the first platform.

In some embodiments, each of the first and second platforms may be shaped as approximately a sector of a circle.

In some embodiments, the front of the blade unit can be metal and the rear of the blade unit can be plastic.

In some embodiments, at least a portion of the edge and the teeth can be visible from the perspective of a user looking down an inlet chute of the hopper.

In some embodiments, a center of gravity of the blade unit may be positioned on the axis of rotation.

In some embodiments, a blade unit for cutting multiple types of produce is disclosed herein. The blade unit can include a front. The front can include a first cutter that can be adapted to cut a first type of produce. The front can include a second cutter that can be adapted to cut a second type of produce. The blade unit can include a rear. The rear can include a central connection port. The blade unit can be liquid impermeable. The blade unit can be adapted to rotate about a central axial axis.

In some embodiments, the first cutter can include a raised platform and a plurality of teeth. The second cutter can include a recessed platform and an edge.

In some embodiments, the first cutter can include a first row of teeth and a second row of teeth. The first and second rows of teeth can be disposed at an acute angle relative to each other.

In some embodiments, the second cutter can include a recessed sector of a circle and an edge.

In some embodiments, the blade unit can include a circular outer periphery.

In some embodiments, a center of gravity of the blade unit can be positioned on the central axial axis.

In some embodiments, the blade unit can include fasteners that couple the front and the rear.

In some embodiments, the blade unit can include a gasket between the front and the rear.

In some embodiments, the front of the blade unit can be metal. The rear of the blade unit can be plastic.

In some embodiments, a juicer machine can include the blade unit.

In some embodiments, a juicer machine is disclosed herein. The juicer machine can include a grinder assembly that can grind food. The grinder assembly can include an input chute. The juicer machine can include a press assembly that can press juice from the ground food. The press assembly can include a fixed platen and a movable platen. The movable platen can be positioned rearward of the fixed platen. The juicer machine can include a basin that can removably connect to the fixed platen such that the basin is positioned forward of the fixed platen and under the input chute.

In some embodiments, the basin can hang from the fixed platen.

In some embodiments, the basin can include a lip that connects to a top edge of the fixed platen.

In some embodiments, the basin can be removable from the fixed platen by lifting the basin off the fixed platen.

In some embodiments, when the basin is connected to the fixed platen, a vertical line drawn from an end of the input chute intersects the basin.

In some embodiments, a juicer machine is disclosed herein. The juicer machine can include a frame that can have a well with a top opening. The juicer machine can include a press chamber that can receive a ground food. The press chamber can be removable from the well through the top opening. The press chamber can include a movable platen and a fixed wall. The juicer machine can include a linear actuator connected to the frame. The linear actuator can include an electric motor. The linear actuator can include a press shaft assembly that can have an internally threaded tube. The press shaft assembly can have an end that is engageable with the movable platen. The linear actuator can include a lead screw that can have a rotatable externally threaded rod. A rotation of the lead screw can cause the press shaft assembly to translate the movable platen along a horizontal axis toward the fixed wall, thereby compressing the ground food in the press chamber and expelling juice.

In some embodiments, the electric motor comprises a stepper motor.

In some embodiments, the linear actuator can include a plurality of gears mechanically connected with the electric motor and the lead screw.

In some embodiments, the electric motor may be positioned under the lead screw.

In some embodiments, the juicer machine may include a grinder assembly that can receive a food and convert the food to the ground food. The grinder assembly can include a blade disk with multiple teeth that can concurrently contact the food.

In some embodiments, the juicer machine may include an electronic sensor that can output a signal indicative of a force applied by the linear actuator to the movable platen. The juicer machine can include an electronic processor that can control the linear actuator using the signal.

In some embodiments, the electronic sensor can include a strain gauge.

In some embodiments, an end of the lead screw can be connected to a support plate of the frame. The support plate can include the electronic sensor.

In some embodiments, a juicer machine is disclosed herein. The juicer machine may include a frame having a support. The juicer machine may include a press chamber that can be removably coupled to the frame. The press chamber can receive a ground food. The press chamber can include a movable platen and a fixed wall. The juicer machine may include a lead screw assembly that can be fixedly connected with the support and engageable with the movable platen. The juicer machine may include an electric motor that can drive the lead screw assembly such that the lead screw assembly applies a pressing force to the movable platen and such that a resulting force is transmitted through the lead screw assembly to the support. The juicer machine may include an electronic sensor connected to the support. The electronic sensor can detect a deflection of the support due to the resulting force and to output a signal indicative of the deflection. The juicer machine may include an electronic processor that can control the lead screw assembly using the signal.

In some embodiments, the support can include a plate.

In some embodiments, the electronic sensor can include a strain gauge.

In some embodiments, the lead screw assembly can be fixedly connected with the support by a castle nut.

In some embodiments, a method of operating a juicer machine that can include a movable platen, a fixed platen, a linear actuator, an electronic sensor, and/or an electronic processor is disclosed herein. The method can be under the control of the electronic processor. The method can include advancing, with the linear actuator, the movable platen toward the fixed platen at a first speed. The method can include detecting, with the electronic sensor, a threshold amount of force applied by the linear actuator to the movable platen. The method can include, in response to the detection of the threshold amount of force, advancing, with the linear actuator, the movable platen toward the fixed platen at a second speed, the second speed being less than the first speed.

In some embodiments, a method of detecting breakage of a bag during operation of a juicer machine that includes a movable platen, a fixed platen, an actuator, a force sensor, and/or an electronic processor is disclosed herein. The method can be under the control of the electronic processor. The method can include advancing, with the actuator, the movable platen toward the fixed platen such that a food between the movable platen and the fixed platen is compressed. The method can include monitoring, with the force sensor, a force applied by the actuator to the movable platen during the compression of the food. The method can include detecting a decrease discontinuity in the force. The method can include activating a bag-break response action.

In some embodiments, the bag-break response action may include stopping the advancing of the movable platen.

In some embodiments, the bag-break response action can include outputting an audible or visual alarm.

Neither the preceding summary nor the following detailed description purports to limit or define the scope of protection. The scope of protection is defined by the claims.

BRIEF DESCRIPTION OF THE DRAWINGS

The abovementioned and other features of the embodiments disclosed herein are described below with reference to the drawings of the embodiments. The illustrated embodiments are intended to illustrate, but not to limit, the scope of protection. Various features of the different disclosed embodiments can be combined to form further embodiments, which are part of this disclosure.

FIGS. 7A-7H illustrate various views of a blade unit. FIG. 7A illustrates a top perspective view. FIG. 7B illustrates a bottom perspective view. FIG. 7C illustrates a top plan view. FIG. 7D illustrates a rear plan view. FIG. 7E illustrates a front elevation view. FIG. 7F illustrates a back elevation view. FIG. 7G illustrates a right elevation view. FIG. 7H illustrates a left elevation view.

DETAILED DESCRIPTION OF CERTAIN EMBODIMENTS

Although certain embodiments and examples are described below, this disclosure extends beyond the specifically disclosed embodiments and/or uses and obvious modifications and equivalents thereof. Thus, it is intended that the scope of this disclosure should not be limited by any particular embodiments described below.

A. Juicing Device Overview—FIGS. 1A-1C

Figure 1A:
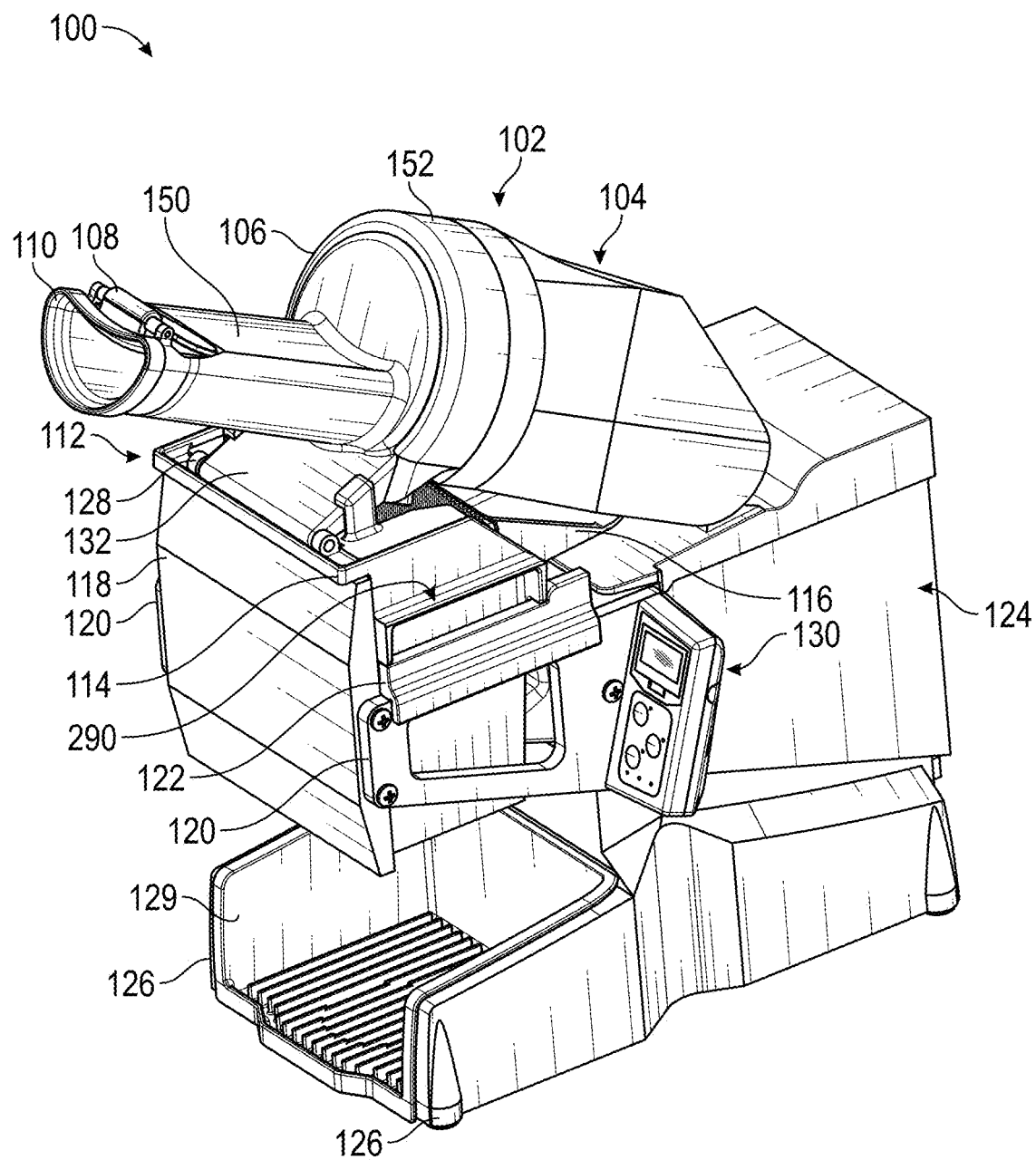
FIGS. 1A-1B illustrate various views of a juicing device.
Figure 1B:
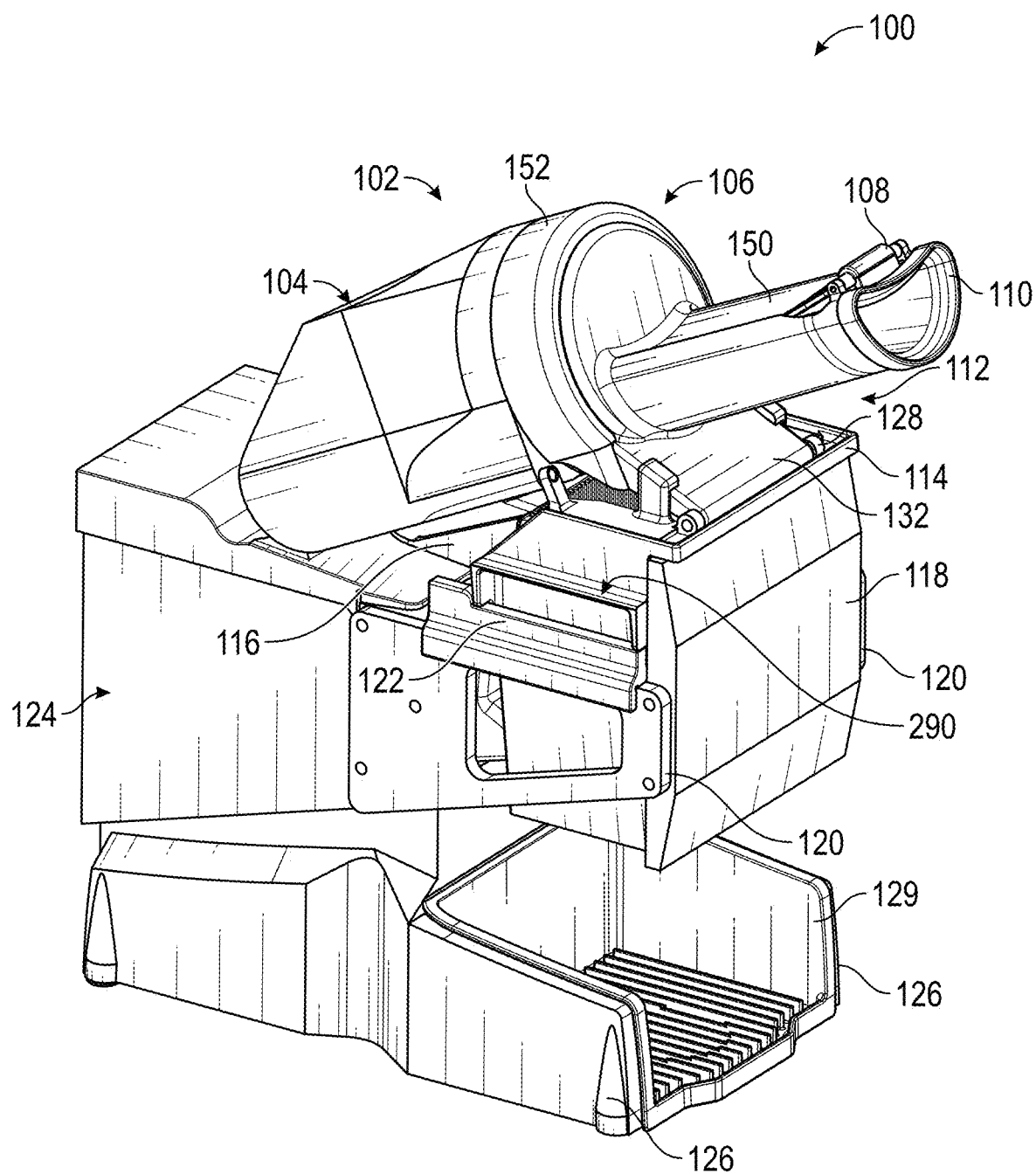
Figure 1C:
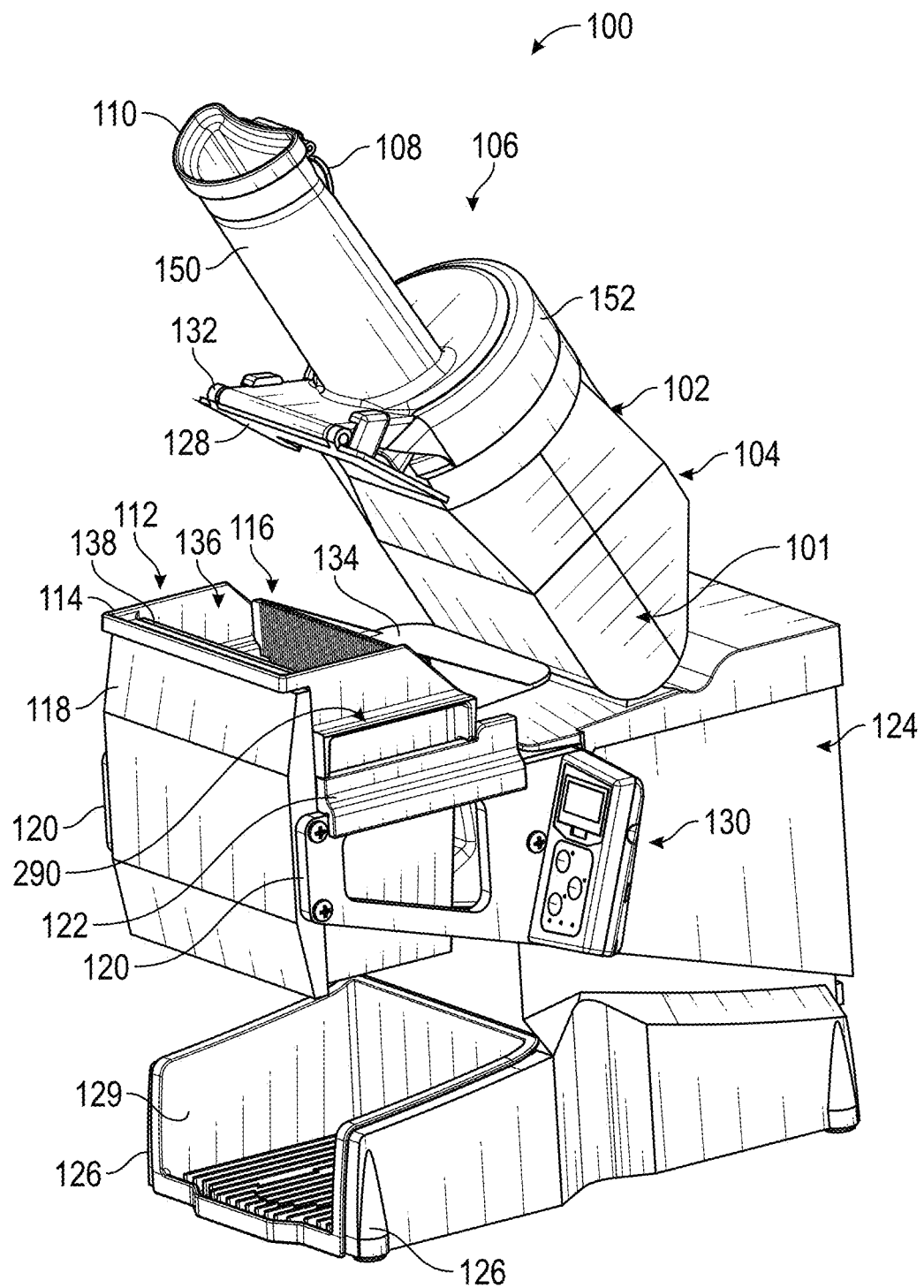
FIG. 1C illustrates the juicing device with a grinder assembly rotated up.

Various embodiments and configurations of a juicing device 100 are disclosed herein. FIGS. 1A-1C illustrate an example of the juicing device 100, which can also be referred to as a juicer device, juicer machine, and juicing machine. The juicing device 100 can process food to extract juices. Food can include any consumable or food that has a consumable juice. The juicing device 100 can include a grinder assembly 102, a press chamber assembly 112, and/or a drip tray 129.

The grinder assembly 102 can be configured to receive and grind food. The grinder assembly 102 can have a hopper 106 to receive food for processing. The hopper 106 can receive food through an input chute 150 to direct food to a blade unit to grind the food material. A pusher 110 can be inserted into the input chute 150 to push food through the input chute 150 toward the blade unit. The hopper 106 can include a splash guard 108. The splash guard 108 can be biased to move to a position to block an opening into the input chute 150 when the pusher 110 is removed, which can inhibit or prevent food material from exiting the opening of the input chute 150 and splashing a user.

The hopper 106 can be releasably coupled to a motor unit 104 such that the user can quickly and conveniently remove the hopper 106. The hopper 106 can be releasably coupled to the motor unit 104 with a quick-disconnect mechanism, such as a twist-lock connection or other mechanism that does not require the use of a separate tool (e.g., a screwdriver) to operate. This can be advantageous for cleaning as the user can remove the hopper 106 to carry over to a cleaning area, such as a sink. In some embodiments, the motor unit 104 will not drive the blade unit to grind the food unless the hopper 106 is coupled to the motor unit 104, which can be detected with a sensor such as a magnetic switch, light gate, and/or others.

The food that enters the input chute 150 of the hopper 106 can flow toward a blade unit. For example, as illustrated, the input chute 150 can be angled downward so that food is drawn toward the blade unit by gravity. The blade unit can be disposed inside a base 152 of the hopper 106 and rotated by the motor unit 104. The rotation of the blade unit can grind the food material. The blade unit can be liquid impermeable (e.g., does not include through holes that extend between front and rear sides of the blade unit and/or does not allow liquid to pass through the blade unit between the front and rear sides of the blade unit). In various embodiments, the ground food material, due to the rotation of the blade unit, can be thrown radially outward (e.g., relative to an axis of rotation of the blade unit) and/or does not pass through the blade unit. The thrown ground food material can be directed into a blade housing. In some implementations, the ground food material moves from the front side to rear side of the blade unit by passing around a circumferential edge of the blade unit. The blade unit can include one or more flanges that sweep the ground food material toward and/or out of an exit ramp of the blade housing and into a press chamber assembly 112.

The grinder assembly 102 can be placed in (e.g., rotated to) different positions. For example, in FIGS. 1A and 1B, the grinder assembly 102 is shown rotated downward in a first position relative to the press chamber assembly 112 (e.g., to a position in which the exit ramp of the blade housing is aligned and/or in engagement with an entrance or other features of the press chamber assembly 112). In the first position, a support stand 132 of the hopper 106 can at least partially rest on a press chamber 114 of the press chamber assembly 112.

In FIG. 1C, the grinder assembly 102 is shown rotated upward in a second position relative to the press chamber assembly 112 (e.g., to a position in which the exit ramp of the blade housing is spaced apart from the entrance or other features of the press chamber assembly 112). The grinder assembly 102 can rotate about a pivot 101, which can include rotating relative to the housing 124 of the juicing device 100. With the grinder assembly 102 in the second position, the user can more easily access the components of the press chamber assembly 112, such as to lift the press chamber 114 out of the remainder of the juicer machine 100. In some embodiments, the motor unit 104 will not drive the blade unit unless the grinder assembly 102 is rotated downward to the first position. The grinder assembly 102 can be rotated to different positions by hand and/or with a motor.

The press chamber assembly 112 can receive the ground food material from the blade unit. The press chamber assembly 112 can press the ground food material to extract juice. The press chamber assembly 112 can be supported by a frame of the juicing device 100. For example, the press chamber assembly 112 can be supported by frame arms 120 and a fixed platen 118 coupled to the frame arms 120 such that the press chamber assembly 112 is positioned over the drip tray 129. The fixed platen 118 can be coupled with and extend between the frame arms 120. The juicing device 100 can include a housing 124 to house internal components of the juicing device 100. A space (e.g., well) between the housing 124, frame arms 120, and fixed platen 118 can receive the press chamber assembly 112. In some embodiments, risers 122 (e.g., spacers and/or brackets) can be disposed on the frame arms 120 such that the press chamber assembly 112 is supported at a higher position.

The press chamber assembly 112 can include a press chamber 114, which can also be referred to as a press box. The press chamber 114 can include handles 290 that sit on the frame arms 120, which can include the risers 122, to suspend the press chamber 114 in the well of the juicing device 100, under the exit ramp of the blade housing, and/or over the drip tray 129. The handles 290 of the press chamber 114 can support the press chamber assembly 112 on the frame arms 120 between the housing 124 and the fixed platen 118.

The press chamber assembly 112 can include a moveable platen 116 that is disposed in the press chamber 114. When performing a press cycle to extract juice from ground food material, the juicing device 100 can extend a press shaft to advance the moveable platen 116. A linear actuator can be used to move the press shaft. In various embodiments, the linear actuator comprises a lead screw, which can include a threaded rod threadably mated with a threaded tube. One of the threaded rod and tube can be rotationally fixed in the juicer machine 100, and the other of the threaded rod and tube can translate within the juicer machine 100, which can be used to move the movable platen. The ground food material can be pressed (e.g., squeezed) between the moveable platen 116 and a front wall of the press chamber 114. The fixed platen 118 can inhibit the press chamber 114 from moving despite forces being applied to the press chamber 114 by the moveable platen 116.

The press chamber assembly 112 can include a flow directing device, such as a comb insert 138. The comb insert 138 can include grooves and/or channels to direct juice toward an outlet of the press chamber assembly 112. The comb insert 138 can include a front portion disposed adjacent the front wall of the press chamber 114. During pressing, the moveable platen 116 can advance toward the front wall of the press chamber 114 and the front portion of the comb insert 138.

As shown in FIG. 1C, the press chamber assembly 112 can include an interior 136, such as inside the press chamber 114. The interior 136 can receive the ground food material form the grinder assembly 102. The interior 136 can be disposed between walls of the press chamber 114 and the moveable platen 116. Ground food material can be directed from the grinder assembly 102 and into the interior 136 to be pressed between the moveable platen 116 and the walls of the press chamber 114 to extract juice. For example, the moveable platen 116 can advance toward a front wall of the press chamber 114, comb insert 138, and/or fixed platen 118 to press ground food material. In some embodiments, a disposable filter, such as a disposable filter bag (e.g., a filter paper bag), can be disposed in the interior 136. The disposable filter can inhibit or prevent particulate from being included in the finished juice for drinking, can facilitate clean-up, etc.

Extracted juice can flow down and out of the press chamber 114 toward the drip tray 129. A vessel, such as a container, can be positioned on the drip tray 129 to collect the extracted juice flowing out of the press chamber 114. The drip tray 129 can collect spilled fluid or food to enable a user to conveniently and quickly clean after use. The drip tray 129 can be removably secured between one or more (e.g., a pair of) frame legs 126 such that the drip tray 129 can be removed and carried to a cleaning area without requiring movement of the entire juicing device 100.

As discussed in more detail below, the press shaft can advance the moveable platen 116 at different speeds, such as based on the position of the press shaft and/or forces on the press shaft. For example, the press shaft can advance more quickly at the beginning of a press cycle (e.g., when the press shaft is near the beginning of its extension) and then advance more slowly toward the end of a press cycle (e.g., when the press shaft is approaching full extension). This can advantageously reduce press time and/or take advantage of the phenomenon that many foods are initially relatively easy to press and become more difficult to press as the food becomes more compressed. In some implementations, the press shaft can advance more quickly when forces on the press shaft are relatively lower at the beginning of a press cycle and then advance more slowly when the forces on the press shaft are relatively higher at the end of a press cycle.

In some embodiments, the juicing device 100 can incorporate a multi-stage press cycle. For example, the press cycle can include at least four stages based on the position of the press shaft. For the first stage, the press shaft can advance at a first speed from a beginning or fully retracted position to a first extension position. For the second stage, the press shaft can advance at a second speed, slower than the first speed, from the first extension position to a second extension position. For the third stage, the press shaft can advance at a third speed, slower than the second speed, from the second extension position to a third extension position. For the fourth stage, the press shaft can advance at a fourth speed, slower than the third speed, from the third extension position to an ending or fully extended position. Various embodiments include more or fewer stages, such as two, three, five, etc.

During the press cycle, the juicing device 100 can monitor the forces applied on the press shaft. If the forces applied on the press shaft exceed a limit (e.g., a threshold), the juicing device 100 can pause or slow advancement of the press shaft until forces applied to the press shaft decrease to at or below the limit or another amount. In some implementations, in response to the forces applied to the press shaft having decreased to at or below the limit or another amount, the press shaft can proceed to advance at a reduced speed, which can be less than the first, second, third, and/or fourth speed. The press shaft can advance to an end or full extension at the reduced speed.

The juicing device 100 can include a user interface 130 that can enable a user to control the juicing device 100. The user interface 130 can include a plurality of input devices, such as buttons, switches, electronic screens (e.g., touch screens), or otherwise. The user interface 130 can at least include a grind button, press button, and a stop button. The grind button, when pressed, can cause the motor unit 104 to drive to rotate the blade unit as described in more detail herein. The press button, when pressed, can start a press cycle, which can include advancing the press shaft to move the moveable platen 116 toward the front wall of the press chamber 114, comb insert 138, and/or fixed platen 118 to press ground food material to extract juice. The juicing devices described herein can extract a variety of juice quantities, which can at least include a single serving (e.g., less than or equal to about 16 fluid ounces) or larger quantities (e.g., 12-32 fluid ounces) depending on the amount of food (e.g., produce) and/or type of food processed.

In some embodiments, the user interface 130 can include a rapid press user input, such as a button. The rapid press user input can initiate a rapid press program and/or cycle such that the press shaft can advance more rapidly than during a normal press program and/or cycle. In some implementations, the rapid press user input comprises the press button. For example, the press button can be held to initiate and/or continue a rapid press cycle. The stop button, when pressed, can stop the motor unit 104 from rotating the blade unit and/or stop the advancement of the press shaft. In some embodiments, the user interface 130 can include a touch screen that enables a user to input the type and/or quantity of food material being processed such that the juicing device 100 can customize the grind (e.g., speed of rotation of the blade unit) and/or press cycle (e.g., speed of advancement of the press shaft).

The juicing device 100 can include features to detect a press operation abnormality. For example, the juicing device 100 can include an overflow guard 128. The overflow guard 128 can detect if ground food material in the interior 136 of the press chamber assembly 112 is overflowing (e.g., flowing out the top of the press chamber 114). The overflow guard 128 can be positioned over an opening into the interior 136 of the press chamber assembly 112. The overflow guard 128 can be rotatably coupled to the hopper 106, such as the support stand 132 of the hopper 106. In various embodiments, overflowing food material pushes up against the overflow guard 128 to cause the overflow guard 128 to rotate upwardly. The upward rotation of the overflow guard 128 can be detected by an electronic sensor, such as a magnetic switch. A signal from the sensor can indicate that the press chamber 114 is overflowing. In response, the juicing device 100 can visually and/or audibly indicate to the user that the press chamber 114 is overflowing, stop the motor unit 104 from rotating the blade unit, and/or stop the press shaft from advancing. In some embodiments, the signal from the sensor is received by an electronic processor, which can stop the motor in response. In certain variants, the overflow sensor (e.g., switch) is hardwired into a safety circuit for the motor, such that triggering of the overflow sensor automatically generates an audible or visual alert for the user, terminates power to the grind motor and/or drive motor, and/or executes other actions.

In various embodiments, all the components of the juicing device that contact food or juice can be quickly and easily disassembled, cleaned, and reassembled between juicing operations with negligible carryover of flavor and color between juicing. For example, in some embodiments, the disassembling, cleaning, and reassembling can be accomplished in less than about 2 minutes, about 1 minute, about 30 seconds, or otherwise. The various components of the juicing device can be manufactured using a variety of techniques. For example, certain components can be made by injection molding, additive manufacturing (e.g., 3D printing), machining, and/or other manufacturing processes. The various components described herein can be made from a variety of materials, which can at least include polymers, such as plastic (e.g., polypropylene, high density polyethylene, etc.), metal (e.g., stainless steel, aluminum, etc.), and/or metal alloys.

B. Grinder Assembly Overview—FIG. 1D

Figure 1D:
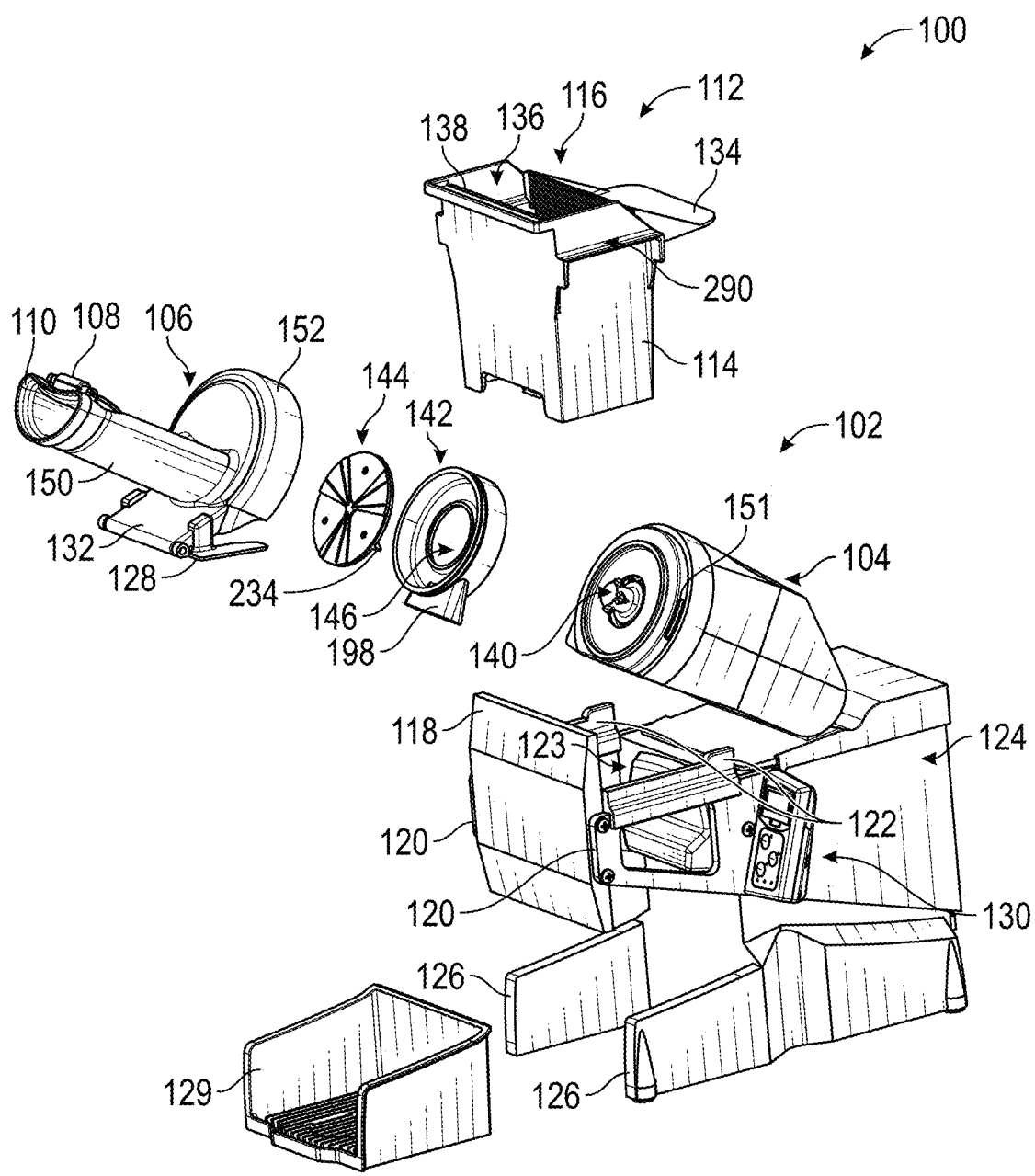
FIG. 1D illustrates an exploded view of features of the juicing device.

FIG. 1D shows an exploded view of the juicing device 100 to illustrate features of the grinder assembly 102. As described above, the grinder assembly 102 can at least include a hopper 106, blade unit 144, blade housing 142, and motor unit 104.

The hopper 106 can include an input chute 150 that can receive and hold food material to be ground. The hopper 106 can include a base 152, which can also be referred to as a housing portion. The base 152 of the hopper 106 can be coupled to the motor unit 104. For example, the base 152 of the hopper 106 can engage (e.g., hook onto, couple, etc.) with cleats 151 (e.g., protrusions, projections, etc.) of the motor unit 104 to couple the hopper 106 with the motor unit 104. In some embodiments, the base 152 of the hopper 106 can be twisted on the motor unit 104 to engage with and disengage from the cleats 151. In some embodiments, the motor unit 104 cannot drive rotation of the blade unit 144 unless the hopper 106 is coupled with the motor unit 104. The coupling of the hopper 106 with the motor unit 104 can be detected with an electronic sensor, such as a magnetic switch, light gate, and/or other mechanism.

The blade unit 144 can be disposed in the blade housing 142. Both the blade unit 144 and the blade housing 142 can be housed in the base 152 of the hopper 106. The motor unit 104 can include a drive tip 140 that can extend through an opening 146 of the blade housing 142 to engage with the blade unit 144 such that rotation of the drive tip 140 drives rotation of the blade unit 144. The blade unit 144 can engage with the drive tip 140 such that the blade unit 144 is retained on the drive tip 140 when the drive tip 140 is rotating and can be decoupled from the drive tip 140 when the motor unit 104 is not rotating the drive tip 140.

In use, the pusher 110 can be removed from the input chute 150. With the pusher 110 removed, the splash guard 108 can rotate down to cover the opening into the input chute 150. In various embodiments, such movement of the splash guard 108 occurs automatically, such as due to the bias of a spring acting on the splash guard 108. Food material, such as produce (e.g., vegetables, fruit, nuts, etc.) can be placed through the opening in the input chute 150. The rotational biasing force of the splash guard 108 can be small enough such that the weight of food material placed in the input chute 150 can be sufficient to overcome the biasing force of the splash guard 108 such that the splash guard 108 rotates up to permit the food material to flow down the input chute 150 and toward the blade unit 144. If the weight of the food material is not sufficient to overcome the biasing force of the splash guard 108, the user can push the food past the splash guard 108 and toward the blade unit 144. Additionally, if food material gets stuck in the input chute 150, the user can push the food material toward the blade unit 144 for grinding.

The blade unit 144 can rotate to grind the food material. As described, the blade unit 144 can be housed in the blade housing 142. The drive tip 140 of the motor unit 104 can extend through the opening 146 of the blade housing 142 to engage with the blade unit 144 such that rotation of the drive tip 140 rotates the blade unit 144. The blade unit 144 can be liquid impermeable. When assembled, the blade unit 144 can lack holes, gaps, and/or other features that would allow liquid to flow through the blade unit 144. The blade unit 144 can include raised and lowered platforms that provide edges for cutting. The blade unit 144 can include teeth, such as barbs, that cut food material.

The spinning of the blade unit 144 can direct ground food material radially outward (e.g., fling, throw, or flow) to move around the blade unit 144 and into the blade housing 142. The ground food material can flow out of the blade housing 142 through an exit ramp 198. The blade unit 144 can include one or more flanges 234, which can also be referred to as wipers, that can push (e.g., wipe) ground food material in the blade housing 142 to the exit ramp 198. The ground food material can flow out of the exit ramp 198 and into the interior 136 of the press chamber 114 positioned in the well 123 of the juicing device 100.

C. Hopper—FIGS. 2, 3A, and 3B

Figure 2:
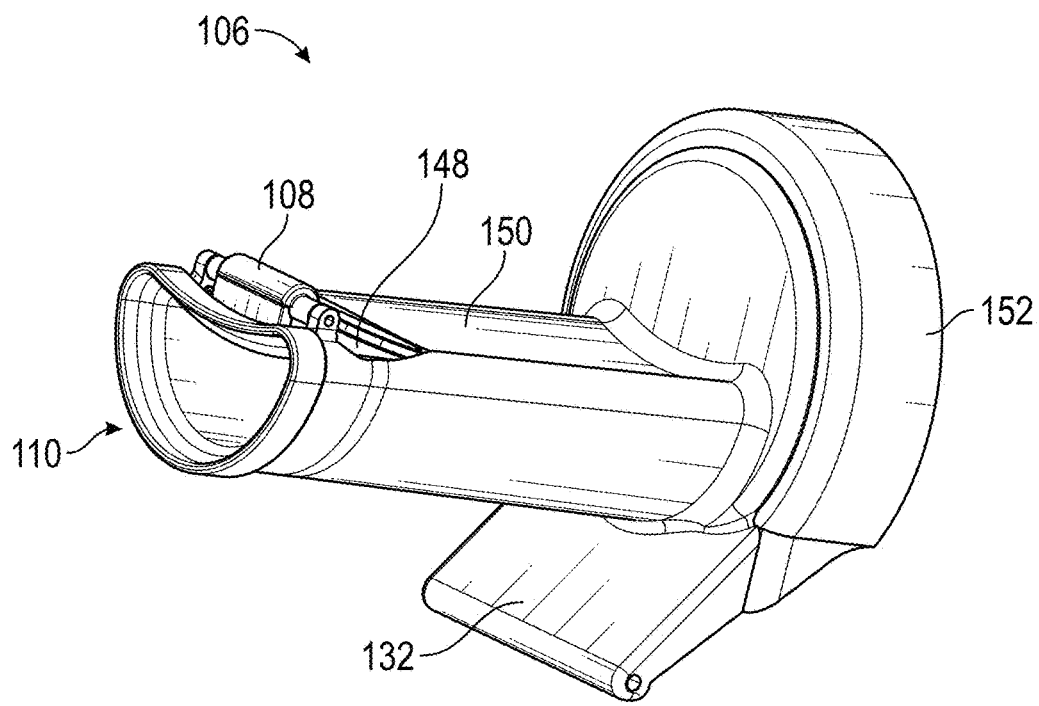
FIG. 2 illustrates a hopper with a pusher disposed therein.
Figure 3A:
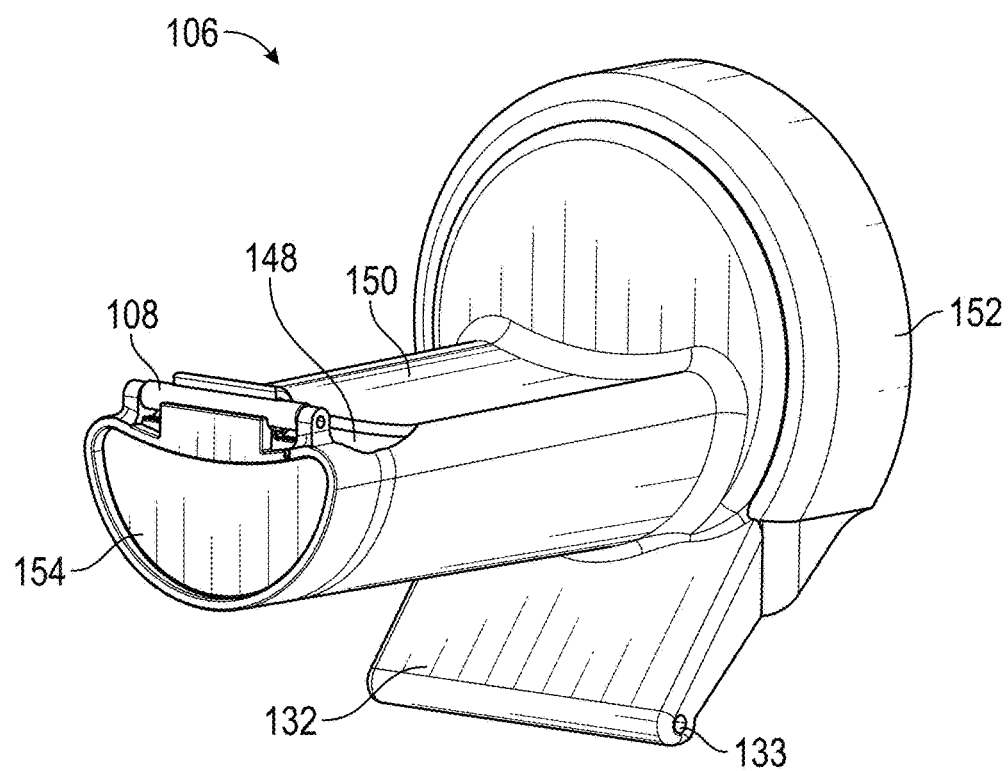
FIGS. 3A-3B illustrate various views of the hopper with the pusher removed.
Figure 3B:
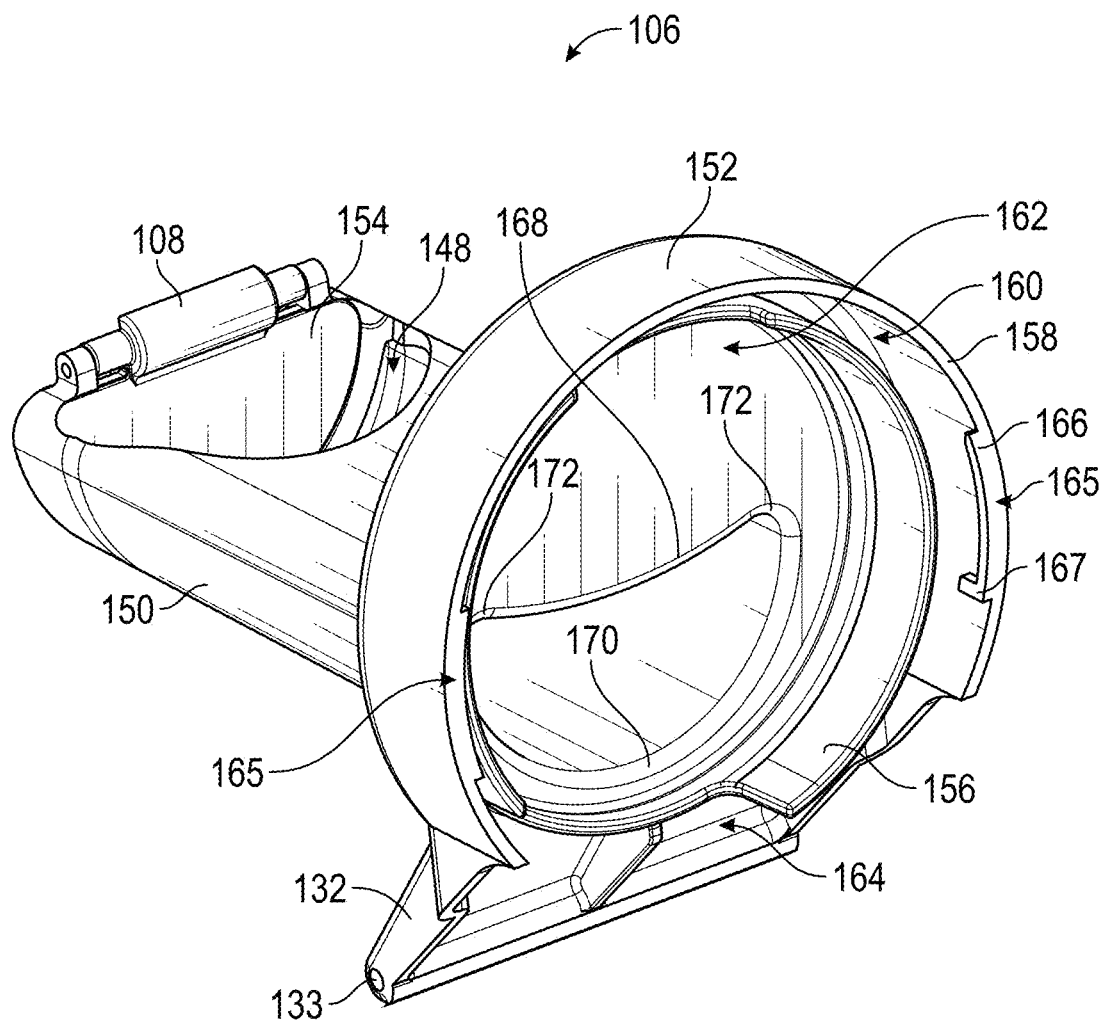

FIGS. 2, 3A, and 3B illustrate an example of the hopper 106. FIG. 2 shows the hopper 106 with the pusher 110 disposed in the input chute 150. FIGS. 3A and 3B show the hopper 106 without the pusher 110 disposed in the input chute 150.

The hopper 106 can include an input chute 150 that can receive and direct food material toward the base 152 of the hopper 106. The input chute 150 can include a splash guard 108 disposed proximate an opening of the input chute 150. The splash guard 108 can be biased, such as with a spring (e.g., torsion spring) to block the input chute 150, but with the pusher 110 disposed in the input chute 150, the splash guard 108 can be rotated upward, as shown in FIG. 2. The input chute 150 can include an aperture 148 into which the splash guard 108 can be received when the pusher 110 is placed in the input chute 150 or, in some embodiments, food material is flowing through the input chute 150. In some implementations, when the splash guard 108 is received in the aperture 148, the splash guard 108 does not protrude into the inner passageway of the input chute 150.

As shown in FIGS. 3A and 3B, without the pusher 110 in the input chute 150, the splash guard 108 can be rotated down to block the opening of the input chute 150 to inhibit or prevent food material from flowing back out of the opening of the input chute 150. For example, in some instances, food juices can spray out of the input chute 150 when the blade unit 144 is grinding food. Beneficially, with the splash guard 108 rotated down to block the input chute 150, the spray of food juices out of the input chute 150 can be impeded. The splash guard 108 can be rotatably coupled to the input chute 150.

The splash guard 108 can include a flange 154, which can also be called a panel, to block the input chute 150. The flange 154 can have a size and shape that substantially corresponds to the size and shape of the inner periphery of the input chute 150. The aperture 148 can include a size and shape that substantially corresponds to the size and shape of the flange 154.

As shown in FIG. 3B, the inner periphery of the input chute 150 can be substantially D shaped. For example, the inner periphery can include a bowl portion 170 and stem portion 168 connecting opposing sides of the bowl portion 170. The stem 168 can be curved toward the bowl 170. The junction between the bowl 170 and stem 168 can include curves 172. The bowl 170 of the D shaped input chute 150 can facilitate the flow of material down the input chute 150 and toward the blade unit 144 in the base 152. The D shape of the input chute 150 can help material to not get stuck and/or logged in the input chute 150. As illustrated in FIG. 3B, in some embodiments, a bottom of the input chute 150 is concave and/or a top of the input chute 150 is convex. The bottom and top can have the same or different radii of concavity or convexity.

The base 152 of the hopper 106 can include an outer wall 158. The outer wall 158 can form a substantially circular outer periphery of the base 152. The base 152 can include an internal wall 156 spaced radially inward of the outer wall 158 to provide a channel 160 between the outer wall 158 and the internal wall 156. The base 152 can include an interior 162, which can be disposed within a periphery formed by the internal wall 156. The interior 162 can house the blade unit 144 and blade housing 142 once assembled. The base 152 can include a gap 164, which can be a gap 164 in the outer wall 158 and internal wall 156, through which the exit ramp 198 of the blade housing 142 can extend.

The base 152 can include one or more catches 165, which can also be referred to as a hooks or wedge catches. The catches 165 can engage with the cleats 151 of the motor unit 104 to couple the hopper 106 and motor unit 104 together. The catches 165 can include wedges 166 and stops 167, which can also be referred to as protrusions. The stops 167 can be disposed proximate ends of the wedge 166. To couple the hopper 106 and motor unit 104 together, the hopper 106 can positioned against the motor unit 104 and rotated in a first direction such that the wedges 166 hit the cleats 151 of the motor unit 104. The wedges 166 can include an angled surface such that the catches 165 slide under the cleats 151 upon impact. The user can continue to rotate the hopper 106, allowing the wedges 166 to slide under the cleats 151, until the cleats 151 hit the stops 167 to inhibit or prevent further rotation of the hopper 106 to secure the hopper 106 to the motor unit 104. To decouple the hopper 106 and the motor unit 104, the user can rotate the hopper 106 in a second direction, opposite the first direction, such that the stops 167 move away from the cleats 151 and the wedges 166 slide out from under the cleats 151 so that the hopper 106 can be removed.

As mentioned above, the hopper 106 can include a support stand 132. The support stand 132 can rest on a shelf of the press chamber 114 with the grinder assembly 102 rotated downward. In some variants, the motor unit 104 will not drive rotation of the blade unit 144 if the grinder assembly 102 is not rotated downward, which can include the support stand 132 resting on the shelf of the press chamber 114. The support stand 132 can include a pivot mount 133 to couple with the overflow guard 128.

D. Pusher—FIGS. 4A-4C

Figure 4A:
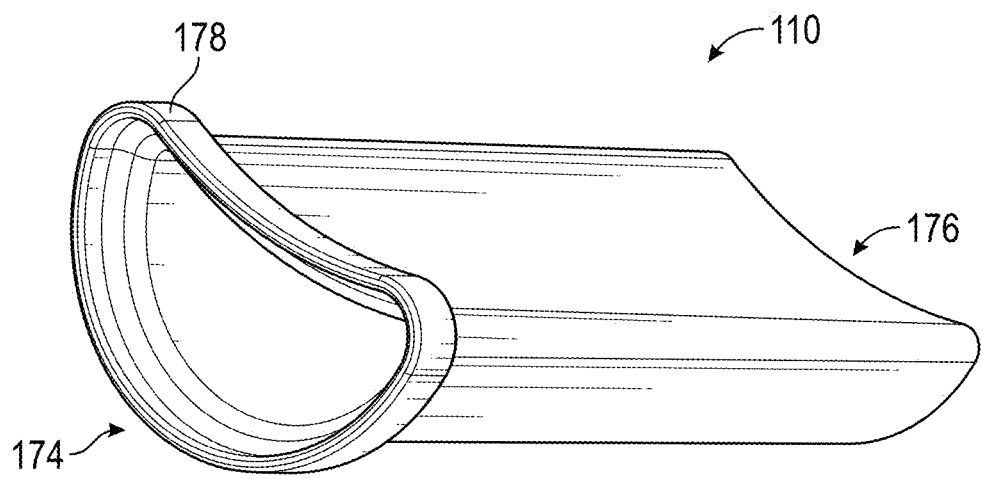
FIGS. 4A-4C illustrate various views of the pusher.
Figure 4B:
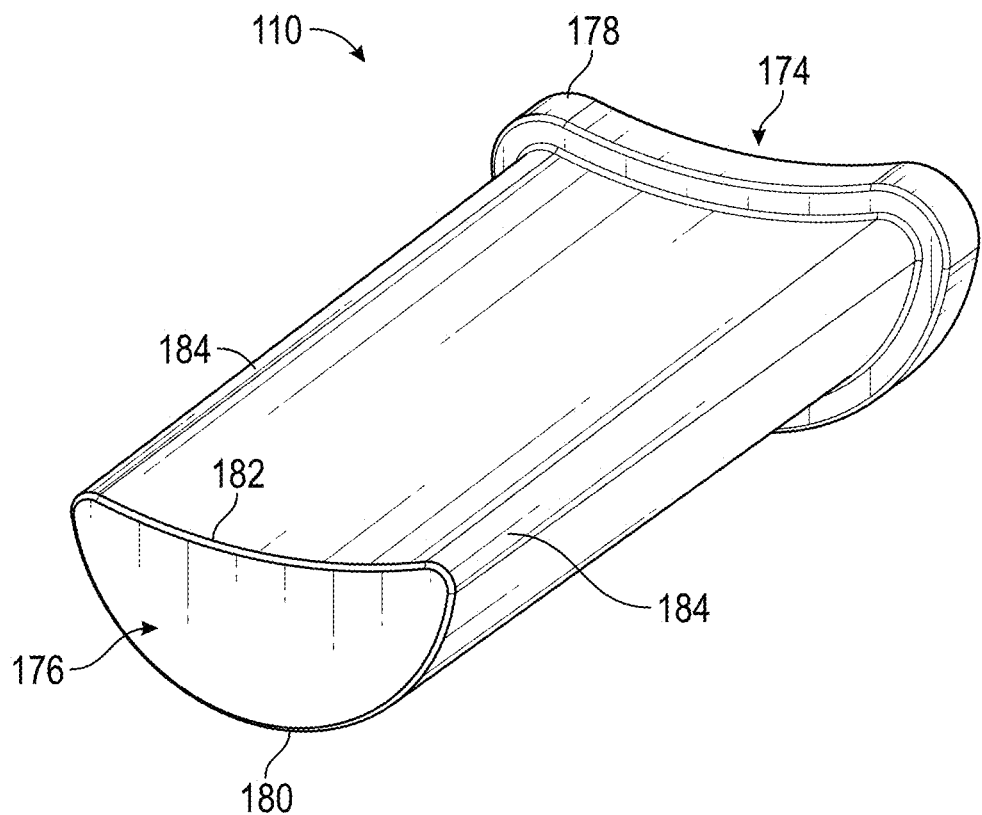
Figure 4C:
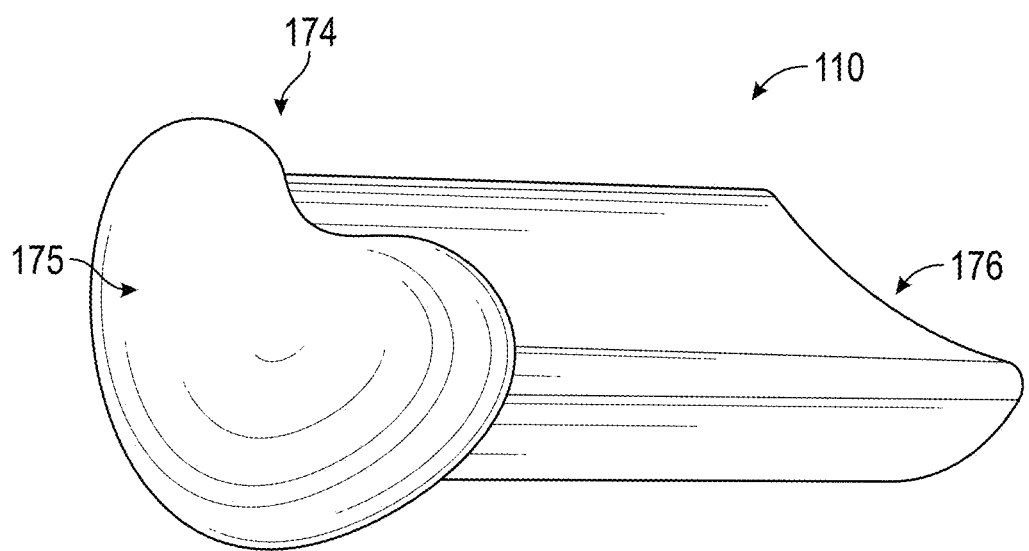

FIGS. 4A-4C illustrate an example of the pusher 110. The pusher 110 can be inserted into the input chute 150 to push food material down the input chute 150 of the hopper 106 toward the blade unit 144. FIGS. 4A and 4B illustrate the pusher 110 without a grip handle 175. FIG. 4C illustrates the pusher 110 with the handle 175.

As illustrated in FIGS. 4A and 4B, the pusher 110 can include a first end 174 and a second end 176. The first end 174 can remain outside the input chute 150 when the pusher 110 is inserted into the input chute 150. The first end 174 can include a lip 178. The lip 178 can include a periphery that is larger than the opening into the input chute 150 to inhibit or prevent the first end 174 from being inserted into the input chute 150 and/or to limit the amount that the pusher 110 can be inserted into the input chute 150. As shown in FIG. 4B, the pusher 110 can include an outer periphery that corresponds to the inner periphery of the input chute 150 such that the outer periphery of the pusher 110 can scrape the walls of the inner periphery of the input chute 150 of food material. The periphery of the pusher 110 can be substantially D shaped. For example, similar to the inner periphery of the input chute 150, the pusher 110 can include a bowl portion 180 and a stem portion 182. The stem 182 can extend between the ends of the bowl 180. The stem 182 can be curved toward the bowl 180. Curves 184 can be disposed at the junction between the stem 182 and the bowl 180. The distance between the lip 178 and the second end 176 can correspond to a length of the input chute 150 such that, when the pusher 110 is disposed in the input chute 150, the second end 176 is at an end of the input chute 150 and proximate the blade unit 144. As shown in FIG. 4A, the pusher 110 can be hollow, which can decrease weight, cost, and material usage.

As shown in FIG. 4C, the pusher 110 can include a grip handle 175, which can also be referred to as a handle or ergonomic handle. The grip handle 175 can be disposed on the first end 174 to facilitate ease of handling. The handle 175 can block access into the hollow interior of the pusher 110. The handle 175 can be made of a polymer, such as a soft polymer material.

E. Overflow Guard—FIGS. 5A-5C

Figure 5A:
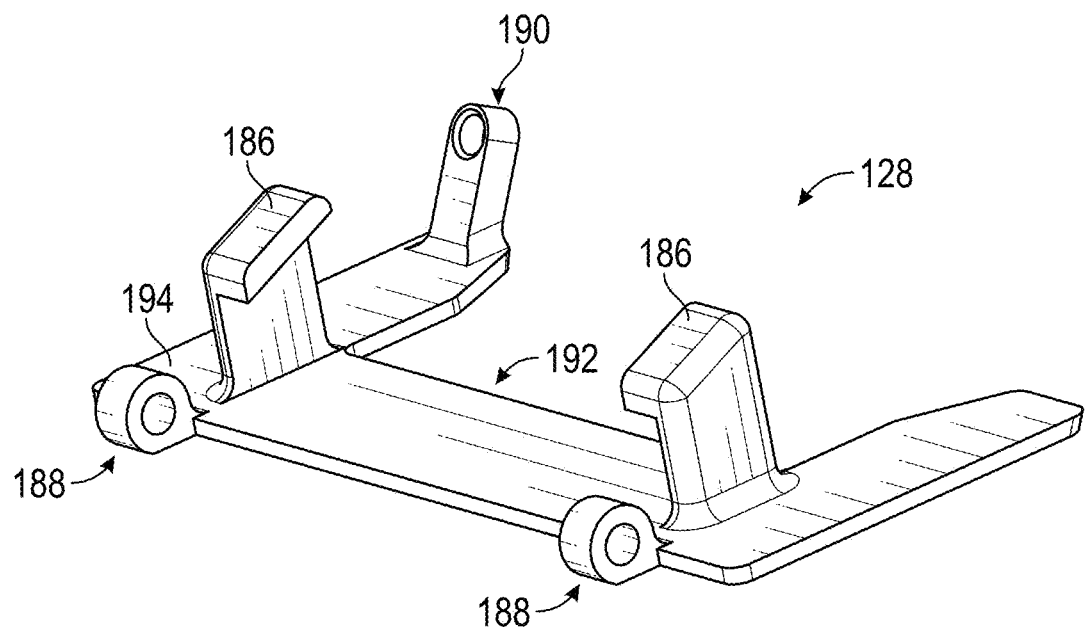
FIGS. 5A-5C illustrate various views of an overflow guard.
Figure 5B:
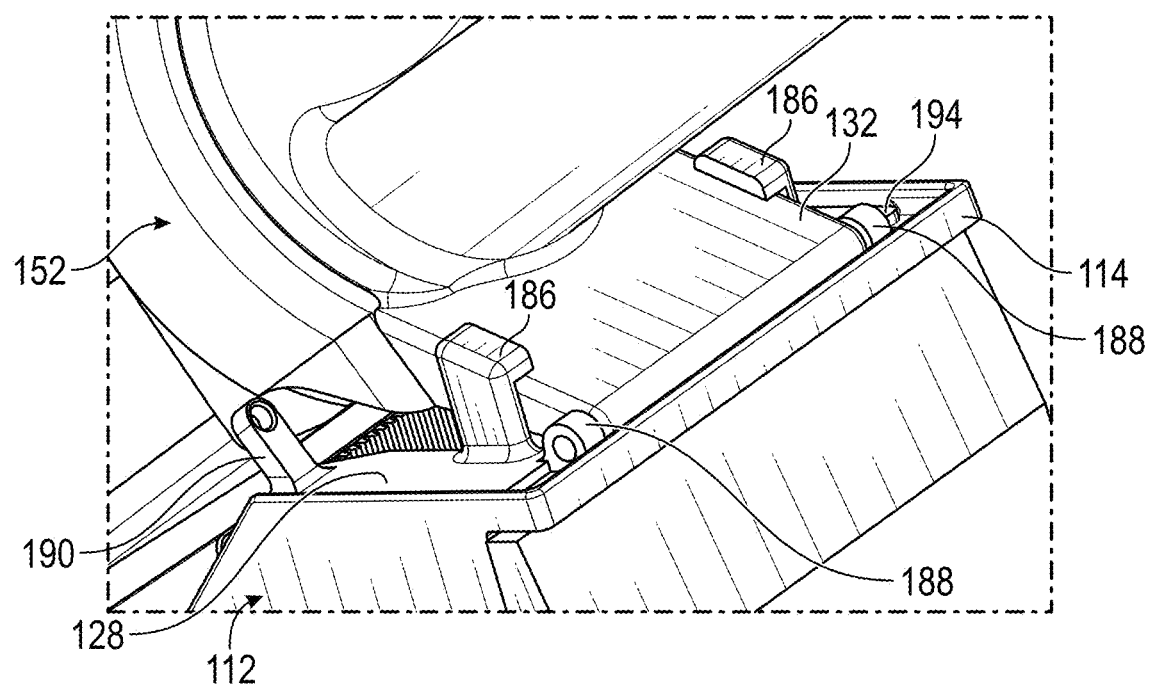
Figure 5C:
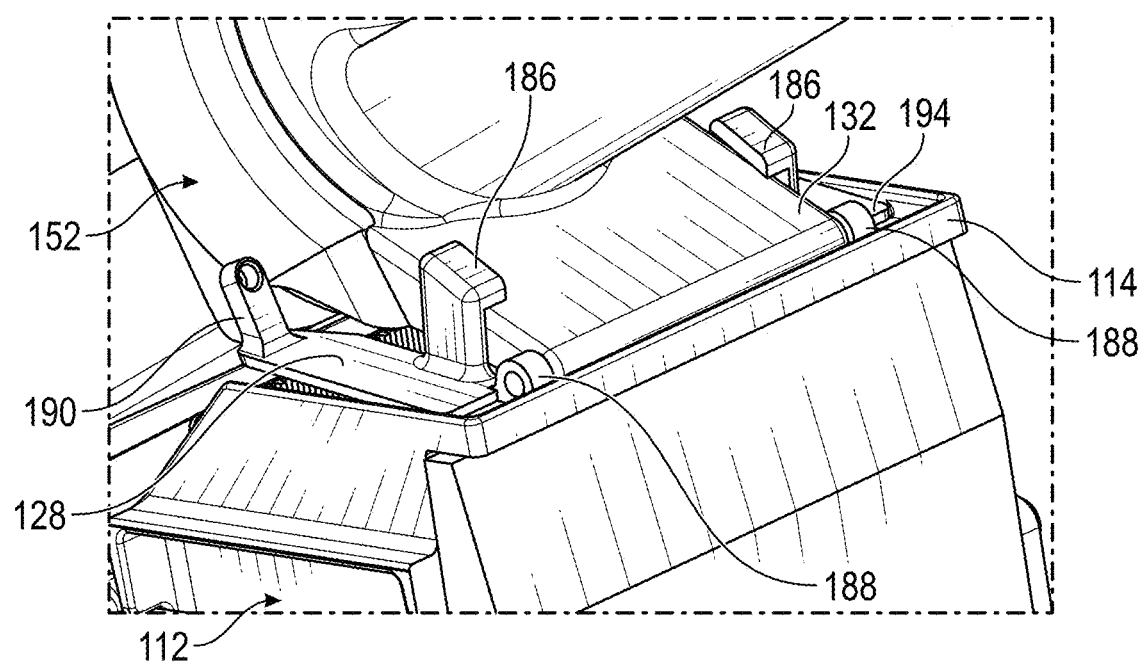

FIGS. 5A-5C illustrate an example of the overflow guard 128. As previously described, the overflow guard 128 can be positioned over the opening into the interior 136 of the press chamber 114. If ground food material being pressed by the press chamber assembly 112 starts to push out of the top of the press chamber 114, the overflow guard 128 can be pushed upward (e.g., rotated upward). The displacement of the overflow guard 128 can be detected be an electronic sensor, such as a magnetic switch or light gate, to signal to the juicing device 100 that the press chamber 114 is overflowing.

The overflow guard 128 can include pivot mounts 188 to facilitate rotatably coupling to the hopper 106. For example, the pivot mounts 188 can be coupled to the pivot mounts 133 of the support stand 132 of the hopper 106, which can include coupling with a pin or rod.

The overflow guard 128 can include a panel 194. The panel 194 can cover a portion of the opening into the interior 136 of the press chamber 114, as shown in FIG. 5B, such that ground food material pushing out of the press chamber 114 pushes against the panel 194. The panel 194 can include a recess 192, which can also be referred to as a cutout or gap. The recess 192 can permit ground food material exiting the exit ramp 198 of the blade housing 142 to enter into the interior 136 of the press chamber 114. As the overflowing ground food material pushes against the panel 194, the overflow guard 128 can rotate upward, as seen in FIG. 5C. The overflow guard 128 can rotate relative to the support stand 132 of the hopper 106.

The overflow guard 128 can include hooks 186, which can also be referred to as catches or arms. The hooks 186 can extend vertically from the panel 194. The hooks 186 can hook onto the support stand 132 of the hopper 106 to inhibit or prevent the overflow guard 128 from overly rotating downward. For example, as the grinder assembly 102 is rotated upward to the second position, the hooks 186 can hang onto the support stand 132 to inhibit or prevent the overflow guard 128 from rotating downward. In some embodiments, the overflow guard 128 is inhibited or prevented from rotating down into the interior 136 of the press chamber 114. For example, as shown in FIG. 5A, during a juicing operation, the hooks 186 can contact the support stand 132 and/or a bottom of the overflow guard 128 can rest on a portion of the press chamber assembly 112 and/or the panel 194.

The overflow guard 128 can include a position indicator, such as a proximity sensor. For example, in some embodiments, the overflow guard 128 can include a magnet 190. With the overflow guard 128 rotated downward as shown in FIG. 5B, the magnet 190 can be disposed proximate a balanced magnetic switch, which can be in the motor unit 104, to hold the switch closed to complete an electrical circuit. When the overflow guard 128 is rotated upward as shown in FIG. 5C, the magnet 190 can be moved away from the balanced magnetic switch such that the magnet 190 does not hold the switch closed and the electrical circuit is not complete. The incomplete electrical circuit can indicate to the juicing device 100 that an overflow is occurring. In response, the juicing device can 100 generate an audible and/or visual alert for the user, stop the motor unit 104, and/or cease advancing the press shaft, and/or execute other actions.

F. Blade Housing—FIGS. 6A-6C

Figure 6A:
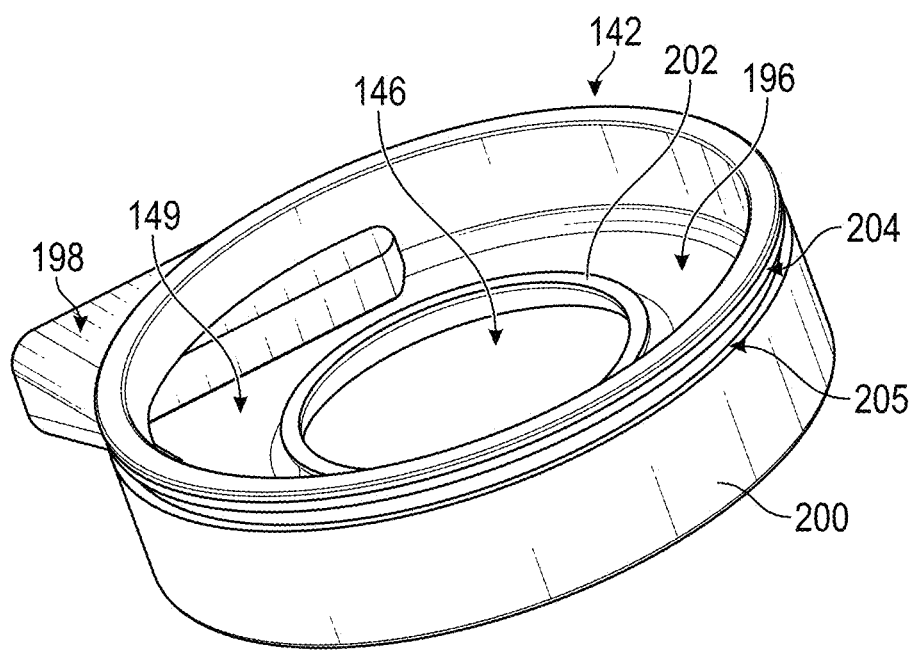
FIGS. 6A and 6B illustrate various views of a blade housing.
Figure 6B:
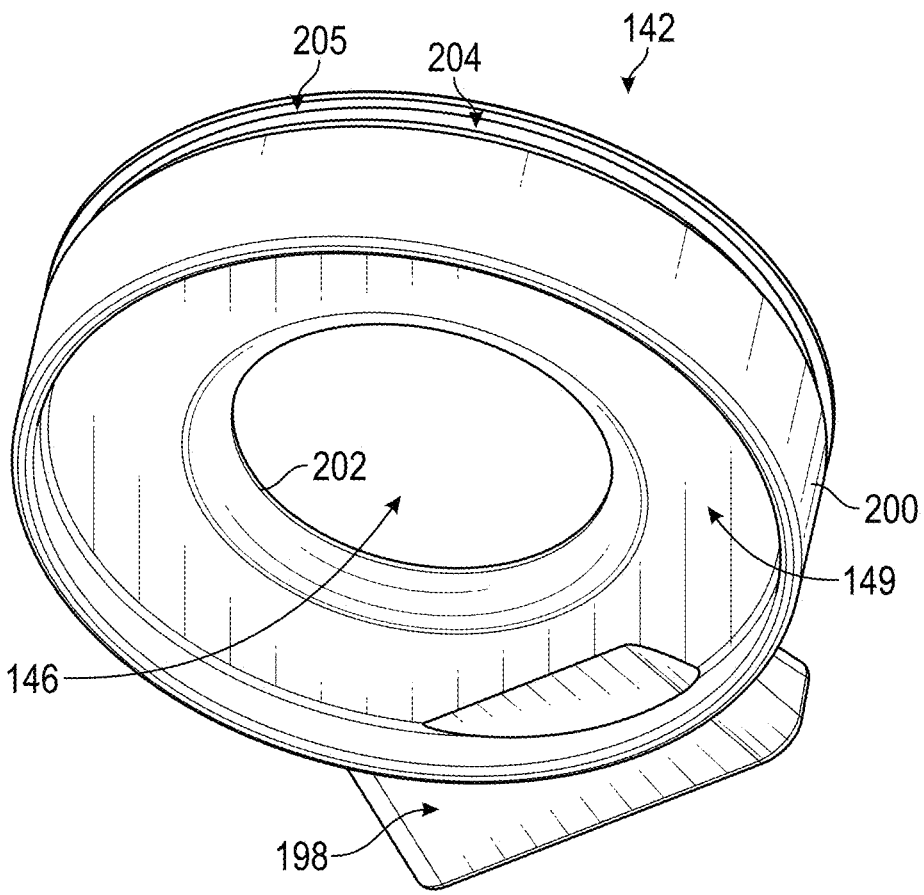

FIGS. 6A and 6B illustrate a blade housing 142. As described herein, the blade housing 142 can house the blade unit 144. The blade unit 144 can be disposed in the blade housing 142 and engage with the drive tip 140 of the motor unit 104 through the opening 146 in the blade housing 142.

The blade housing 142 can include an outer wall 200. The outer wall 200 can form an outer periphery of the blade housing 142, which can be generally circular. The blade housing 142 can include an inner wall 202. The inner wall 202 can be disposed radially inward relative to the outer wall 200. The inner wall 202 can form a periphery of the opening 146. The inner wall 202 can have an axial length that is shorter than that of the outer wall 200. The blade housing 142 can include a bottom wall 149 extending between the inner wall 202 and the outer wall 200.

The blade housing 142 can include a channel 196. The channel 196 can be disposed between the outer wall 200, inner wall 202, and bottom wall 149. Ground food material can be thrown radially outward from the rotating blade unit 144 and into the channel 196 of the blade housing 142. The ground food material can then flow through the channel 196 and out of the exit ramp 198 of the blade housing 142. The exit ramp 198 can thus provide an exit path for the ground food material out of the blade housing 142. The exit path can be substantially tangential to the blade unit 144 and/or generally perpendicular to the axis of rotation of the blade unit 144. As described herein, the blade unit 144 can include one or more flanges 234 that can be positioned in the channel 196 and, as the blade unit 144 rotates, move ground food material disposed in the channel 196 through the channel 196 and out of the exit ramp 198. The exit ramp 198, which can also be describe as an outlet or outlet chute, can be disposed through the outer wall 200. The junctions between the bottom wall 149 and the outer wall 200 and/or inner wall 202 can be curved. The bottom wall 149 can be recessed relative to both ends of the outer wall 200.

The blade housing 142 can include a groove 205. The groove 205 can be disposed in the exterior of the outer wall 200. The groove 205 can extend circumferentially around the blade housing 142 in the outer wall 200. The groove 205 can receive a gasket 204 therein.

Figure 6C:
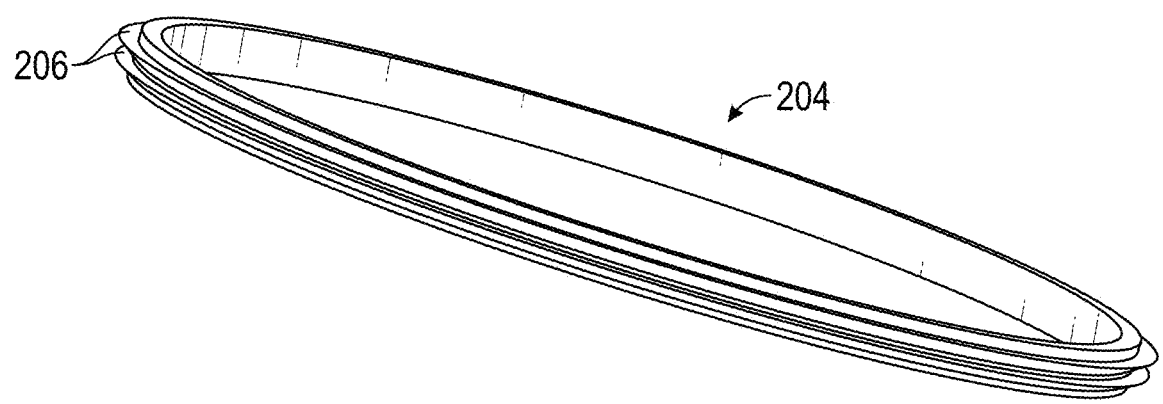
FIG. 6C illustrates a gasket for the blade housing.

As shown in FIG. 6C, the gasket 204 can be annular in shape. The gasket 204 can include a plurality (e.g., two) of rims 206. The rims 206 can extend radially outward. The gasket 204 can be made of a flexible material, such as a polymer.

As described herein, the blade housing 142 can be disposed in the base 152 of the hopper 106 when assembled. The exterior of the outer wall 200 of the blade housing 142 can be disposed proximate the interior of the internal wall 156 of the base 152 of the hopper 106. The gasket 204 can contact the interior of the internal wall 156 of the base 152 to inhibit or prevent ground food material from leaking out between the blade housing 142 and the base 152 of the hopper 106.

G. Blade Unit—FIGS. 7A-7L

FIGS. 7A-7L illustrate the blade unit 144, which can also be referred to as a grinder unit, cutter unit, or combination blade. The blade unit 144 can include multiple components. For example, the blade unit 144 can include a blade portion 208, which can also be referred to as a front portion and/or cutting portion, and a drive coupling 226, which can also be referred to as a rear portion. The blade portion 208 and the drive coupling 226 can be coupled together, such as with fasteners 224 (e.g., screws), welding, adhesive, or other bonds. In some embodiments, the blade unit 144 can be a unitary component. The blade unit 144 can have a circular periphery. The center of gravity of the blade unit 144 can be disposed on the central axis thereof, which can be the axis of rotation 145. The blade unit 144 can rotate in a clockwise or counterclockwise direction. In some embodiments, the blade unit 144 is configured to operate (e.g., cut produce) in both the clockwise and counterclockwise directions and/or is not rotational direction specific.

As previously discussed, the blade unit 144 can receive the food material from the input chute 150 and cut the food material. In some embodiments, the blade unit 144 also grinds the food material into the ground food material. In certain variants, the blade unit 144 and blade housing 142 cooperate to form the ground food material, such as by cutting the food material first and grinding the food material second. For example, in some implementations, the cut food material is ejected radially outward (e.g., due to centrifugal force) toward the outer wall 200 of the blade housing 142. The cut food material then travels through a radial gap between the side of the blade unit 144 and the outer wall 200 (e.g., by gravity) into the channel 196 and is pushed along by the flanges 234. During such travel, the cut food material can be compressed, which converts it into ground food material.

Figure 7A:
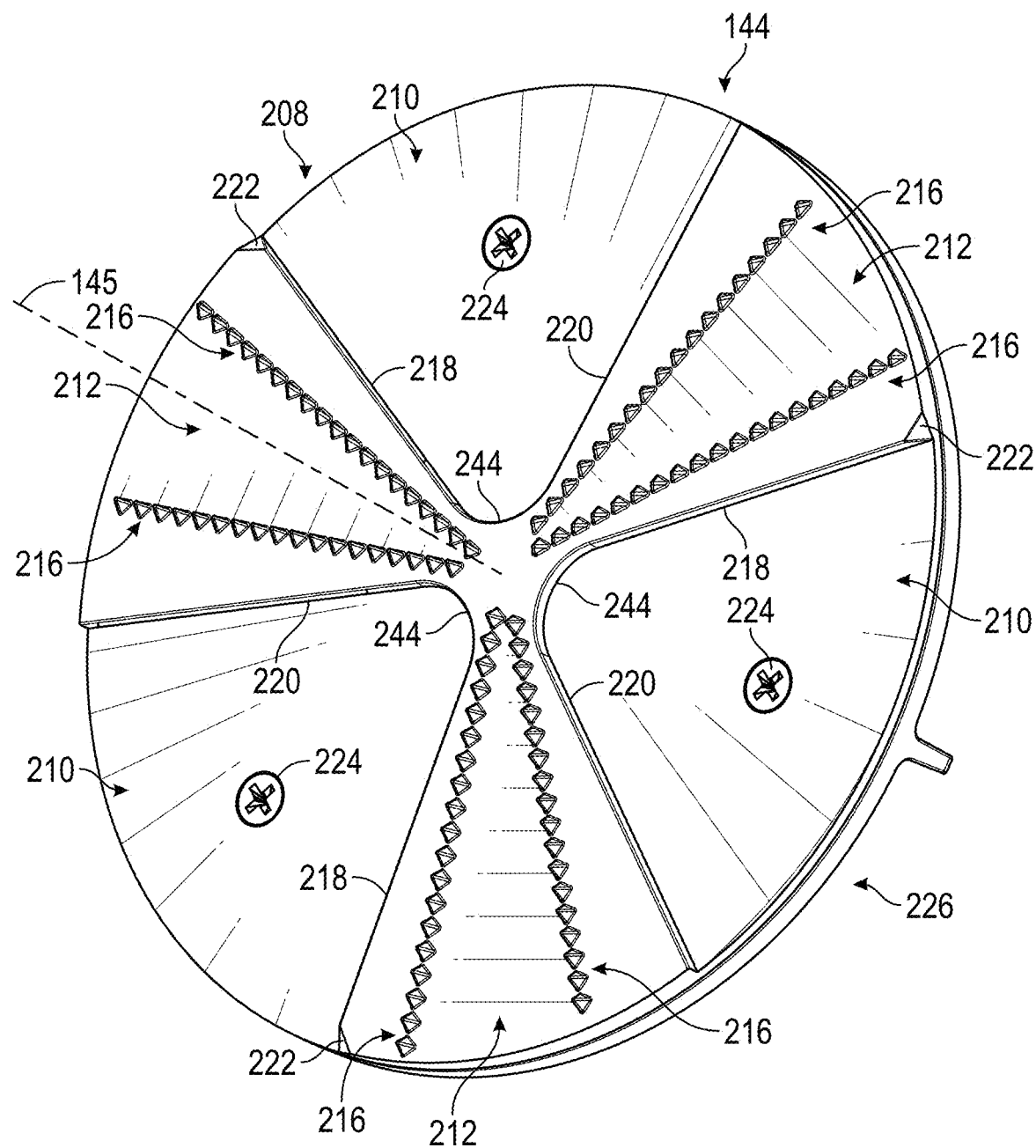
Figure 7B:
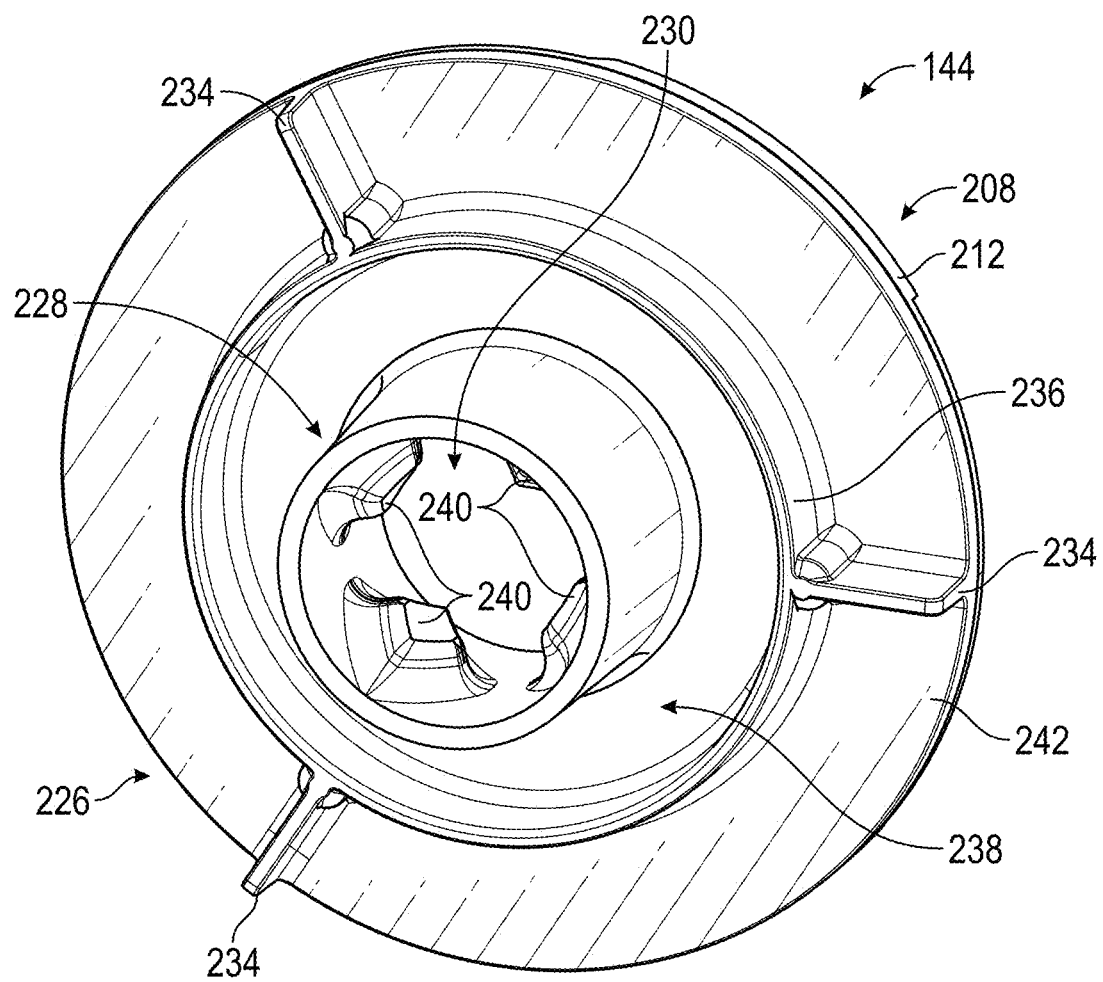
Figure 7G:
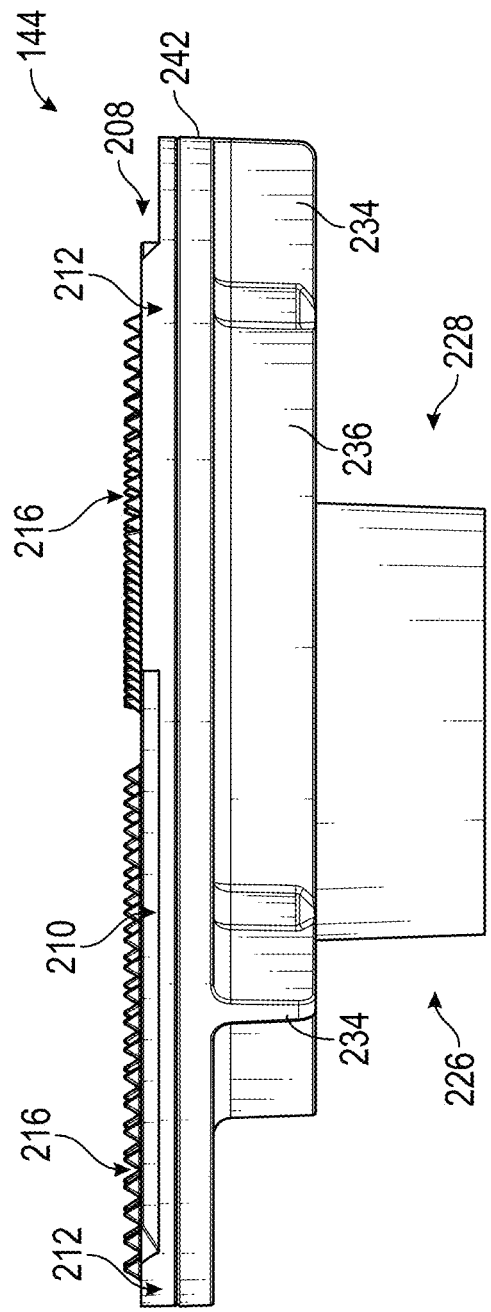
Figure 7H:
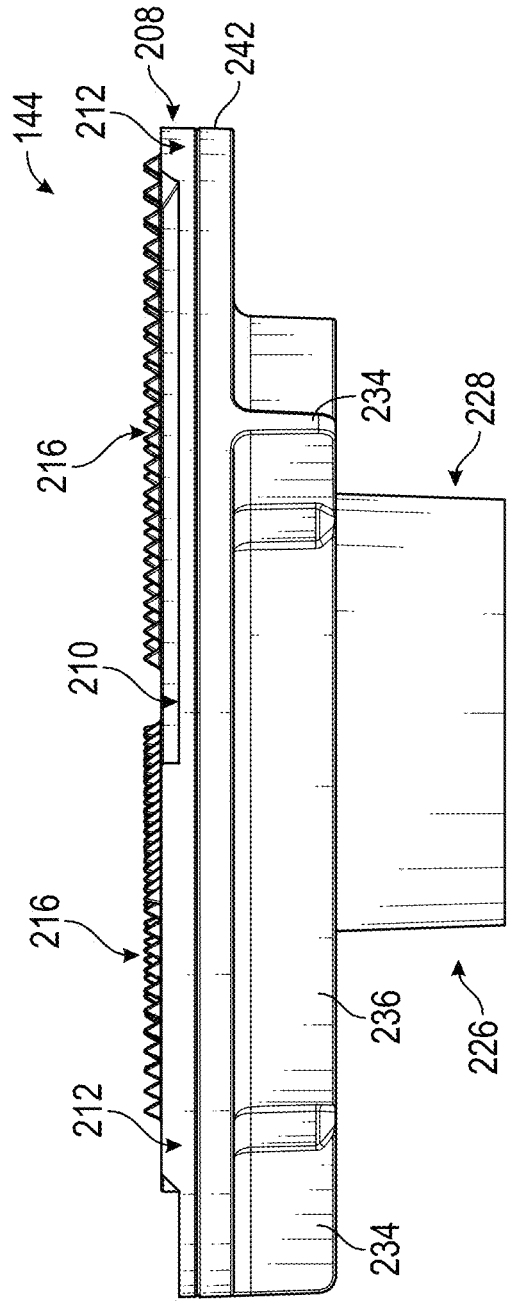

The blade portion 208 can have different characteristics to facilitate grinding and cutting a variety of food. For example, leafy greens, such as kale, can have a tendency to roll and bunch up during cutting. Accordingly, a relatively taller cutter can be employed to mitigate this tendency. As such, as shown in FIG. 7A, the blade portion 208 of the blade unit 144 can include one or more raised platforms 212 (e.g., raised surfaces) and one or more recessed platforms 210 (e.g., recessed surfaces) to create one or more cutting edges, which can act as loppers. For example, the blade portion 208 can include one raised platform 212 and one recessed platform 210. In another example, the blade portion 208 can include two, three, four, or more raised platforms 212 and two, three, four, or more recessed platforms 210. One recessed platform 210 can be positioned between circumferentially adjacent raised platforms 212. The recessed platforms 210 and/or raised platforms 212 can be generally perpendicular relative to an axis of rotation 145 of the blade unit 144. In some embodiments, the recessed platform 210 and/or raised platform 212 can be angled non-perpendicularly relative to the axis of rotation 145.

As shown in FIG. 7A, the recessed platform 210 and/or raised platform 212 can comprise a generally planar surface (other than the teeth 216 and/or fasteners 224). The recessed platforms 210 can be recessed along the axis of rotation relative to the raised platforms 212. The raised platforms 212 can be coplanar. In some embodiments, the raised platforms 212 can be on different planes such that one or more of the raised platforms 212 is positioned at a different axial position relative to one or more of the other raised platforms 212. The recessed platforms 210 can be coplanar. In some embodiments, the recessed platforms 210 can be on different planes such that one or more recessed platforms 210 is positioned at a different axial position relative to one or more of the other recessed platforms 210. The raised platforms 212 can be the same size or different sizes. The recessed platforms 210 can be the same size or different sizes. The raised platform 212 and/or recessed platform 210 can be shaped as a sector of a circle. Each raised platform 212 can be bordered by two of the recessed platforms 210. Each recessed platform 210 can be bordered by two of the raised platforms 212. The recessed platforms 210 can be separated by the raised platforms 212. The raised platforms 212 can be joined centrally. For example, as shown in FIG. 7A, in certain implementations, the raised platforms 212 connect at a radial center of the blade unit 144 such that the raised platforms 212 directly touch. The recessed platforms 210 can be spaced apart from each other such that the recessed platforms 210 do not directly touch.

The blade unit 114 can have edges between the recessed and raised platforms 210, 212 that are configured to cut and/or grind food. The edges between the raised platforms 212 and recessed platforms 210 can be generally parallel to the axis of rotation 145. In some embodiments, the edges can be angled relative to the axis of rotation 145. Each of the raised platforms 212 can include a first edge 218 and/or a second edge 220 at the transitions between the raised platform 212 and the recessed platforms 210. The first edge 218 can be the leading edge that is in the direction of rotation of the blade unit 144 when grinding and the second edge 220 can be the trailing edge. The first edge 218 of a first raised platform 212 can be joined by a curved edge 244 with the second edge 220 of another raised platform 212 positioned in front of the first raised platform 212 in the direction of rotation. The length (e.g., height) of the first edges 218 and/or second edges 220 in the axial direction can be between 1/32 of an inch and 1/8 of an inch. In some embodiments, the first edges 218 and/or second edges 220 can be less than 1/32 of an inch. In some embodiments, the first edges 218 and/or second edges 220 can be greater than or equal to about 1/8 of an inch, such as about: 5/32, 3/16, 7/32, 1/4, 9/32, 5/16, 11/32, 3/8, 13/32, 7/16, 15/32, or 1/2 of an inch or any value between any of the foregoing values.

The blade unit 144 can be adapted to effectively grind various types of produce, including stringy produce (e.g., ginger). For such stringy produce, holes and anchor points in the blade unit 144 should be avoided. For example, holes and/or anchor points can cause strings of ginger to pile up and/or block exits. Accordingly, in many variants, the blade unit 144 lacks holes once assembled (e.g., with the fasteners 224 installed). The raised platforms 212 can include an angled surface 222 at the radially outermost portion of the first edge 218. The angled surface 222 can be angled relative to the adjoining raised platform 212 and/or recessed platform 210. The angled surface 222 can help inhibit or prevent food material, such as strings of ginger, from catching on a corner of the first edge 218.

The blade unit 144 can be adapted to effectively grind harder vegetables, such as carrots or other root vegetables. Such harder vegetables can be better processed by a finer grind, which can include making numerous relatively small cuts, to achieve a high juice yield. Accordingly, the blade portion 208 of the blade unit 144 can include a plurality of teeth 216, which can be barbed teeth, to create numerous cuts in the food material. The plurality of teeth 216 can be disposed on the raised platform(s) 212 and/or recessed platform(s) 210.

As illustrated, the teeth 216 can be arranged in rows. For example, the plurality of teeth 216 can be arranged on each of the raised platform(s) 212 in two rows. The two rows can be angled relative to each other at an acute angle, such as less than or equal to about: 10°, 20°, 30°, 45°, or otherwise. The plurality of teeth 216 can extend substantially the length in the radial direction of the raised platform 212. The plurality of teeth 216 can extend to proximate the radially outermost edge of the raised platform 212. The plurality of teeth 216 can extend from proximate a central portion of the blade unit 144 to proximate the radially outermost edge of the raised platform 212. The plurality of teeth 216 can extend a length in the radial direction that is greater than or equal to the length in the radial direction of the first edge 218 and/or second edge 220. The distance between the first edge 218 and a first row of the plurality of teeth 216 that is closest to the first edge 218 can be the same as the distance between the second edge 220 and a second row of the plurality of teeth 216 that is closest to the second edge 220. The first and second rows of the plurality of teeth 216 can be radially offset from each other. For example, the first and second rows of the plurality of teeth 216 can be positioned relative to each other such that the teeth of the first row are at radiuses that fall between the radial positions of the teeth of the second row. The plurality of teeth 216 can extend from proximate the radially outermost edge of the raised platform 212 to a radially innermost portion of the raised platform 212, which can include extending to and/or radially inward of the junction between the first edges 218 and second edges 220 of the raised platform 212 and the curved edge 244. In some embodiments, the plurality of teeth do not extend to the axis of rotation 145 of the blade unit 144.

The plurality of teeth 216 can be positioned in various locations. The plurality of teeth 216 can be positioned on one or more of the raised platforms 212 and not on others of the raised platforms 212. The plurality of teeth 216 can be positioned on one or more of the recessed platforms 210 and not on others of the recessed platforms 210. In various embodiments, the plurality of teeth 216 can be positioned only on the recessed platforms 210, only on the raised platforms 212, or on one or more of the platforms 210, 212. Some implementations do not include the teeth 216.

The teeth can be configured to efficiently cut and grind produce, while also being wear-resistant. As shown in FIGS. 7K and FIG. 7L, the teeth 216 can comprise a pyramidal shape, such as a tetrahedron. Each of the plurality of teeth 216 can include a front face 262. The front face 262 can face the direction of rotation of the blade unit 144. The front face 262 can be generally perpendicular relative to the raised platform 212. The front face 262 can be generally parallel relative to the axis of rotation 14. The front face 262 can be shaped like a triangle. Each of the plurality of teeth 216 can include angled faces 264, which can be disposed on an opposite side of the plurality of teeth 216 compared to the front faces 262. The angled faces 264 can be angled relative to each other. The angled faces 264 can be mirrored relative to each other about a central plane that extends through a center of the tooth and splits the tooth approximately in half. The junctions between the front face 262 and the angled faces 264 can be rounded.

The blade portion 208 of the blade unit 144 can be made of metal, such as a metal alloy. The blade portion 208 can be made by a metal injection molding and sintering process. In various embodiments, the blade unit 144 comprises stainless steel, aluminum, or another food-safe and corrosion-resistant metal.

Returning to FIGS. 7A and 7B, as described above, the blade unit 144 includes the drive coupling 226. The drive coupling 226 and the blade portion 208 and can be coupled together by fasteners 224, which can be screws, or other bonds. The fasteners 224 can extend through the recessed platforms 210 to couple the blade portion 208 and drive coupling 226 together. In various embodiments, the drive coupling 226 is made of plastic or metal.

The drive coupling 226 can removably couple the blade unit 144 to the drive tip 140 of the motor unit 104. The drive coupling 226 can include a panel 242. The panel 242 can be circular and have a periphery that substantially matches that of the blade portion 208. The panel 242 can be coupled to the blade portion 208 by the one or more fasteners 224.

The drive coupling 226 can include a connection port 228 to couple the drive coupling 226 to the drive tip 140 of the motor unit 104. The connection port 228 can inhibit or prevent decoupling of the blade unit 144 from the drive tip 140 when the drive tip 140 is rotating and allow for removal of the blade unit 144 from the drive tip 140 when the drive tip 140 is not rotating.

The connection port 228 can include a receiving hole 230 for the drive tip 140 of the motor unit 104. The wall of the connection port 228 can include a plurality (e.g., four) of internal protrusions 240. The internal protrusions 240 can extend radially inward from the wall of the connection port 228. The internal protrusions 240 can be circumferentially distributed, which can include equidistantly spaced from each other, about the inner surface of the wall of the connection port 228. The drive tip 140 can include external protrusions that can correspond to the internal protrusions 240 of the connection port 228. The drive tip 140 can be inserted into the connection port 228 such that the external protrusions of the drive tip 140 pass between the internal protrusions 240 of the connection port 228. Upon rotating the drive tip 140, the external protrusions of the drive tip 140 rotate to a position behind the internal protrusions 240 to inhibit or prevent decoupling of the drive coupling 226 from the drive tip 140. When the drive tip 140 is not rotating, the external protrusions of the drive tip 140 can pass between the internal protrusions 240 of the connection port 228 to decouple the blade unit 144 from the drive tip 140. Further description regarding this connection mechanism can be found in U.S. Patent Application Publication No. 2020/0367696, which is incorporated by reference in its entirety.

The drive coupling 226 can include a wall 236. The wall 236 can be annular in shape. The wall 236 can have a circular periphery. The wall 236 can extend in the axial direction away from the panel 242. The wall 236 can be spaced radially away from the connection port 228 to form a channel 238. The wall 236 can be positioned within the channel 196 of the blade housing 142 when assembled. The wall 236 can contact a radially outer surface of the inner wall 202 of the blade housing 142, which can help to inhibit or prevent ground food material from leaking through the opening 146 of the blade housing 142. The wall 236 of the drive coupling 226 and the inner wall 202 of the blade housing 142 can overlap each other in a radial direction. The inner wall 202 can be disposed in the channel 238 of the drive coupling 226 between the wall 236 and the connection port 228.

The drive coupling 226 can include one or more flanges 234, which can also be called wipers. The flanges 234 can extend radially outward from an outer surface of the wall 236. The flanges 234 can extend radially outward from the axis of rotation 145. The flanges 234 can be generally parallel to the axis of rotation 145. The flanges 234 can be disposed in the channel 196 of the blade housing 142 to move ground food material through the channel 196 and out of the exit ramp 198. The flanges 234 can have a size and shape that corresponds to the size and shape of the channel 196. The drive coupling 226 can include 1, 2, 3, 4, 5, 6, or more flanges 234.

Figure 7I:
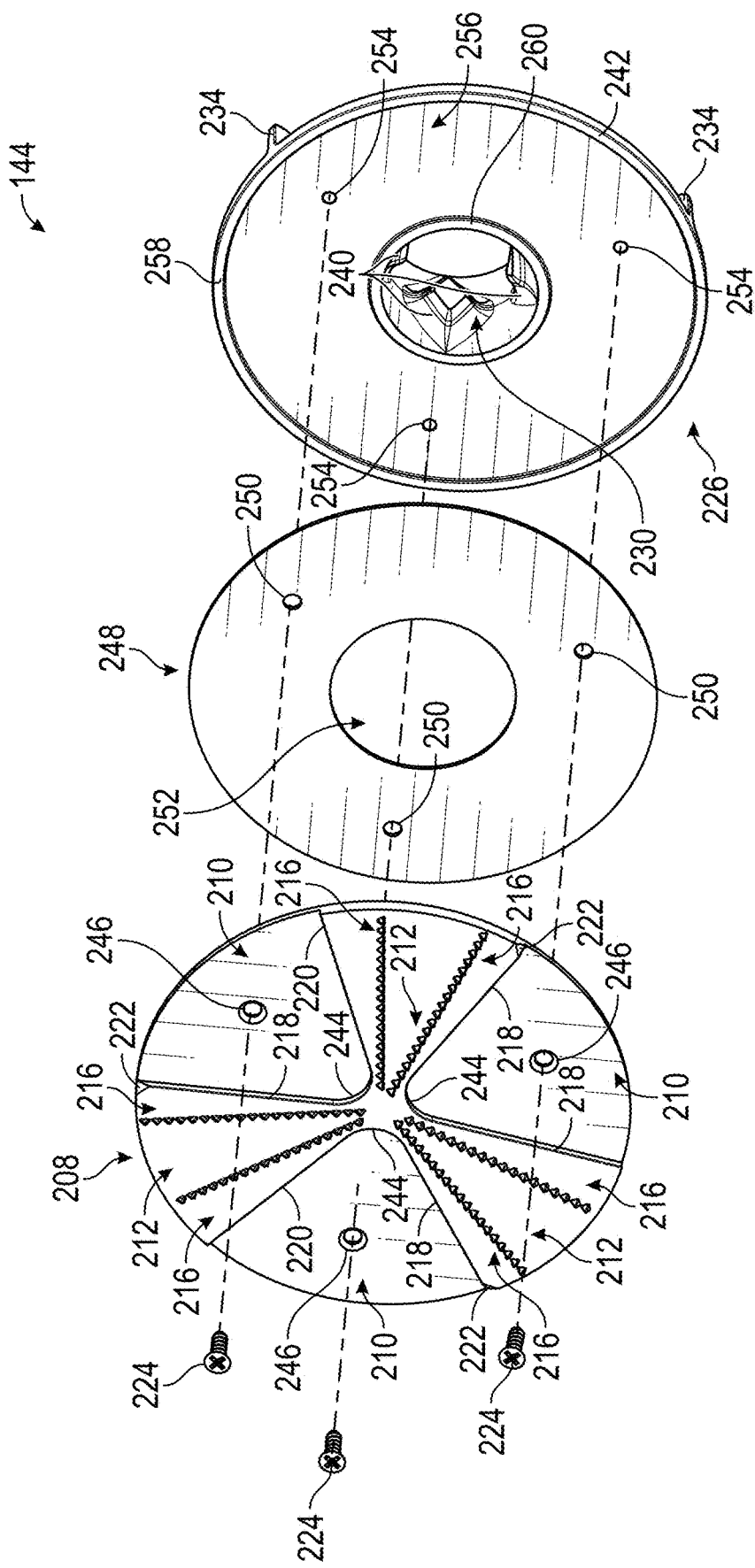
FIGS. 7I and 7J illustrate various views of the exploded blade unit.
Figure 7J:
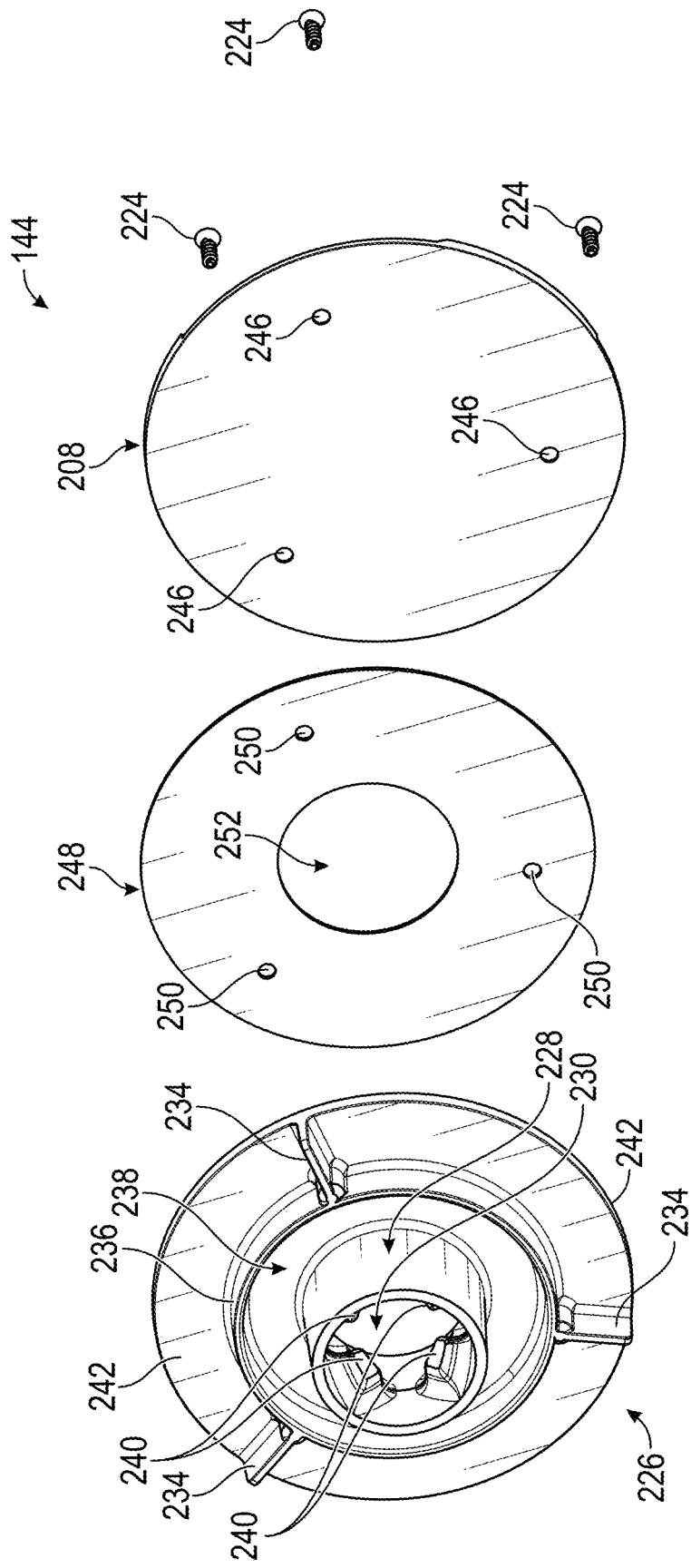
Figure 7K:
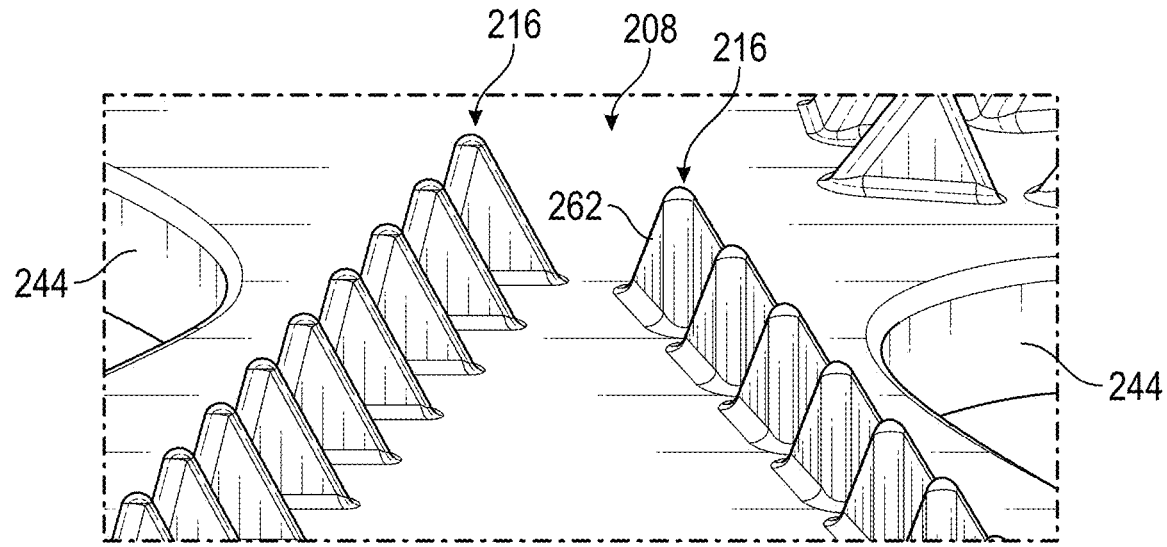
FIGS. 7K and 7L illustrate various views of teeth on the blade unit.
Figure 7L:
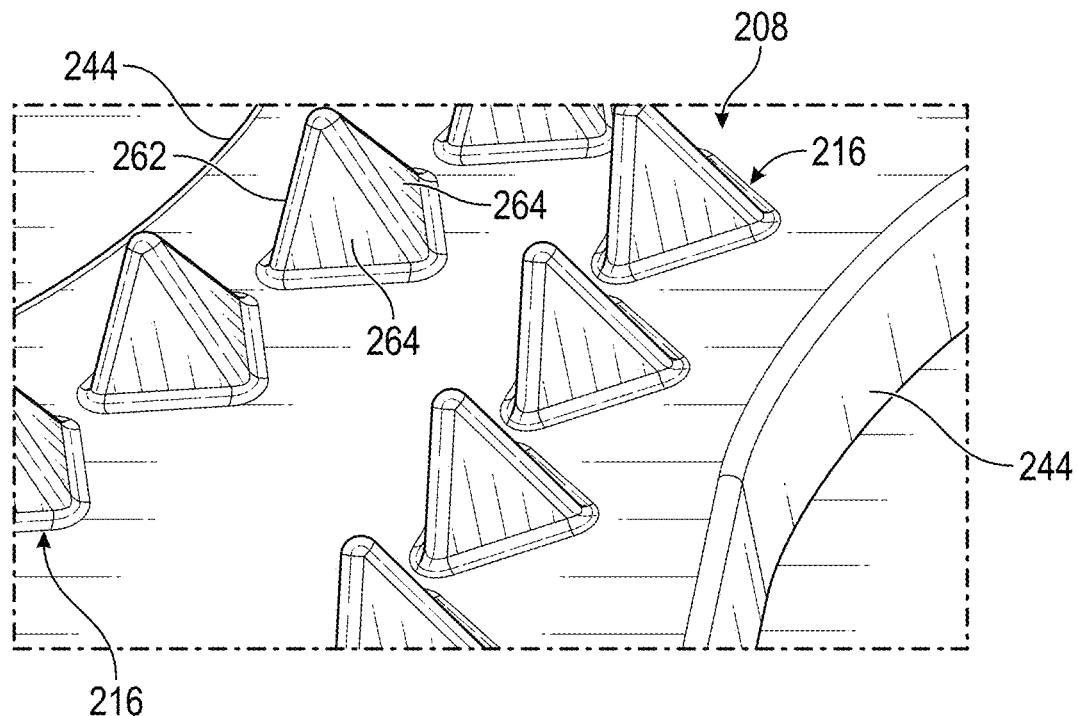

FIGS. 7I and 7J illustrate exploded views of the blade unit 144. As shown, the blade unit 144 can include a gasket 248. The gasket 248 can be disposed between the blade portion 208 and the drive coupling 226. In some embodiments, the gasket 248 provides a buffer and/or dampener between the drive coupling 226 and the blade portion 208. The drive coupling 226 can include a recessed portion 256 on a side facing the blade portion 208 when assembled. The recessed portion 256 can be sized and shaped to receive the gasket 248. The recessed portion 256 can be disposed inward of an outer rim 258 disposed proximate the outermost radial edge of the drive coupling 226 and outward of an inner rim 260 disposed around the receiving hole 230. The gasket 248 can be circular in shape. The gasket 248 can include a hole 252 to accommodate the receiving hole 230. The blade portion 208 can include holes 246, the gasket 248 can include holes 250, and the drive coupling 226 can include holes 254 to receive the fasteners 224 for coupling. In certain variants, the gasket 248 seals around the holes 246 to facilitate the liquid impermeability of the blade unit 144. The gasket can comprise rubber, plastic, or another material.

H. Motor Unit and Assembled Grinder Assembly—FIGS. 8, 9A, and 9B

Figure 8:
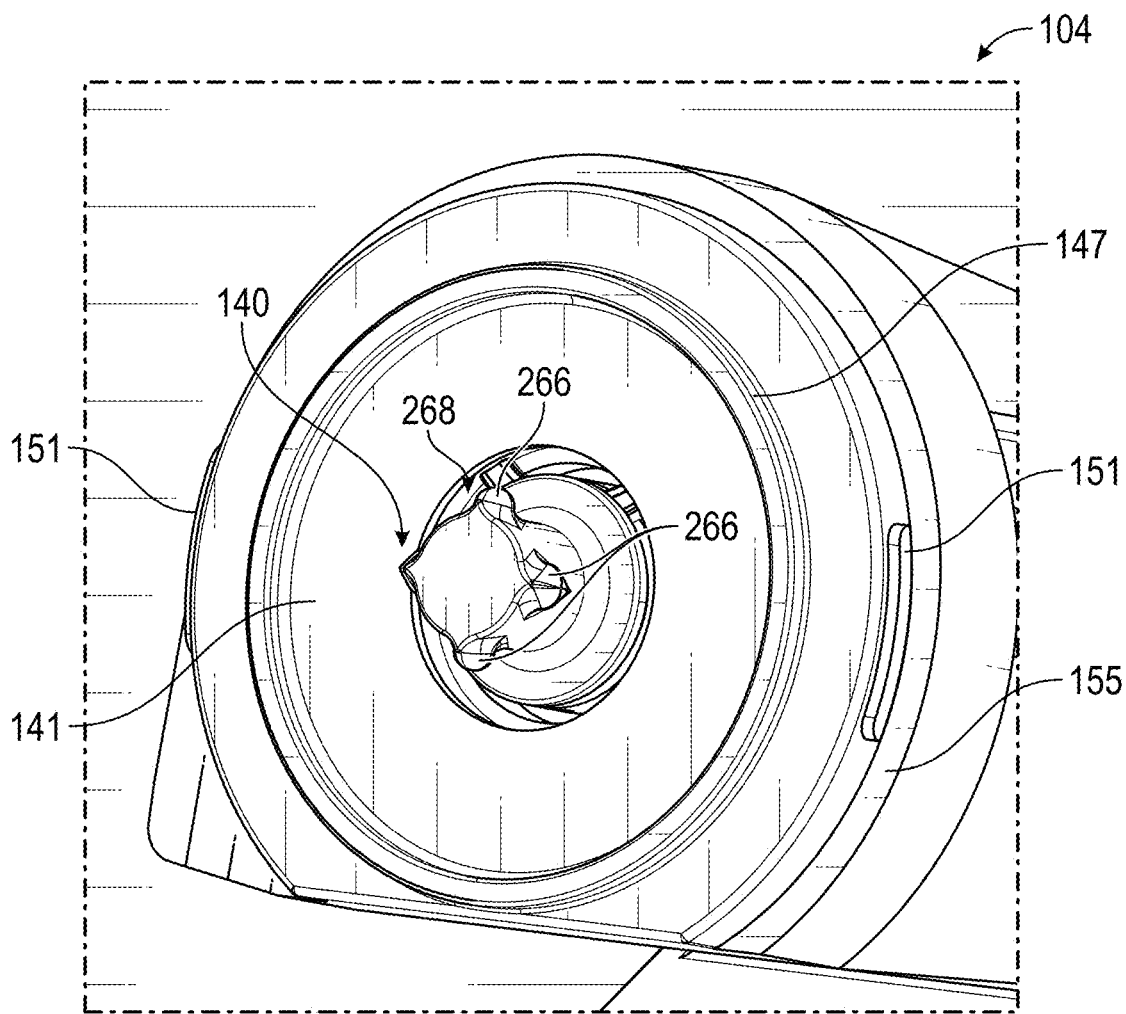
FIG. 8 illustrates the drive tip of the grinder assembly.

FIG. 8 illustrates the motor unit 104 and the drive tip 140 with the plurality of external protrusions 266. The external protrusions 266 can be distributed circumferentially around the drive tip 140, which can include being equidistantly spaced apart from each other. As described herein, the external protrusions 266 of the drive tip 140 can facilitate coupling of the drive tip 140 with the blade unit 144 as described herein.

The motor unit 104 can include a face 141, which can be referred to as a mounting face or surface. The motor unit 104 can include an annular wall 147, which can also be referred to as an annular ring. The annular wall 147 can be disposed on the face 141 and around the drive tip 140. The face 141 can include a recess 268 disposed around the drive tip 140. The motor unit 104 can include a shelf 155 extending around at least a portion of the face 141. The motor unit 104 can include a side wall 155 extending from the shelf 155 to the face 141 to space the face 141 away from the shelf 155. The cleats 151 can be disposed on the side wall 155. The cleats 151 can be arranged such that a longitudinal length of the cleats 151 extends along the side wall 155 in the direction of rotation of the drive tip 140.

Figure 9A:
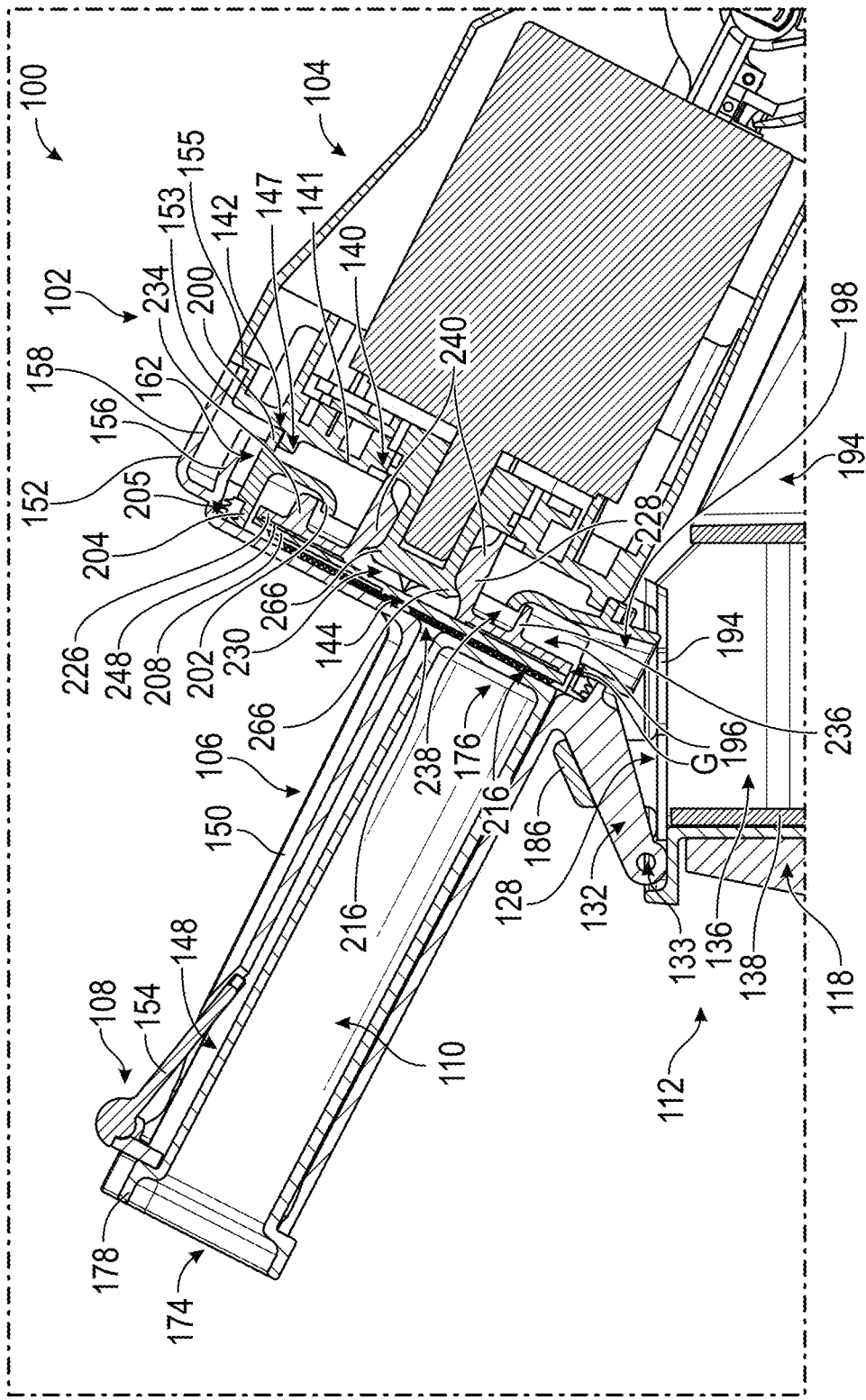
FIG. 9A illustrates a section view of the grinder assembly.

FIG. 9A illustrates a section view of features of the assembled grinder assembly 102 including the motor unit 104. The blade housing 142 can be disposed on the face 141 of the motor unit 104 such that the outer wall 200 of the blade housing 142 contacts the face 141 and is disposed around, which can include contacts, the annular wall 147 of the motor unit 104 and the drive tip 140 of the motor unit 104 is disposed through the opening 146 of the blade housing 142. The blade unit 144 can be positioned in the blade housing 142 such that the connection port 228 of the drive coupling 226 of the blade unit 144 extends through the opening 146 of the blade housing 142 to couple with the drive tip 140, the wall 236 of the drive coupling 226 of the blade unit 144 surrounds the inner wall 202 of the blade housing 142, and the flanges 234 of the drive coupling 226 of the blade unit 144 are disposed in the channel 196 of the blade housing 142. The base 152 of the hopper 106 can be positioned over the blade unit 144 and blade housing 142 such that the outer wall 158 of the base 152 contacts the shelf 155 of the motor unit 104. The hopper 106 can be rotated such that the catches 165 of the hopper 106 engage with the cleats 151 to securely couple the hopper 106 and the motor unit 104 together with the blade housing 142 and blade unit 144 in place for grinding. The gasket 204 in the groove 205 of the outer wall 200 of the blade housing 142 can contact the internal wall 156 of the base 152 of the hopper 106 to inhibit or prevent leaking of food material. With the grinder assembly 102 rotated down, the juicing device 100 can be ready for grinding.

Food material can be placed in the input chute 150 of the hopper 106. The food material can flow down the input chute 150 of the hopper 106 and toward the blade unit 144 by way of gravity. The pusher 110 can also be used to push food material down the input chute 150 and toward the blade unit 144. As shown, the pusher 110 is disposed in the input chute 150 of the hopper 106 such that the lip 178 of the first end 174 contacts the inlet end of the input chute 150 and the second end 176 of the pusher 110 is disposed at the outlet end of the input chute 150 and proximate the blade portion 208 of the blade unit 144. With the pusher 110 in the input chute 150, the splash guard 108 is rotated up such that the flange 154 of the splash guard 108 is in the aperture 148 in the wall of the input chute 150.

The food material can be disposed at the outlet of the input chute 150 and contact the rotating blade unit 144. The motor unit 104 can rotate the drive tip 140. The external protrusions 266 of the drive tip 140 can be engaged with the internal protrusions 240 of the connection port 228 of the drive coupling 226 of the blade unit 144 such that the rotation of the drive tip 140 drives the rotation of the blade unit 144. The motor unit 104 can drive the rotation of the blade unit 144 at various speeds, which can at least include 2500-3000 revolutions per minute. In some embodiments, the motor unit 104 can drive the rotation at less than or equal to about: 500, 1000, 1500, 2000, 2500, 3000, 3500, 4000, 4500, 5000, or more revolutions per minute or any value between any of the foregoing values. The first edges 218 of the raised platforms 212 and/or plurality of teeth 216 of the blade portion 208 of the blade unit 144 can grind, which can include chop, the food material as the blade unit 144 rotates. The blade portion 208 can be liquid impermeable so that the ground food material cannot flow therethrough. Instead, the ground food material can be moved (e.g., thrown, flung) radially outward and around the blade portion 208 of the blade unit 144 and into the channel 196 of the blade housing 142 due to the rotation of the blade unit 144. A gap G through which ground food material can pass can be present between the outer periphery of the blade unit 144 and the inner surface of the outer wall 200 of the blade housing 142 to permit the ground food material to move around the rotating blade unit 144 and into the channel 196 of the blade housing 142.

The ground food material can flow through the channel 196 of the blade housing 142, out of the blade housing 142 by way of the exit ramp 198, and into the interior 136 of the press chamber assembly 112 for pressing. The flanges 234 (e.g., wipers) of the drive coupling 226 of the blade unit 144 can push the ground food material through the channel 196 of the blade housing 142 toward the exit ramp 198. The exit ramp 198 can be positioned over the interior 136 of the press chamber 114 so that food falling from the exit ramp 198 goes directly into the interior 136 of the press chamber 114 for pressing.

Figure 9B:
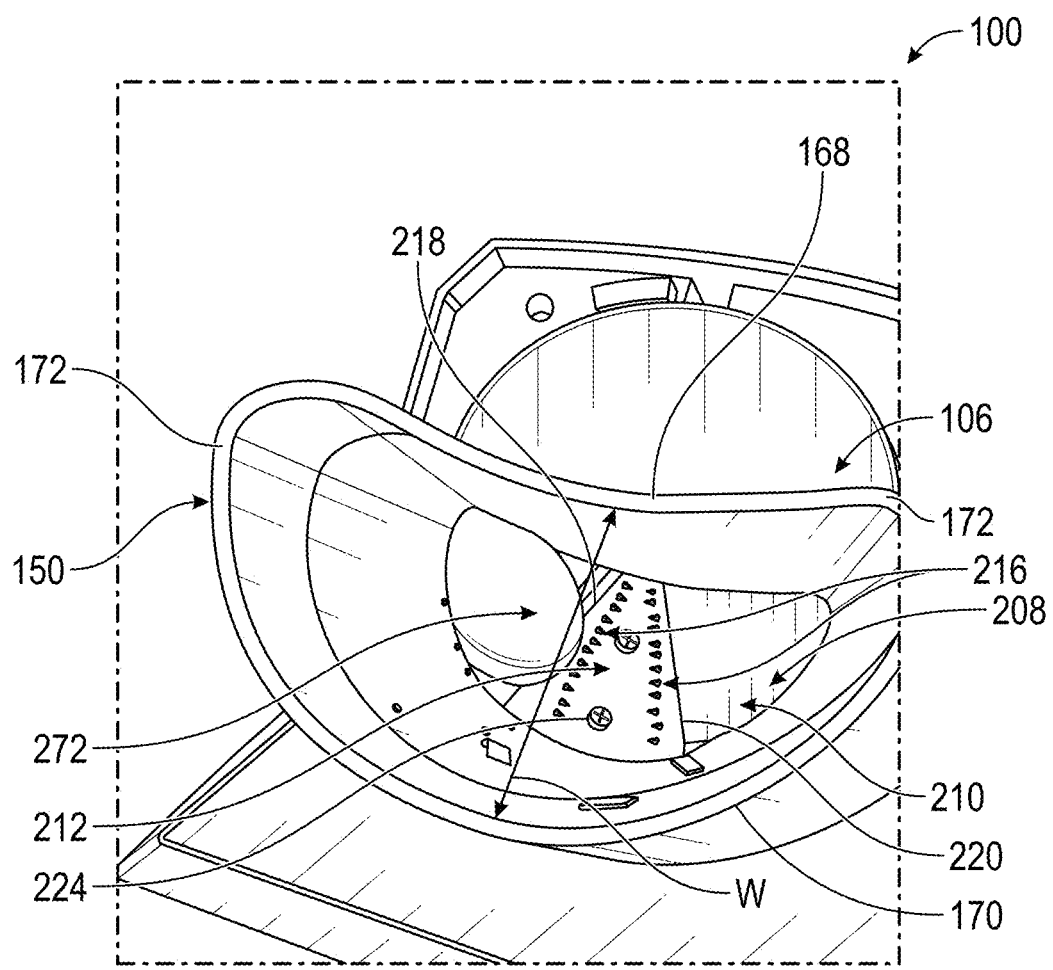
FIG. 9B illustrates a view down a chute of the hopper.

As shown in FIG. 9B, at least a portion of the first edge 218, second edge 220, and/or plurality of teeth 216 disposed on the raised platform 212 can be seen by the user through the input chute 150 of the hopper 106. The raised platform 212, recessed platform 210, first edge 218, second edge 220, and/or rows of the plurality of teeth 216 can extend a length in the radial direction relative to the axis of rotation that is at least as long as or longer than the width W of the input chute 150. The raised platform 212, recessed platform 210, first edge 218, second edge 220, and/or rows of the plurality of teeth 216 can extend beyond the inner periphery of the outlet of the input chute 150 (e.g., beyond what is visible by the user through the input chute 150) as the raised platform 212, recessed platform 210, first edge 218, second edge 220, and/or rows of the plurality of teeth 216 rotate past the outlet of the input chute 150. The raised platform 212, recessed platform 210, first edge 218, second edge 220, and/or rows of the plurality of teeth 216 can pass under the entirety of the cross-sectional flow area of the outlet of the input chute 150 and/or through the entirety of a projection of the cross-sectional flow area of the outlet of the input chute 150 in the direction of flow. As shown, food 272 in the input chute 150 can be pressed against the inner walls of the input chute 150 as the blade unit 144 spins to grind the food 272 down.

I. Press Chamber Assembly—FIGS. 10A-10E

Figure 10A:
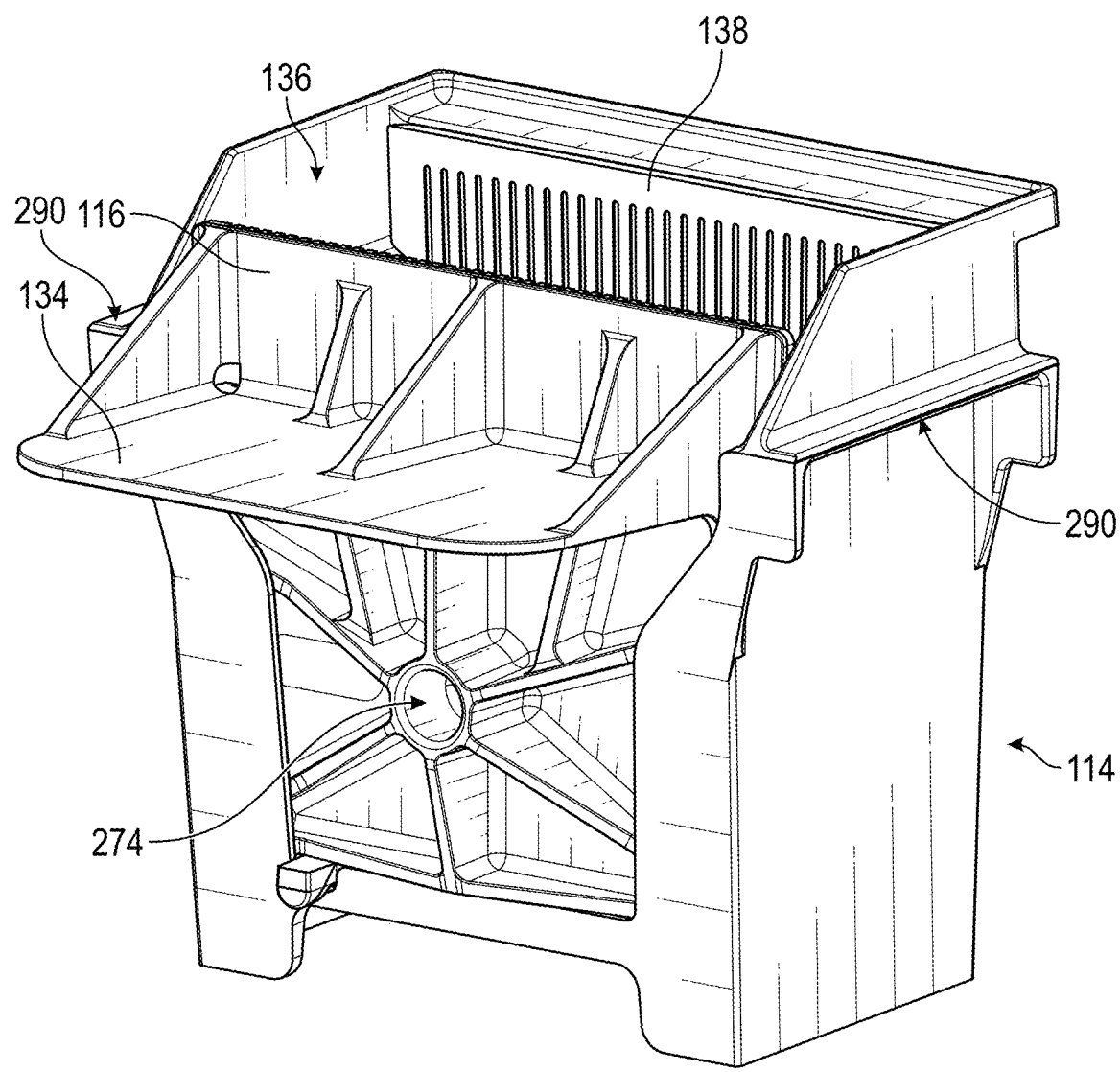
FIG. 10A illustrates a press box with a moveable platen and a comb insert.

FIG. 10A illustrates an assembled press chamber assembly 112, which can be referred to as a mechanical squeezer. The press chamber assembly 112 can include a press chamber 114, which can also be called a press box, moveable platen 116, and comb insert 138. The press chamber 114 can include handles 290 disposed on opposing sides that can support the press chamber assembly 112 on the frame arms 120 such that the press chamber assembly 112 is suspended over the drip tray 129. The press chamber assembly 112 can include an interior 136 accessible through an open top of the press chamber assembly 112 through which ground food material can enter for pressing.

To press the ground food material, the juicing device 100 can advance the moveable platen 116, disposed in the press chamber 114, toward an opposing wall of the press chamber 114 and/or the comb insert 138. The juicing device 100 can include a press shaft that can extend (e.g., advance) to engage and move the moveable platen 116, which can include extending the press shaft to engage a receiving recess 274 in the moveable platen 116. The moveable platen 116 can include a drip shield 134, which can also be described as a horizontal panel or shelf, extending from a rear of the moveable platen 116. As the moveable platen 116 advances, the drip shield 134 can catch ground food material falling from the exit ramp 198 of the blade housing 142 to inhibit or prevent ground food material from falling on the extended press shaft and/or elsewhere.

Figure 10B:
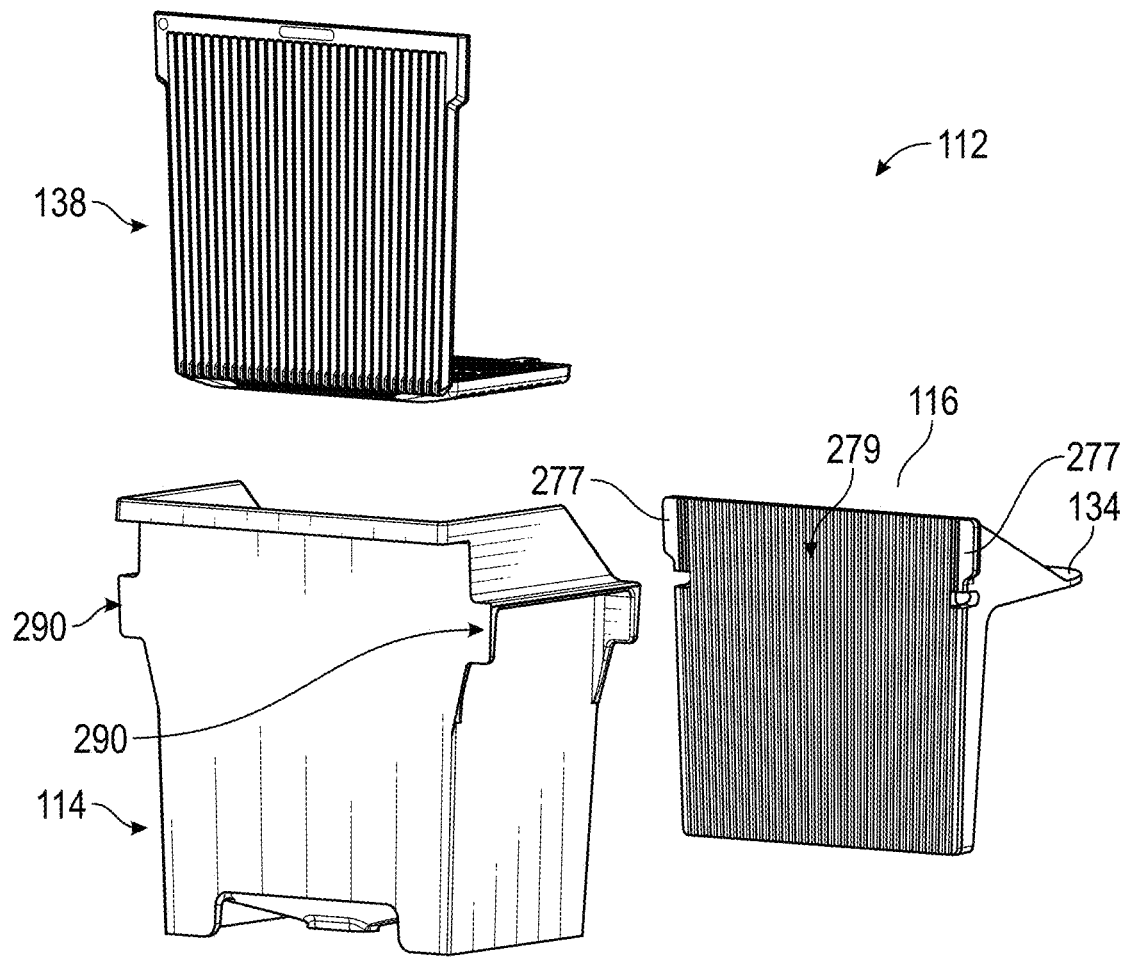
FIG. 10B illustrates the press box with the moveable platen and the comb insert removed.

FIG. 10B illustrates an exploded view of the components of the press chamber assembly 112. As shown, the press surface 279 (e.g., front) of the moveable platen 116 can include a plurality of grooves to direct the flow of juice downward toward a bottom of the press chamber 114. The plurality of grooves can be vertically oriented.

The moveable platen 116 can include flanges 277, which can include one flange 277 on one lateral side of the press surface 279 and another flange 277 on an opposite lateral side of the press surface 279. The flanges 277 can sit on rails of the press chamber 114 to support the moveable platen 116. For example, as the moveable platen 116 is pushed by the extending press shaft, the flanges 277 of the moveable platen 116 can slide along the rails of the press chamber 114 and support the moveable platen 116 in an upright position such that the press surface 279 pf the moveable platen 116 is generally parallel to an opposite front wall of the press chamber 114.

Figure 10C:
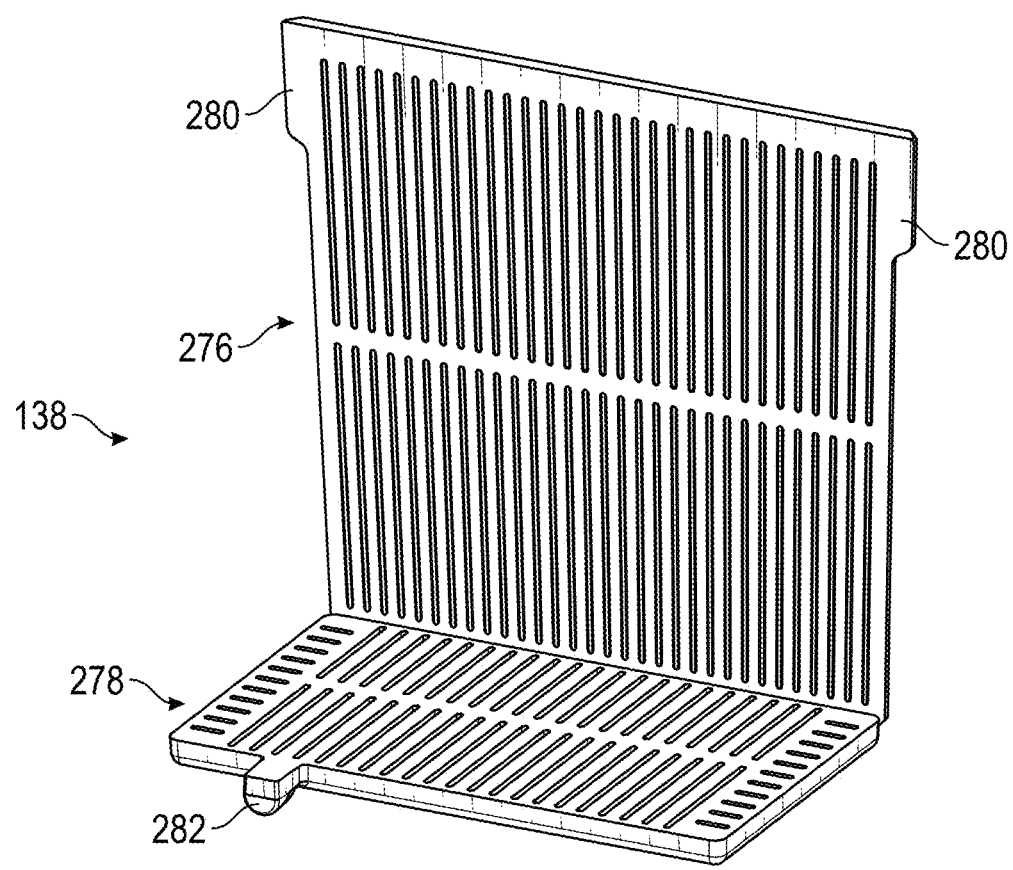
FIG. 10C illustrates the comb insert.

As shown in FIG. 10C, the comb insert 138 (which can also be called a drain insert, drain wall(s), drainage insert, or drainage panel(s)) can include a front comb 276 and/or a bottom comb 278 to facilitate juice drainage during pressing. The front comb 276 can be disposed between the press surface 279 of the moveable platen 116 and the front wall of the press chamber 114. The front comb 276 can include a plurality of channels to facilitate juice drainage, which can include vertically oriented channels. The channels can comprise through holes or blind holes (holes with bottoms). Similar to the moveable platen 116, the front comb 276 can include flanges 280 disposed on opposing lateral sides of the front comb 276 to support the front comb 276 in an upright position, which can include being generally parallel to the front wall of the press chamber 114.

The comb insert 138 can include a bottom comb 278. The bottom comb 278 can include a plurality of channels to facilitate juice drainage. The channels can comprise through holes or blind holes. The bottom comb 278 can be disposed generally perpendicularly relative to the front comb 276 and/or the front wall of the press chamber 114. The bottom comb 278 can be disposed at a bottom of the press chamber 114.

The front comb 276 and bottom comb 278 can be joined together by a hinge, which can include a living hinge. The bottom comb 278 can include a tab 282 that can be received into a notch of the press chamber 114 to secure the bottom comb 278 in the press chamber 114. The tab 282 can aid in positioning and/or securing the bottom comb 278 in the press chamber 114.

Figure 10E:
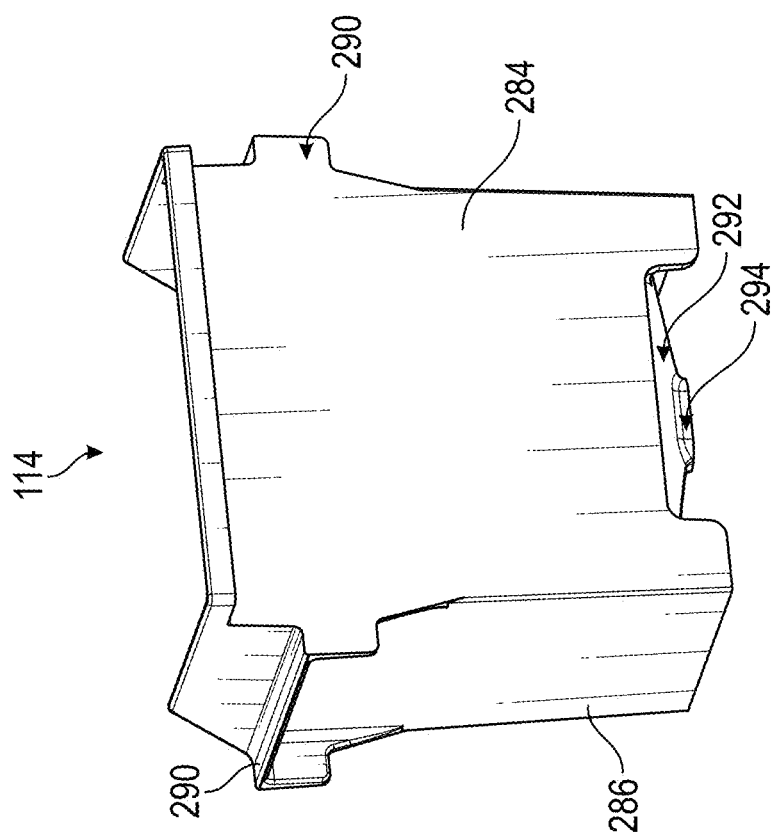
FIGS. 10D and 10E illustrate various views of the press box.
Figure 10D:
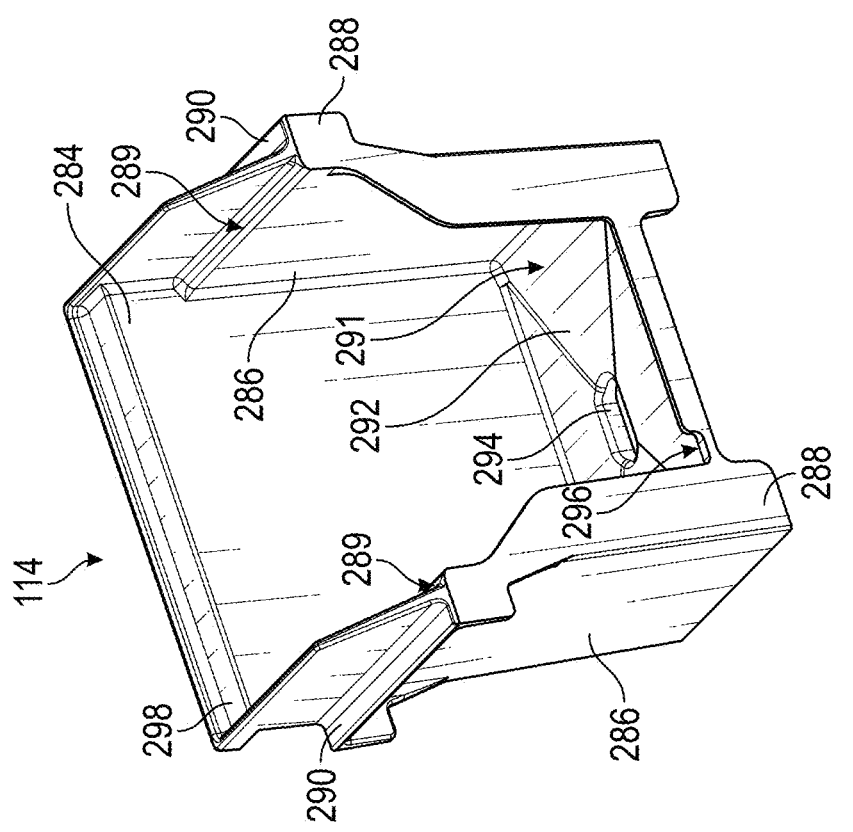

FIGS. 10D and 10E illustrate various views of the press chamber 114. The press chamber 114 can include a front wall 284, side walls 286, rear wall 288, and/or bottom wall 292. In some embodiments, the press chamber 114 comprises a unitary component, such as a unitary molded component. The press chamber 114 can be made of plastic or another material.

The front wall 284 can include a shelf 298, which can be a horizontal panel extending forward from a top portion of the front wall 284. The shelf 298 can support the support stand 132 of the hopper 106 with the grinder assembly 102 rotated downward.

The side walls 286 can include rails 289, which can also be referred to as ledges. The rails 289 can extend between the rear wall 288 and the front wall 284 of the press chamber 114. As described herein, the flanges 277 of the moveable platen 116 can slide along the rails 289 as the moveable platen 116 is advanced toward the front wall 284 of the press chamber 114. The flanges 280 of the front comb 276 can sit on the rails 289 to support the front comb 276 in an upright position.

The bottom wall 292 can extend between the bottom portions of the front wall 284, side walls 286, and rear wall 288. The bottom wall 292 can include an outlet 294 through which extracted juice can flow out of the press chamber 114. The bottom wall 292 of the press chamber 114 can include angled surfaces to direct the flow of extracted juice to the outlet 294.

The rear wall 288 can be disposed opposite the front wall 284. The rear wall 288 can include a recess 291 through which the press shaft can extend to advance the moveable platen 116 toward the front wall 284. The rear wall 288 can include can include a notch 296 to receive the tab 282 of the bottom comb 278 as described above. The moveable platen 116 can be retracted to abut the rear wall 288 in a fully retracted position.

In some embodiments, a juicing device 100 can include multiple press chambers that can be filled with ground food material from a single grinder assembly 102 or multiple. The press chambers describe herein can be used to press ground food material or unground food material, such as whole food, to extract juice.

J. Drip Tray—FIG. 11

Figure 11:
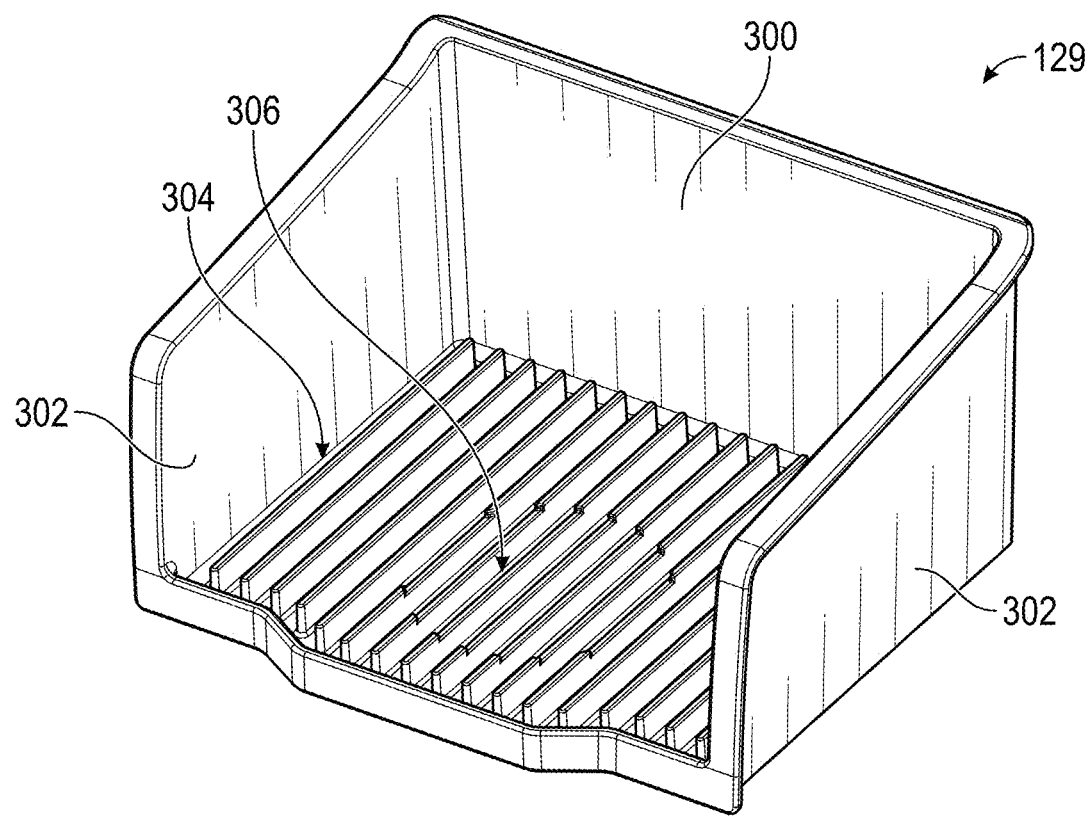
FIG. 11 illustrates a drip tray.

FIG. 11 illustrates a drip tray 129. The drip tray 129 can include a rear wall 300, side walls 302, and bottom wall 304. The bottom wall 304 can extend between the rear wall 300 and side walls 302. The bottom wall 304 can include a plurality of ribs, which can extend generally vertical such that spilled liquid flows between the ribs. The bottom wall 304 can include a placement indication 306 to indicate the proper placement of a vessel within the drip tray 129 to catch extracted juice flowing out of the outlet 294 of the press chamber 114. The placement indication 306 can include a recess, graphic, coloring, projection, and/or other feature to visually indicate to a user the correct placement of the vessel. The drip tray 129 can be disposed between the frame legs 126 of the juicing device 100. The drip tray 129 can be slid out from the frame legs 126 for convenient cleaning.

K. Press Cycle—FIGS. 12A-13

Figure 12A:
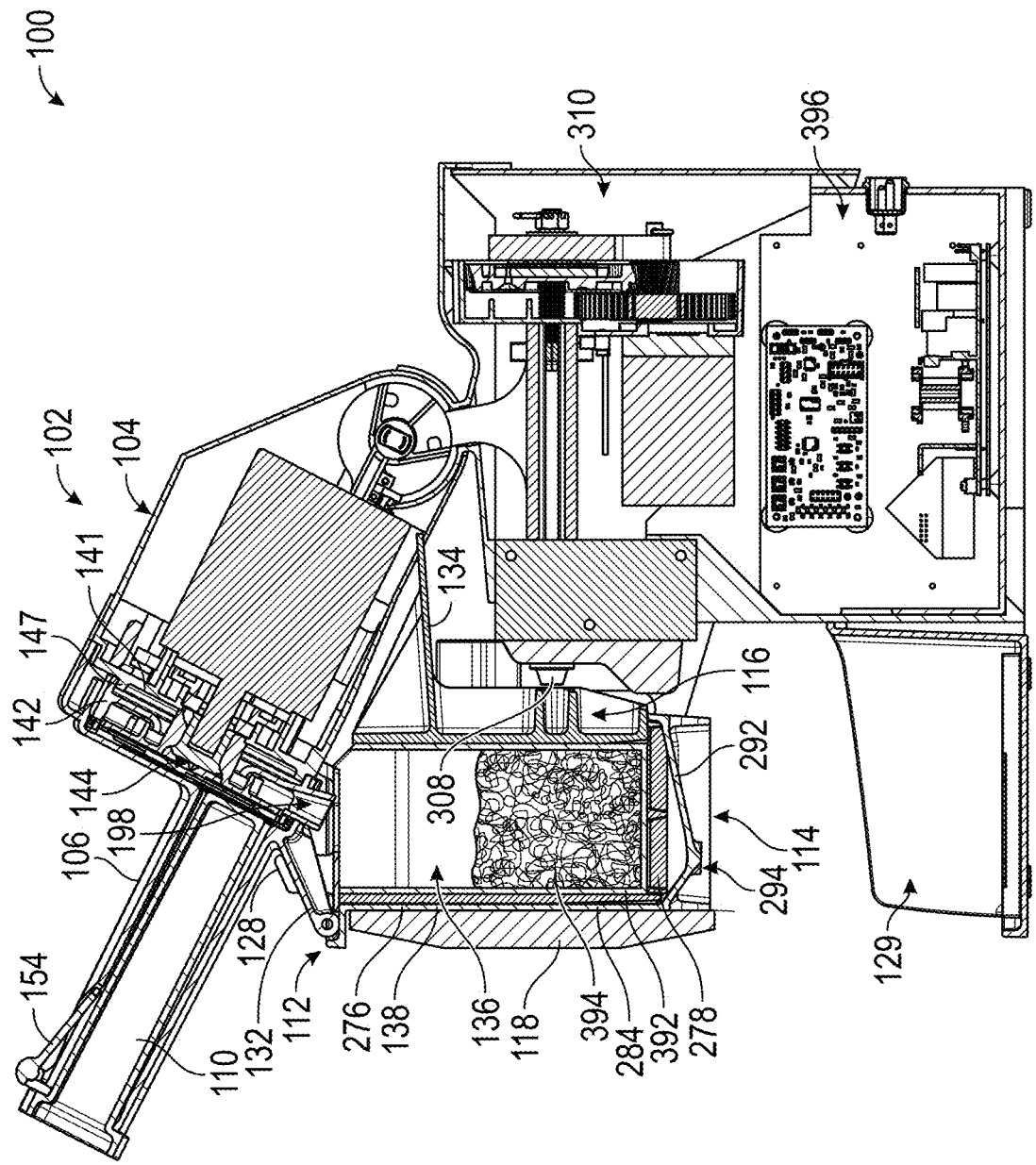
FIG. 12A illustrates a section view of the juicing device with a press shaft assembly in a retracted position.
Figure 12B:
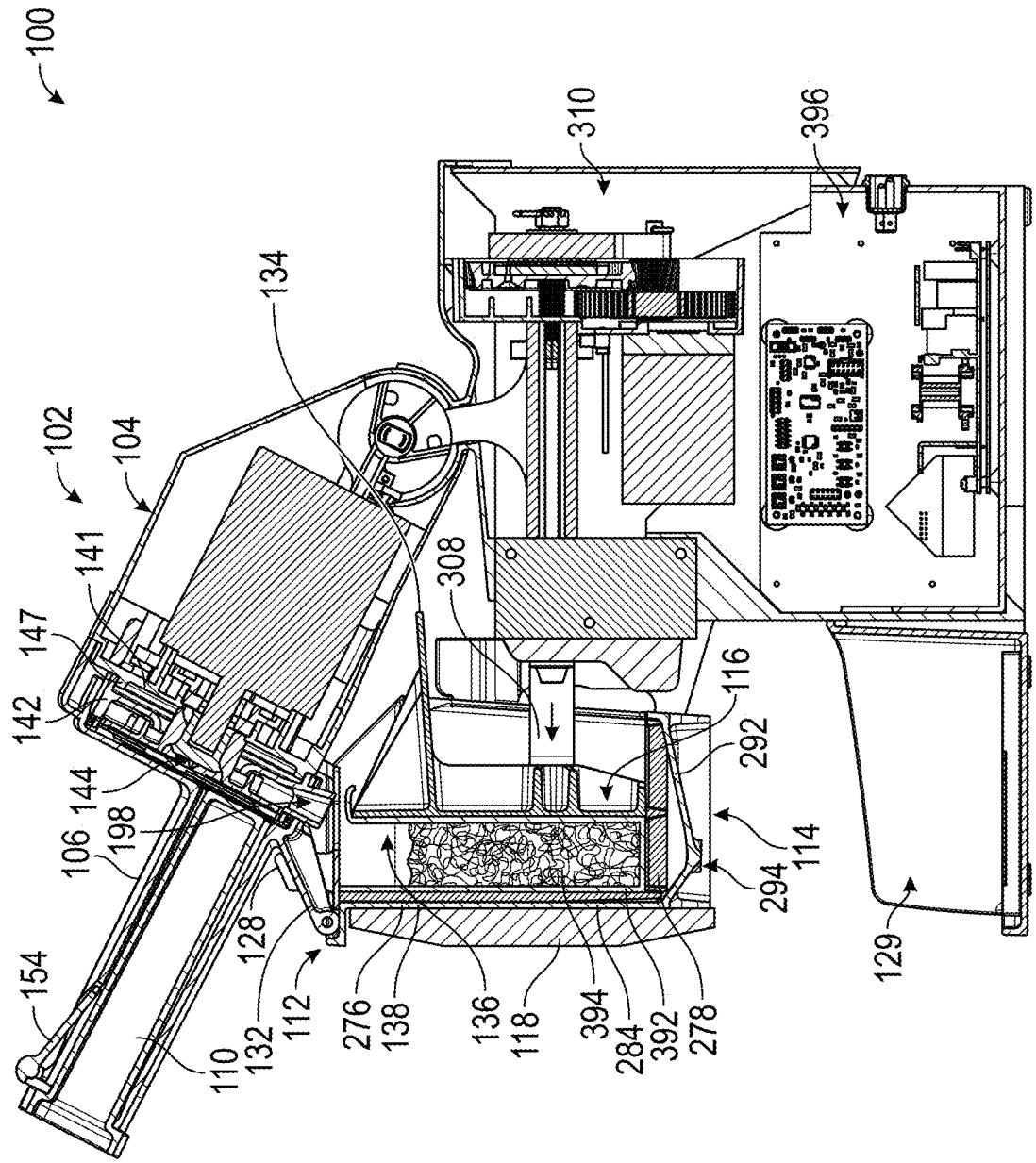
FIG. 12B illustrates a section view of the juicing device with the press shaft assembly in an extended position.

FIG. 12A illustrates a section view of the juicing device 100 with a press shaft assembly 308, also referred to as a press shaft, in a retracted position, which can be a fully retracted position. FIG. 12B illustrates a section view of the juicing device 100 with the press shaft assembly 308 in an extended position. The press shaft assembly 308 can have stroke length of less than or equal to about: 2, 2.5, 3, 3.5, 4, 4.5, 5, or more inches or any value between the foregoing. The extent of travel of the press shaft assembly 308 can be limited by an electronic switch such as a limit switch, hall effect sensor, or other device.

As shown in FIG. 12A, the press chamber assembly 112 can receive a filter bag 392, which can be a disposable filter bag, in the interior 136 of the press chamber assembly 112. The filter bag 392 can reduce the chance of, or ensure that no, unwanted particulate, such as indigestible fiber, flows into the extracted juice. The filter bag 392 can be disposed in the press chamber 114 and between the moveable platen 116 and front comb 276 of the comb insert 138. An opening into the filter bag 392 can be positioned below the exit ramp 198 to receive ground food material 394 from the exit ramp 198.

As shown in FIG. 12B, the press shaft assembly 308 can advance (e.g., extend) to engage and push the moveable platen 116 along a horizontal axis toward the front wall 284 of the press chamber 114, front comb 276 of the comb insert 138, and/or fixed platen 118 to press the ground food material 394 to extract juice. In various embodiments, the ground food material 394 is compressed between the moveable platen 116 and the front comb 276 of the comb insert 138 and/or fixed platen 118. During this process, the pressed ground food material 394 can tend to move upward within the press chamber 114 when pressed. As described herein, the overflow guard 128 can detect if an overflow occurs and a response action can be performed, such as stopping or slowing the advancement of the press shaft assembly 308.

As the ground food material 394 is pressed, extracted juice can flow toward the bottom wall 292 of the press chamber 114 and out of the press chamber 114 by way of the outlet 294. A vessel can be positioned below the outlet 294 and on the drip tray 129 to collect the extracted juice. The drip shield 134 of the moveable platen 116 can cover the press shaft assembly 308 as the moveable platen 116 is pushed forward.

As described herein, the press shaft assembly 308 can advance at different speeds, such as based on the position of the press shaft assembly 308. The movement of the press shaft assembly 308 can be carried out by an electric motor. The electric motor can comprise a stepper motor. In some embodiments, the juicing device 100 can recognize the location of the press shaft assembly 308 based on the steps taken by the stepper motor. The press shaft assembly 308 can advance at different speeds based on forces applied on the press shaft assembly 308. The press shaft assembly 308 can advance at different speed based on the quantity and type of food material being pressed. The force imparted by the stepper motor can be limited to a set maximum, to a variable maximum, or to several maxima that change during the course of the pressing operation (e.g., a first force maximum during a first pressing stage, a second force maximum during a second pressing stage, etc.).

The juicing device 100 can include electronic hardware 396, which can at least include processor(s), memory, controller(s), wireless communication interface(s), etc., to perform the tasks, methods, etc. described herein. The electronic hardware 396 can be configured to control operation of the juicing device 100, such as during a pressing operation.

Figure 13:
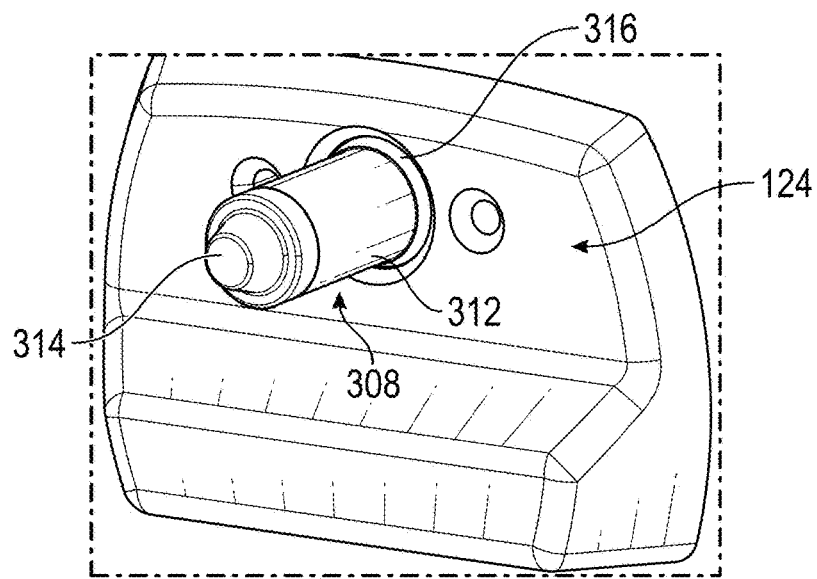
FIG. 13 illustrates the press shaft assembly extending from a housing of the juicing device.

As shown in FIG. 13, the press shaft assembly 308 can extend from the housing 124 of the juicing device 100. The press shaft assembly 308 can include an outer shaft 312 with a press shaft tip 314 disposed on an end thereof. The outer shaft 312 can have a periphery of various shapes, which can at least include circular, polygonal (e.g., square, rectangle, etc.), irregular, and/or others. The press shaft tip 314 can include a conical frustum shape, which can correspond to the size and shape of the receiving recess 274 of the moveable platen 116. The press shaft tip 314 can engage with the receiving recess 274 to push the moveable platen 116 within the press chamber 114. The press shaft tip 314 can be made of a polymer material. The outer shaft 312 can be retracted within the housing 124 and advanced from within the housing 124.

Figure 14A:
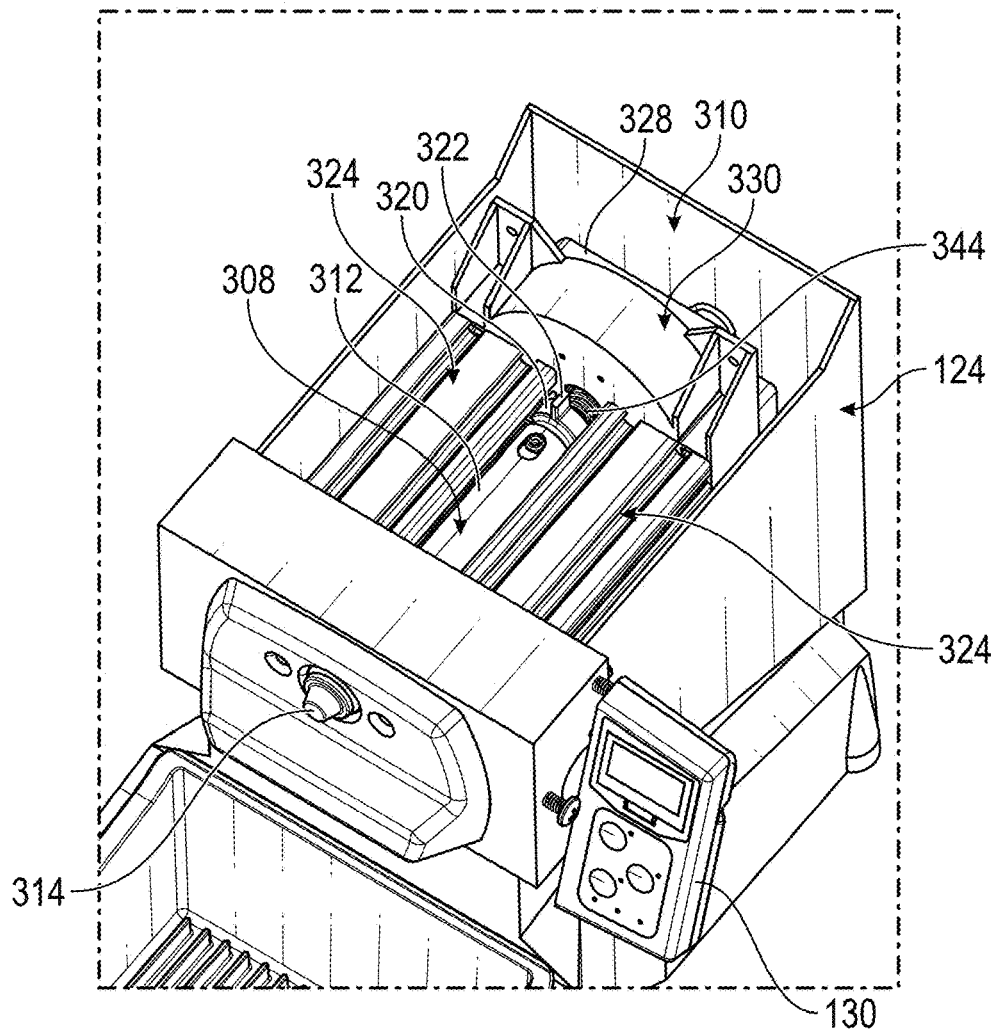
FIG. 14A illustrates the press shaft assembly and a linear actuator of the juicing device.

A wiper gasket 316 can be disposed in the housing 124 and around the outer shaft 312. The wiper gasket 316 can clean the outer shaft 312 as the outer shaft 312 is retracted into the housing 124. The wiper gasket 316 can be made of a polymer L. Linear Actuator—FIGS. 14A-14I FIG. 14A-14I illustrate a linear actuator 310 and components thereof that are configured to advance and retract the press shaft assembly 308. As shown in FIG. 14A, the linear actuator 310 can be housed inside of the housing 124.

The linear actuator 310 can include a gear housing 330 that houses a plurality of gears. The gears can be rotated by a stepper motor to rotate a lead screw 344. The rotating lead screw 344 can be supported by a plate 328 fixed at a position relative to the gear housing 330. The external threads of the lead screw 344 can engage with the internal threads of a nut 320, which can also be referred to as an internally threaded tube. The nut 320 can include flanges 322, which can also be referred to as fins. The flanges 322 can be disposed in channels of guide blocks 324 disposed in the housing 124 to inhibit or prevent rotation of the nut 320. With the rotation of the nut 320 restricted, the nut 320 can advance forward along the lead screw 344, which can include away from the plate 328. The outer shaft 312 of the press shaft assembly 308 can be coupled to the nut 320 such that the forward advancement of the nut 320 also forwardly advances the press shaft assembly 308.

Figure 14B:
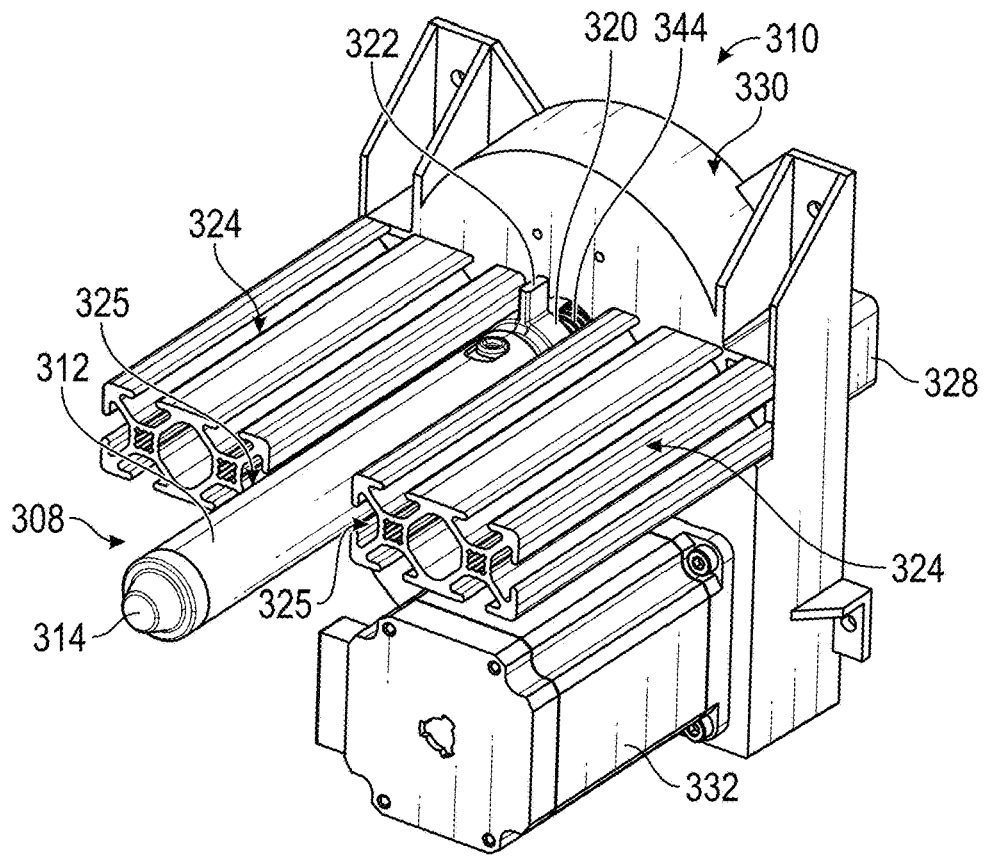
FIGS. 14B and 14C illustrate various views of the press shaft assembly and the linear actuator.
Figure 14C:
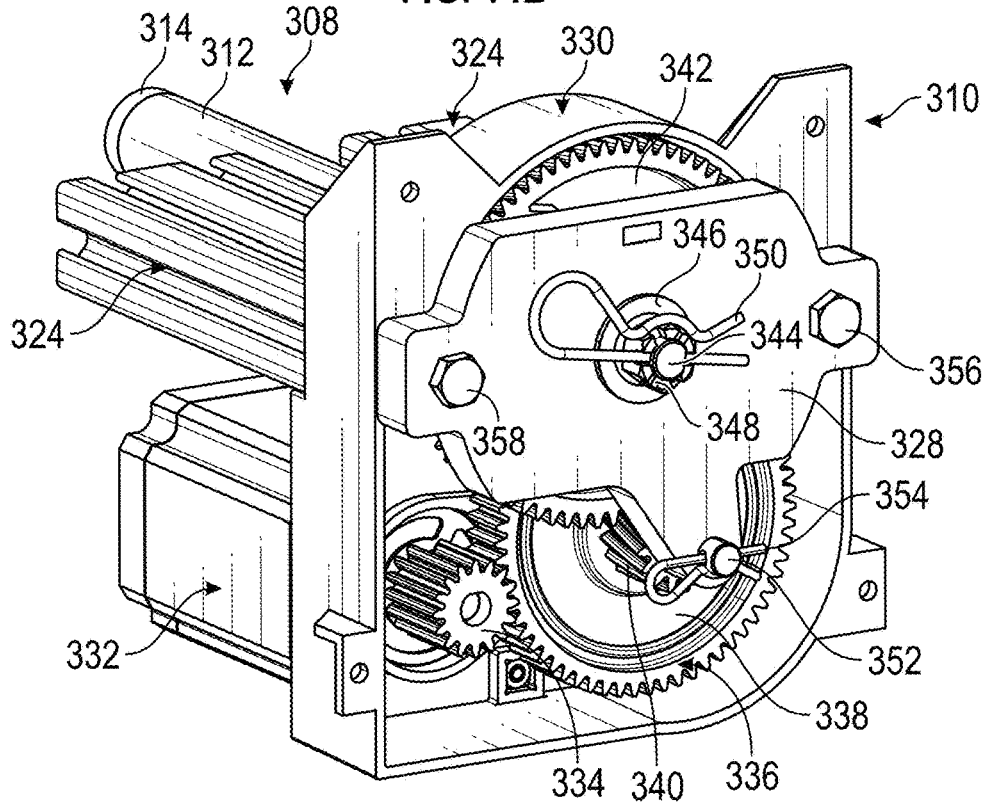

FIGS. 14B and 14C show the linear actuator 310 with the housing 124 removed. As shown in FIG. 14B, the guide blocks 324 can be coupled to the gear housing 330. The guide blocks 324 can include channels 325 that receive the flanges 322 of the nut 320 therein to inhibit or prevent rotation of the nut 320 to cause lateral movement of the nut 320 in a forward or rearward direction. The flanges 322 of the nut 320 can slide within the channels 325 of the guide block 324 as the nut 320 moves forward and backward.

The electric motor 332, which can be a stepper motor, can be coupled to the gear housing 330. As shown in FIG. 14C, the electric motor 332 can drive a motor gear 334, which can be a spur gear. The motor gear 334 my engage with and drive an idler gear 336. The idler gear 336 can be a double gear. The idler gear 336 can include an outer gear 338 and an inner gear 340. The outer gear 338 can be larger than the inner gear 340. The outer gear 338 can engage with the teeth of the motor gear 334 to be driven. The outer gear 338 can be a spur gear. The inner gear 340 can be a helical gear. The idler gear 336 can drive a lead screw gear 342. The inner gear 340 can drive the lead screw gear 342. The lead screw gear 342 can be a helical gear.

The idler gear 336 can be disposed on a pin 352, which can be a clevis pin, between the gear housing 330 and the plate 328. The idler gear 336 can be secured in place by a clevis pin 352. A bearing 353 can be disposed between the pin 352 and the idler gear 336. The lead screw gear 342 can be disposed on the lead screw 344 between the gear housing 330 and the plate 328. The lead screw gear 342 can be secured in place by a lock nut 348, which can also be referred to as a castle nut, and cotter pin 350 as shown. The lead screw gear 342 and the lead screw 344 can rotate together. A bearing 346 can be disposed in a hole 329 in the plate 328 between the plate 328 and the lead screw 344 to facilitate the rotation of the lead screw 344 relative to the plate 328.

Figure 14D:
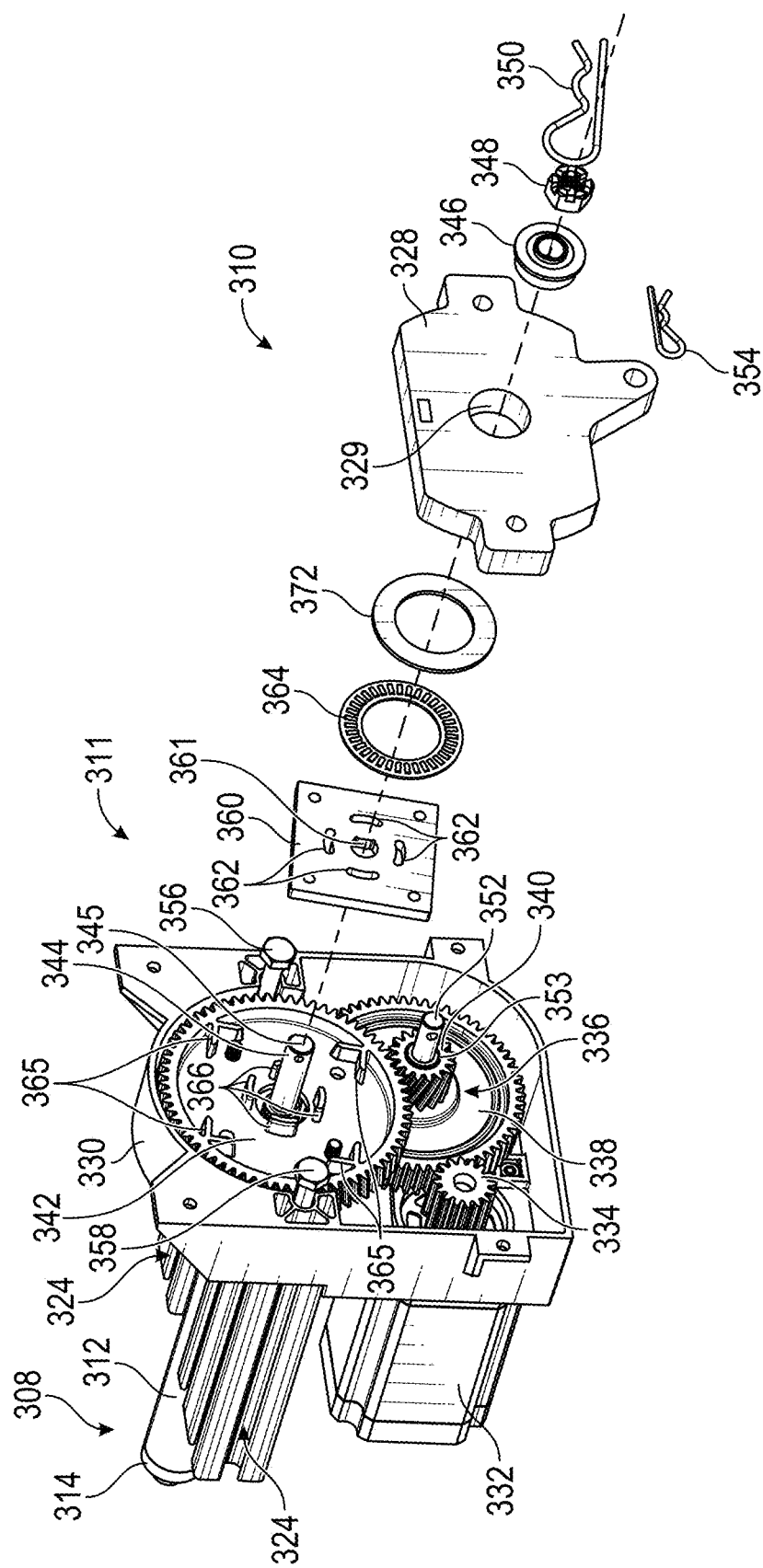
FIG. 14D illustrates an exploded view of components of the linear actuator.

As shown in the exploded view of the linear actuator 310 in FIG. 14D, the lead screw 344 can include a keyed end 345 that can extend into a keyed hole 361 of a drive plate 360 such that the rotation of the drive plate 360 and the lead screw 344 are tied together. The drive plate 360 and/or lead screw gear 342 can include various features to couple the rotation of the drive plate 360 with the lead screw gear 342. The drive plate 360 can be a square shape but others can be used such as other polygons (e.g., triangle, rectangle, etc.), irregular shapes, and/or others. The drive plate 360 can include holes 362, which can include elongate holes distributed about the keyed hole 361. The holes 362 can be sized and shaped to receive corresponding protrusions 366, which can be elongate protrusions, disposed on the lead screw gear 342 to couple the rotation of the drive plate 360 with the lead screw 344. The drive plate 360 can be fastened to the lead screw gear 342, which can include screwing or bolting the drive plate 360 to the lead screw gear 342. The lead screw gear 342 can include brackets 365 to secure the corners of the drive plate 360 to couple the rotation of the drive plate 360 with the lead screw 344.

The linear actuator 310 can include a bearing 364, such as a thrust needle roller bearing. The bearing 364 can facilitate rotation of the drive plate 360 relative to the fixed plate 328. The linear actuator 310 can include a washer 372 disposed between the bearing 364 and the plate 328. The plate 328 can be secured on the gear housing 330 with a screw 358 and a screw 356.

Figure 14E:
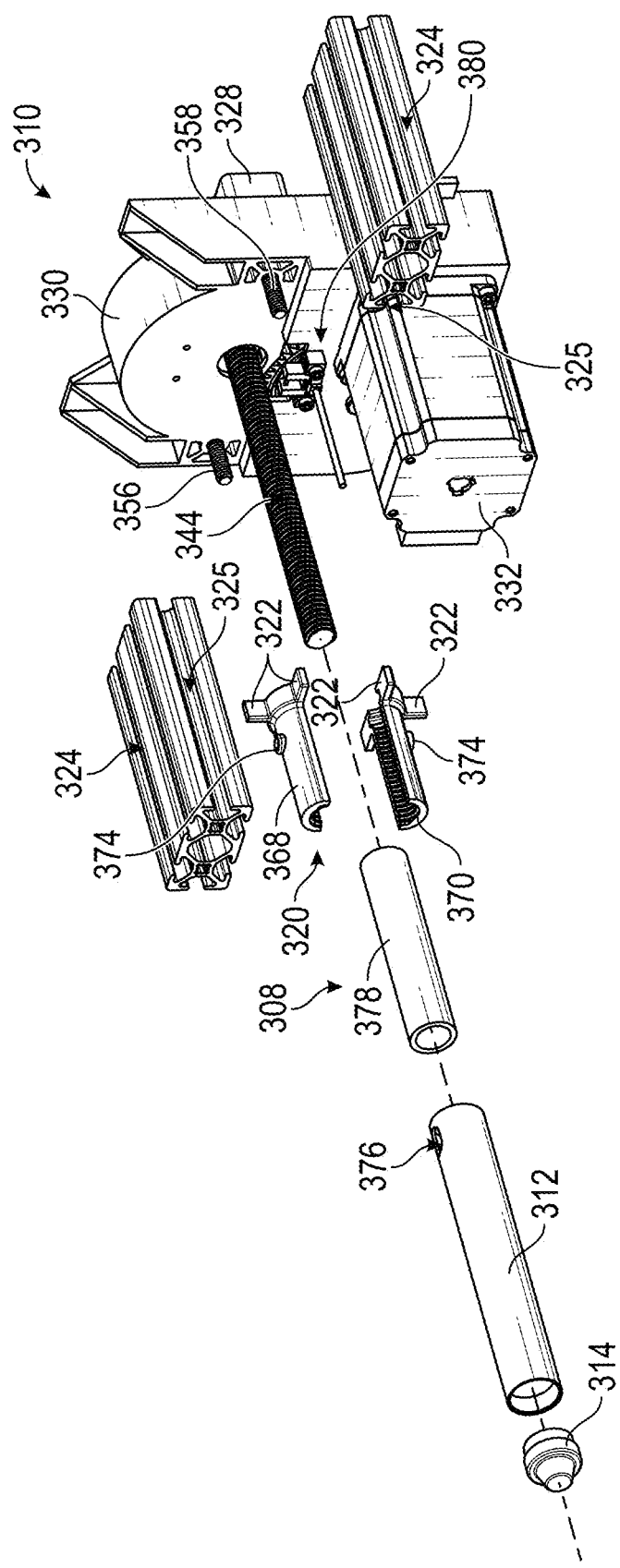
FIG. 14E illustrates an exploded view of the press shaft assembly.

FIG. 14E illustrates an exploded view of the press shaft assembly 308. As shown, the nut 320 can be split into a first portion 368 and a second portion 370, which can be two halves, for ease of manufacturing. Each of the first portion 368 and/or second portion 370 can include a plurality of flanges 322, which can include three flanges 322. The flanges 322 can extend generally perpendicularly relative to a longitudinal axis of the nut 320. At least some of the flanges 322, which can include those extending horizontally, can extend into the channels 325 of the guide blocks 324 to inhibit or prevent rotation of the nut 320 when the lead screw 344 rotates. The nut 320 can include protrusions that can extend through holes 376 in the outer shaft 312 to couple movement of the nut 320 with the outer shaft 312. In some embodiments, the nut 320 can be fastened to the outer shaft 312.

The press shaft assembly 308 can include an inner shaft 378 that can be disposed around the lead screw 344 and abut the nut 320 inside the outer shaft 312. The inner shaft 378 can provide additional structural support to the press shaft assembly 308. The inner shaft 378 can extend from the nut 320 to the press shaft tip 314. The inner shaft 378 can move with the nut 320.

The linear actuator 310 can include a sensor to detect when the press shaft assembly 308 is in the retracted (e.g., fully retracted) position. For example, the linear actuator 310 can include a light gate 380. As the press shaft assembly 308 is retracted by the linear actuator 310, a flange 322 of the nut 320 can enter into the light gate 380, signaling to the juicing device 100 that the press shaft assembly 308 is retracted. In response, the electric motor 332 can stop driving retraction of the press shaft assembly 308. FIG. 14I shows an enlarged view of the flange 322 positioned in the light gate 380. As shown, the light gate 380 can be coupled to the gear housing 330, which can include mounting the light gate 380 on a rod 384 coupled to the gear housing 330.

Figure 14F:
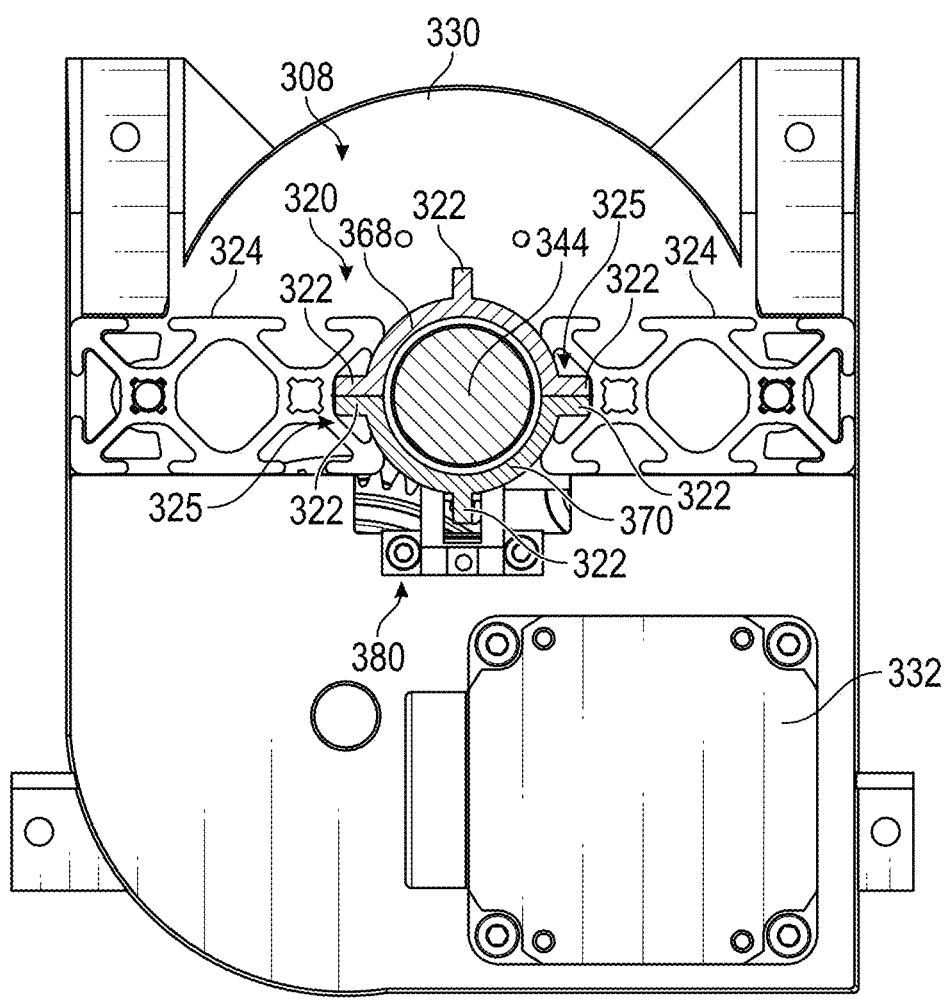
FIG. 14F illustrates a front section view of the press shaft assembly.

FIG. 14F shows a cross sectional view of the press shaft assembly 308. As shown, flanges 322 of the nut 320 are disposed in the channels 325 of the guide blocks 324 to inhibit rotation of the nut 320 such that rotation of the lead screw 344 drives forward and rearward movement of the nut 320 along the length of the lead screw 344, which causes extension and retraction of the press shaft assembly 308 to move the moveable platen 116.

Figure 14G:
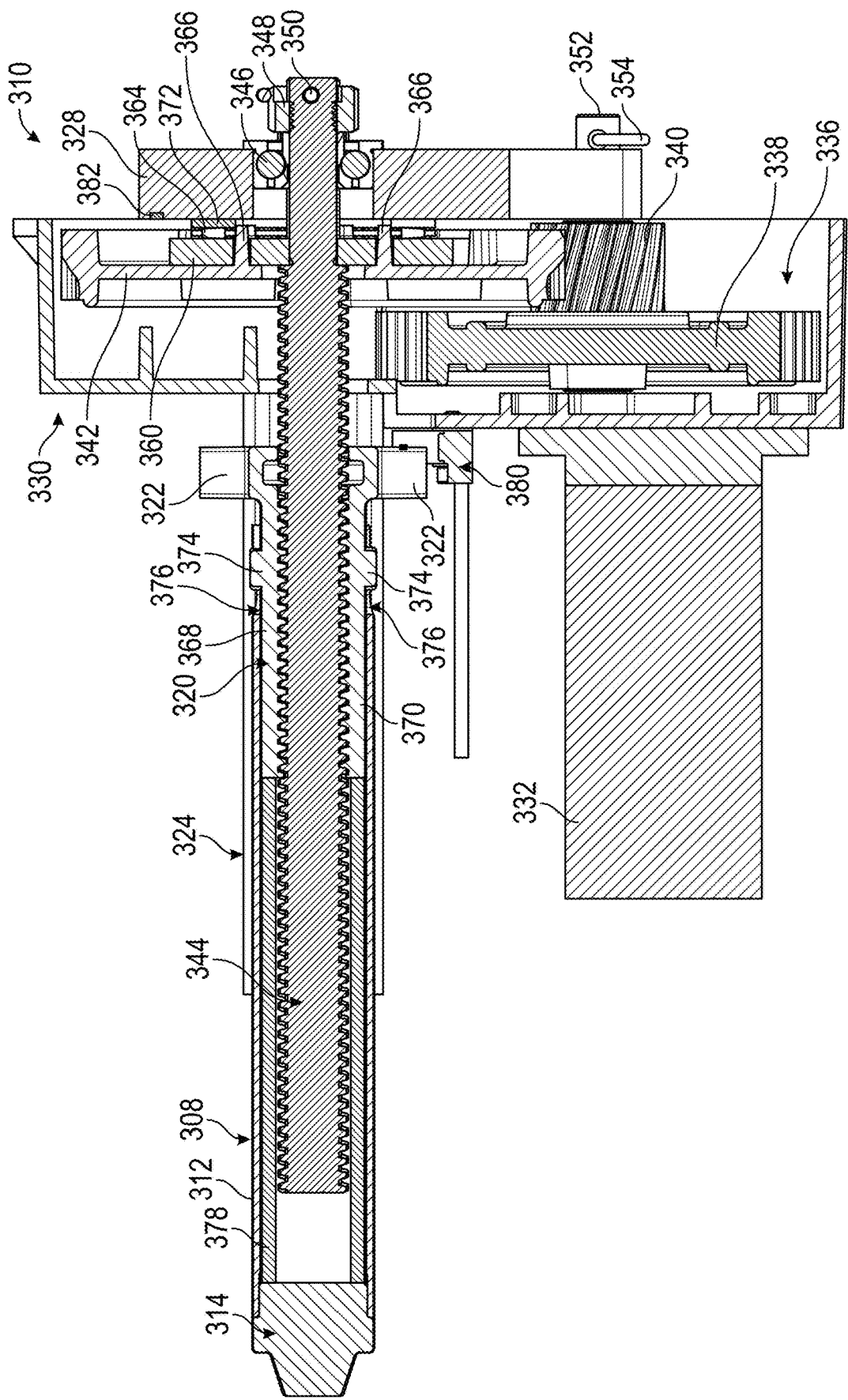
FIG. 14G illustrates a side section view of the linear actuator and the press shaft assembly in a retracted position.
Figure 14H:
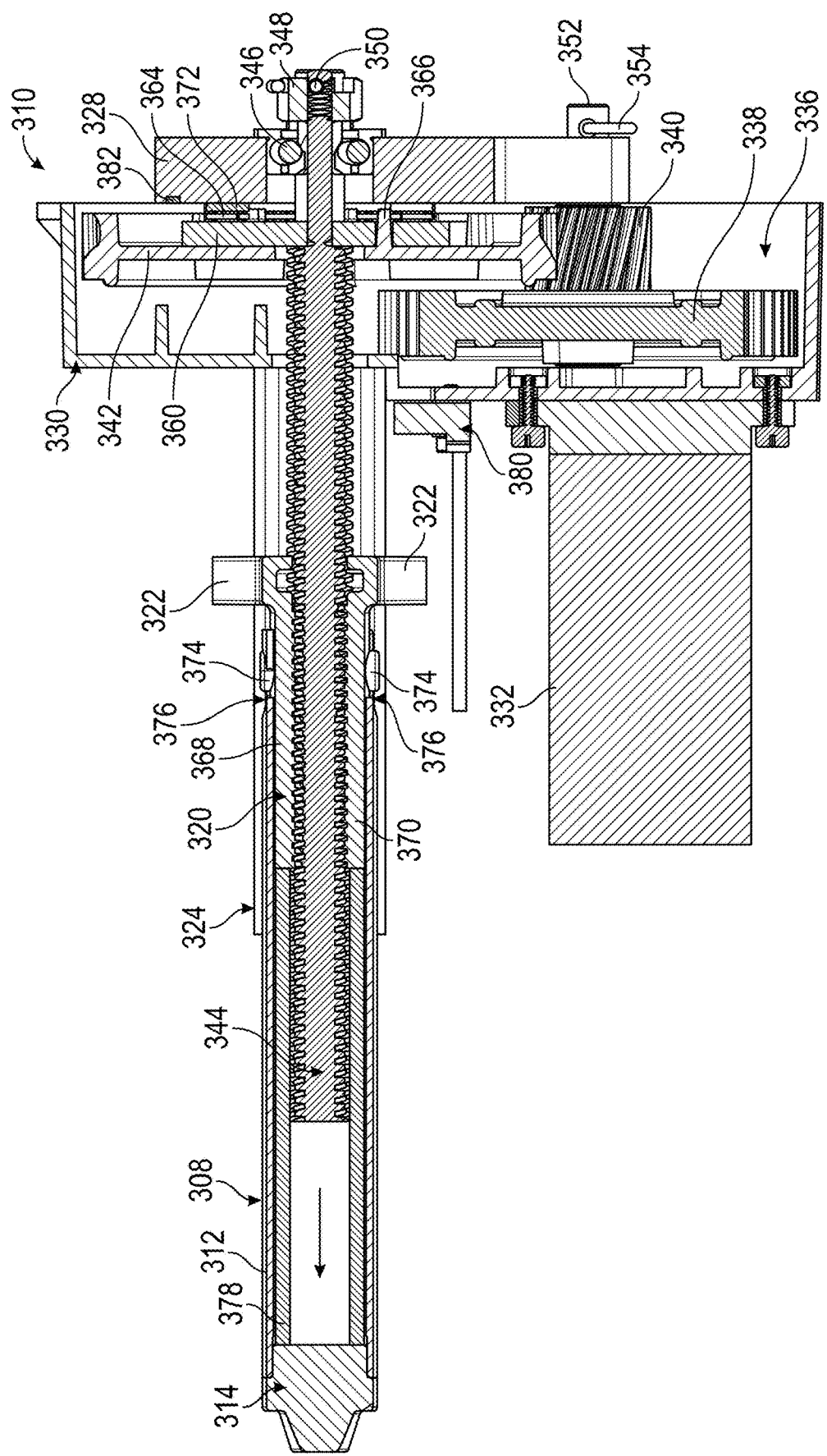
FIG. 14H illustrates the side section view of the linear actuator and the press shaft assembly in an extended position.
Figure 14I:
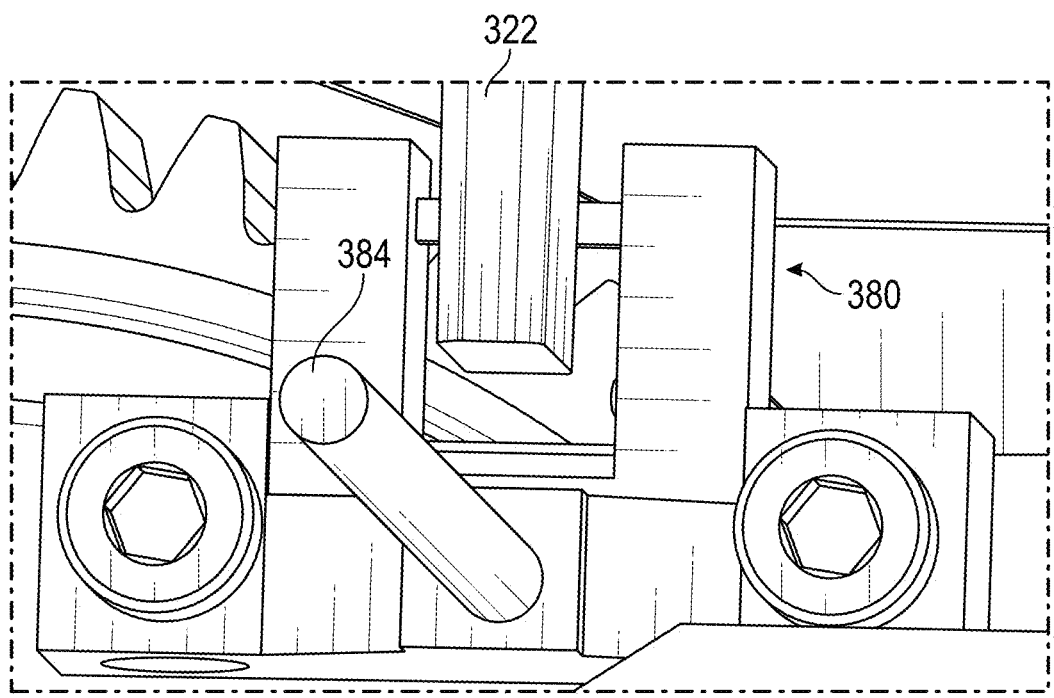
FIG. 14I illustrates a light gate of the juicing device.

FIG. 14G illustrates a section view of the linear actuator 310 with the press shaft assembly 308 retracted. FIG. 14H illustrates a section view of the linear actuator 310 with the press shaft assembly 308 advanced forward along the length of the lead screw 344. As described herein, the electric motor 332 can drive a motor gear 334. The rotation of the motor gear 334 can drive rotation of an idler gear 336. The rotation of the idler gear 336 can drive the rotation of the lead screw gear 342. The rotation of the lead screw gear 342 can be coupled with the lead screw 344 such that the lead screw 344 rotates with the lead screw gear 342. As the lead screw 344 rotates, the nut 320 is urged to rotate as well. However, the flanges 322 secured within the channels 325 of the guide blocks 324 inhibit the rotation of the nut 320 with the lead screw 344, causing the nut 320 to move forward or rearward along the length of the lead screw 344 depending on the direction of rotation of the lead screw 344. The nut 320 is coupled with the other features of the press shaft assembly 308 causing the press shaft assembly 308 to move with the nut 320 along the lead screw 344. The advancement and retraction of the press shaft assembly 308 can be along a horizontal axis.

An electronic sensor 382 can measure an amount of force applied to the press shaft assembly 308, and thus to the movable platen 116 and/or the food being pressed in the press chamber 114. For example, the electronic sensor 382 can be a strain gauge that can be disposed on the plate 328. As the press shaft assembly 308 pushes against the moveable platen 116 to compress ground food material, a reaction force from the advancing press shaft assembly 308 can be exerted through the press shaft assembly 308 to the plate 328, which can be by way of the drive plate 360 to the bearing 364 and washer 372 and to the plate 328. The plate 328 can deflect under the reaction force. The strain gauge can detect the deflection of the plate 328 and output a signal indicative of the deflection and/or the force. The deflection can be indicative of the amount of force exerted on the press shaft assembly 308.

Operation of the juicing device 100 can be controlled using the signal, such as by the electronic hardware 396. For example, the juicing device 100 can alter a press cycle, such as the speed of advancement or even pause advancement of the press shaft assembly 308, based on the signal of the amount of force on the press shaft assembly 308 and/or other features of the linear actuator 310. In several embodiments, the juicing device 100 can, if the amount of force exceeds a limit, pause or otherwise alter a press cycle (e.g., slow advancement of the press shaft assembly 308).

In some embodiments, the juicing device 100 can use pneumatics and/or hydraulics to advance and retract the press shaft assembly 308. In some embodiments, the press shaft assembly 308 or other feature of the juicing device 100 can include a compressible spring system that compresses to trigger a switch when certain forces are applied to the press shaft assembly 308. In some embodiments, a potentiometer can be used to measure force applied to the press shaft assembly 308.

M. Basin—FIG. 15

Figure 15:
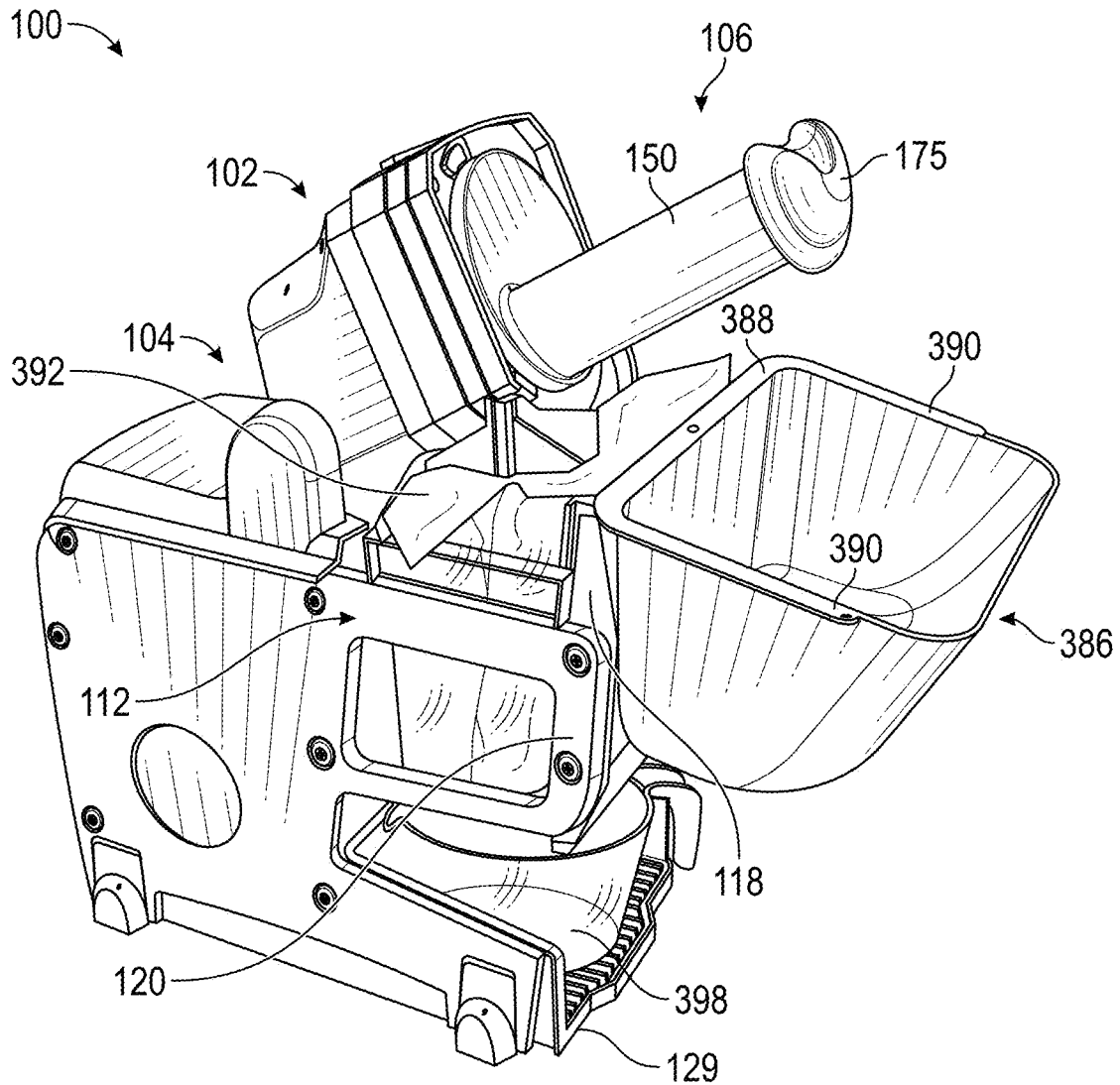
FIG. 15 illustrates a bin attached to the juicing device.

FIG. 15 illustrates a basin 386, which can also be referred to as a bin or receptacle. The basin 386 can be removably coupled to the fixed platen 118. The basin 386 can be positioned forward of the fixed platen 118 and under the inlet of the input chute 150. In some embodiments, a vertical line from an inlet of the input chute 150 intersects the interior of the basin 386. The basin 386 can hang from the fixed platen 118. The basin 386 can include a lip 388 or one or more hooks, arms, latches, or other feature that couples to a top edge of the fixed platen 118. The lip of the basin 386 can be cantilevered from the top edge of the fixed platen 118. A sidewall of the basin 386 can press against a front of the fixed platen 118. In some embodiments, the basin 386 can be removably coupled to the frame arms 120. The basin 386 can include one or more handles 390 to enable a user to lift the basin 386 off the fixed platen 118. In some embodiments, the handles 390 are a continuation of the lip 388 used to removably couple the basin 386 to the fixed platen 118. The basin 386 can catch food material overflowing from the input chute 150 and/or enable the user to conveniently hold food material that will be fed into the input chute 150 for juicing. The basin 386 can be used to batch and weight food material. The basin 386 can be positioned lower (e.g., at an elevation lower than) the blade unit 144, hopper 106, input chute 150 of the hopper 106, and/or pusher 110.

N. Method of Executing Press Cycle—FIG. 16

Figure 16:
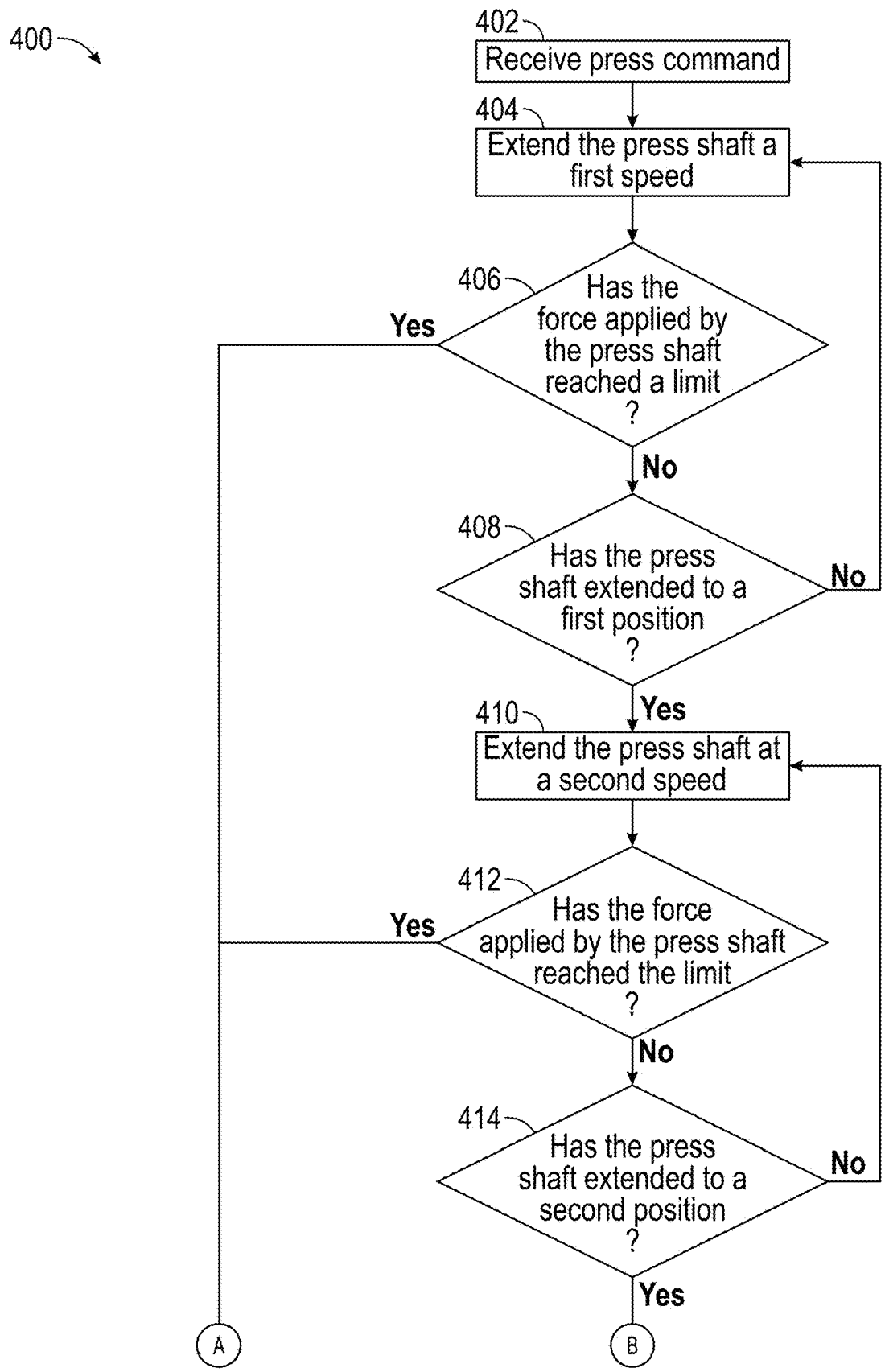
FIG. 16 illustrates a method of executing a press cycle of the juicing device.
Figure 16:
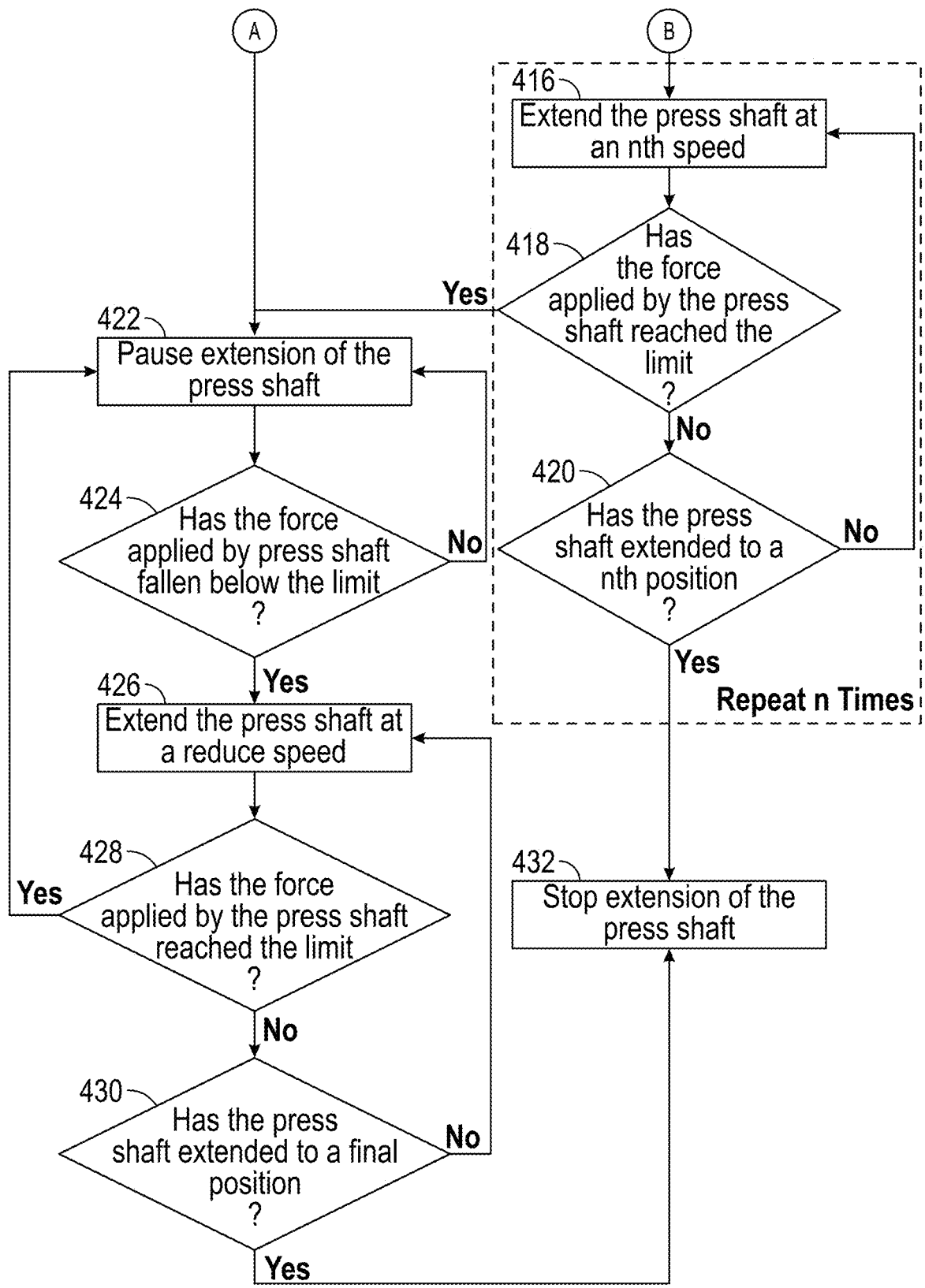

FIG. 16 illustrates a method 400 for executing a press cycle with the juicing device 100. The method can be performed under the control of the electronic hardware 396. The flow diagram is provided for the purpose of facilitating description of aspects of some embodiments. The diagram does not attempt to illustrate all aspects of the disclosure and should not be considered limiting.

The method 400 begins at block 402, wherein the juicing device 100 receives a press command from a user. As described herein, the user interface 130 can include a button or other feature through which the user can command the juicing device 100 to commence a press cycle.

The method 400 continues to block 404, wherein the juicing device 100 extends the press shaft assembly 308 at a first speed. As described herein, the press shaft assembly 308 can be extended by the linear actuator 310. The first speed can be less than or equal to about: 5, 6, 7, 8, 9, 10, 11, 12, or more inches per minute or any value between any of the foregoing. The extended press shaft assembly 308 can contact and push the moveable platen 116 to press ground material in the press chamber assembly 112.

The method 400 continues to decision state 406, wherein juicing device 100 (e.g., controller) determines if the force applied by the press shaft assembly 308 has reached a limit. As described herein, the juicing device 100 can include an electronic sensor 382, such as a strain gauge to monitor the amount of force applied to the press shaft assembly 308 as described herein. For example, a strain gauge can be disposed on the plate 328 to detect deflection of the plate 328 that is indicative of the force applied thereto. The limit can be less than or equal to about: 1000, 1100, 1200, 1300, 1400, 1500, 1600, 1700, 1800, 1900, 2000, 2100, 2200, 2300, or more pounds or any value between any of the foregoing.

If the limit is reached at decision state 406, the method 400 can continue to block 422 and the juicing device 100 can reduce the speed or pause the extension of the press shaft assembly 308.

The method 400 can then proceed to decision state 424 and the juicing device 100 can determine if the force applied by the press shaft assembly 308 has fallen below the limit, which can be the same the limit as referenced at decision state 406 or different. If the force has not fallen below the limit, the method 400 returns to block 422.

If the force has fallen below the limit, the method 400 can proceed to block 426 and the juicing device 100 extends the press shaft assembly 308 at a reduced speed, which can be less than the first speed. The reduced speed can be less than or equal to about: 0.1, 0.15, 0.2, 0.25, 0.3, or more inches per minute.

The method can then continue to decision state 428 and the juicing device 100 determines if the force applied by the press shaft assembly 308 has once again reached the limit. If the force has reached the limit, the method 400 can return to block 422 and the juicing device 100 can reduce the speed or pause extension of the press shaft assembly 308.

If the force has not reached the limit, the method 400 can continue to decision state 430 and the juicing device 100 can determine if the press shaft assembly 308 has extended to a final position, which can correspond to a maximum stroke length. The final position can correspond to a stroke length of less than or equal to about: 2, 2.5, 3, 3.5, 4, 4.5, 5, or more inches for the press shaft assembly 308. If the press shaft assembly 308 has not extended to the final position, the method 400 can return to block 426.

If the 308 has extended to the final position, the method 400 can proceed to block 432 and the juicing device 100 can stop extension of the press shaft assembly 308 to complete the press cycle. In some embodiments, the juicing device 100 can determine that the press shaft assembly 308 has been moved to an extended (e.g., fully extended) position by the steps taken by the stepper motor of the linear actuator 310 and/or by a light gate or other position sensor.

If the limit is not reached at decision state 406, the method 400 can continue to decision state 408. At decision state 408, the juicing device 100 can determine if the press shaft assembly 308 has extended to a first position. The first position can correspond to less than or equal to about: 0.5, 0.6, 0.7, 0.8, 0.9, 1.0, 1.1, 1.2, 1.3, 1.4, or more inches from the fully retracted position or any value between any of the foregoing values. If the press shaft assembly 308 has not been extended to the first position. The method 400 can return to block 404.

If the press shaft assembly 308 has been extended to the final position, the method 400 can continue to block 410 and extend the press shaft assembly 308 at a second speed, which can be slower than the first speed. The second speed can be less than or equal to about: 0.75, 1, 1.25, 1.5, 1.75, 2, or more inches per minute or any value between any of the foregoing values. The method 400 can then continue to decision state 412 and the juicing device 100 can determine if the force applied by the press shaft assembly 308 has reached the limit as described in reference to decision state 406. In some embodiments, the limit can be different at decision state 412 compared to decision state 406. If the force limit has been reached, the method 400 can continue to block 422.

If the force limit has not been reached, the method 400 can continue to decision state 414 and the juicing device 100 can determine if the press shaft assembly 308 has extended to a second position. The second position can correspond to less than or equal to about: 1.5, 1.6, 1.7, 1.8, 1.9, 2.0, 2.1, 2.2, 2.3, 2.4, or more inches from the fully retracted position or any value between any of the foregoing values. If the press shaft assembly 308 has not been extended to the second position, the method 400 can return to block 410.

If the press shaft assembly 308 has extended to the second position, the method 400 can continue to block 416, wherein the juicing device 100 can extend the press shaft assembly 308 at an nth speed.

The steps described in reference to block 404, decision state 406, and decision state 408 can be a first stage of a press cycle, and the steps described in reference to block 410, decision state 412, and decision state 414 can be a second stage of the press cycle. The press cycle can include multiple more stages, which can include, for example, a total of four stages. For example, the method 400 can include a third stage (e.g., wherein the press shaft assembly 308 can be advanced at less than about: 0.375, 0.5, 0.625, 0.75, 0.875, or more inches per minute) and a subsequent fourth stage.

The method 400 can proceed to the decision state 418 so that the juicing device 100 can determine if the force applied by the press shaft assembly 308 has reached a limit and, if it has, proceed to block 422.

If the force hasn't reached the limit, the method 400 proceed to decision state 420 and the juicing device 100 can determine if the press shaft assembly 308 has extended to a third position. The third position can correspond to less than or equal to about: 3, 3.125, 3.25, 3.375, or more inches from the fully retracted position or any value between any of the foregoing values.

The method 400 can include a fourth stage of the press cycle wherein the press shaft assembly 308 can be advanced at less than or equal to about: 0.3, 0.3125, 0.325, 0.3375, or more inches per minute. The method 400 can proceed to decision state 418 so that the juicing device 100 can determine if the force applied by the press shaft assembly 308 has reached a limit and, if it has proceed to block 422.

If the force hasn't reached the limit, the method 400 can proceed to decision state 420 and the juicing device 100 can determine if the press shaft assembly 308 has extended to a fourth position, which can be the final position. The fourth position can correspond to less than or equal to about: 3.3, 3.4, 3.5, 3.6, or more inches from the fully retracted position or any value between any of the foregoing values. In various embodiments, blocks 416, 418, and 420 can be repeated n times (e.g., where n corresponds to the number of stages of the press cycle).

If the fourth (or nth) or final position has been reached, the method 400 can proceed to block 432, in which the method 400 can terminate.

O. Method of Executing Rapid Press Cycle—FIG. 17

Figure 17:
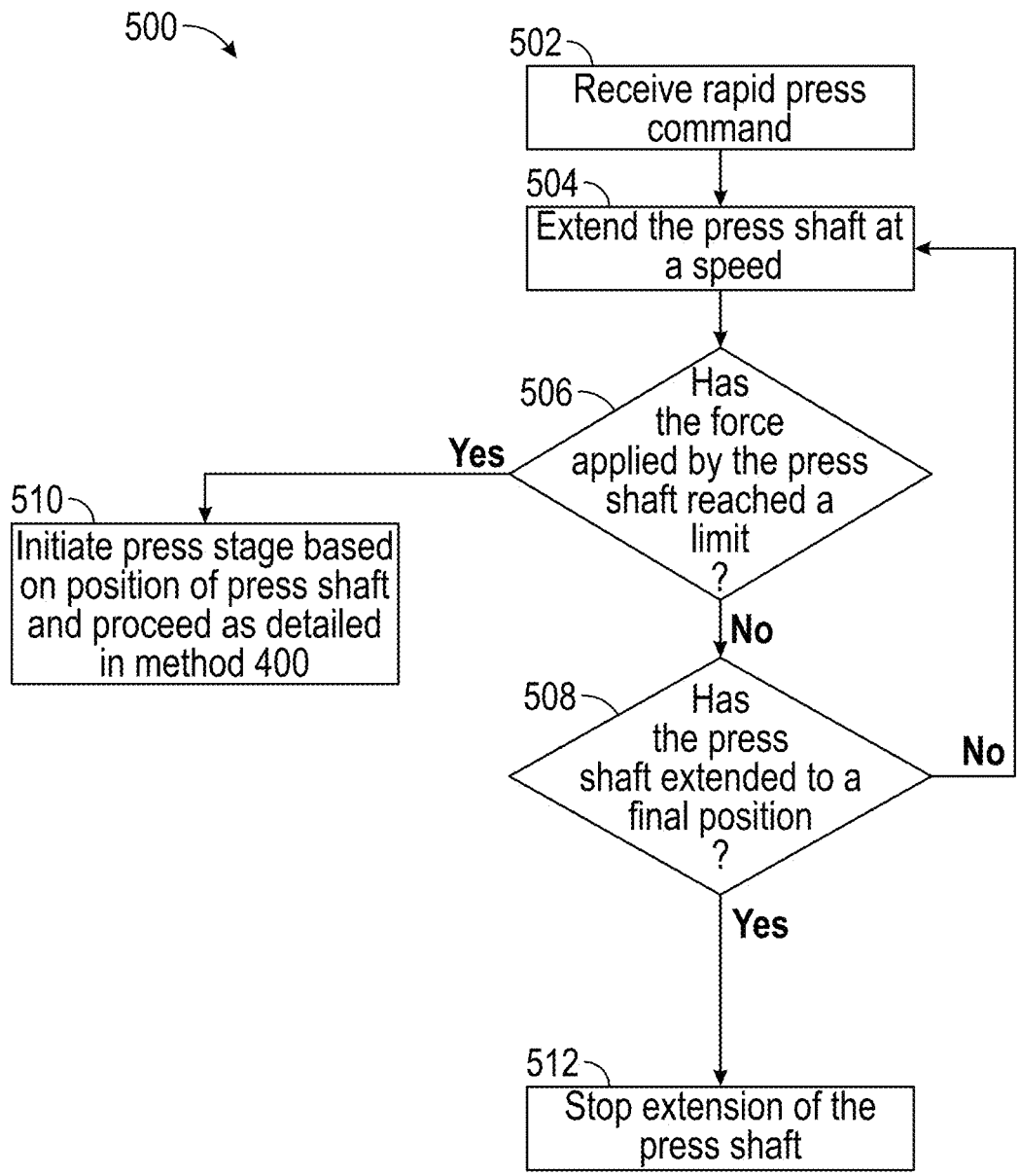
FIG. 17 illustrates a method of executing a rapid press cycle of the juicing device.

FIG. 17 illustrates a method 500 for executing a rapid press cycle with the juicing device 100. The method can be performed under the control of the electronic hardware 396. The flow diagram is provided for the purpose of facilitating description of aspects of some embodiments. The diagram does not attempt to illustrate all aspects of the disclosure and should not be considered limiting.

The method 500 begins at block 502, wherein the juicing device 100 receives a rapid press command from the user. As described herein, the user interface 130 can include a button or other feature through which the user can command the juicing device 100 to commence a rapid press cycle. In some embodiments, the button for rapid pressing can be held by the user to initiate and maintain a rapid press cycle. If the user releases the rapid press button, the rapid press cycle can cease.

The method 500 continues to block 504, wherein the juicing device 100 extends the press shaft assembly 308 at a first speed. The first speed can be less than or equal to about: 5, 6, 7, 8, 9, or more inches per minute or any value between any of the foregoing.

The method 500 can continue to decision state 506 and the juicing device 100 can determine if the force applied by the press shaft assembly 308 has reached a limit (e.g., a threshold). The limit can be less than or equal to about: 100, 200, 300, 400, 500, or more pounds. If the limit has been reached, the method 400 can continue to block 510 and the juicing device 100 can initiate the press stage based on the position of the press shaft assembly 308 as described in reference to method 400. For example, if the press shaft assembly 308 has not reached the first position, the juicing device 100 can start the first stage of the press cycle and extend the press shaft assembly 308 at the first speed. If, however, the press shaft assembly 308 has reached the first position but not the second, the juicing device 100 can start the second stage of the press cycle and extend the press shaft assembly 308 at the second speed.

In some embodiments, in decision state 506, if the juicing device 100 determines that the force applied by the press shaft assembly 308 has reached a limit, the method 500 includes decreasing the speed of the press shaft assembly 308. For example, in response to the force having reached the limit, the press speed is reduced from the first speed to a second speed. In various embodiments, as a percentage of the first speed, the second speed is less than or equal to about: 10%, 25%, 50%, 75%, or other percentages.

If the force applied by the press shaft assembly 308 has not reached the limit, the method 500 can proceed to decision state 508 and the juicing device 100 can determine if the press shaft assembly 308 has extended to a final position (e.g., a full stroke of the press shaft assembly 308).

If the press shaft assembly 308 has not extended to the final position, the method 500 can return to block 504. If the press shaft assembly 308 has extended to the final position, the block 504 can proceed to block 512 and stop extensions of the press shaft assembly 308.

P. Method of Controlling Press Cycle with Overflow Sensor—FIG. 18

Figure 18:
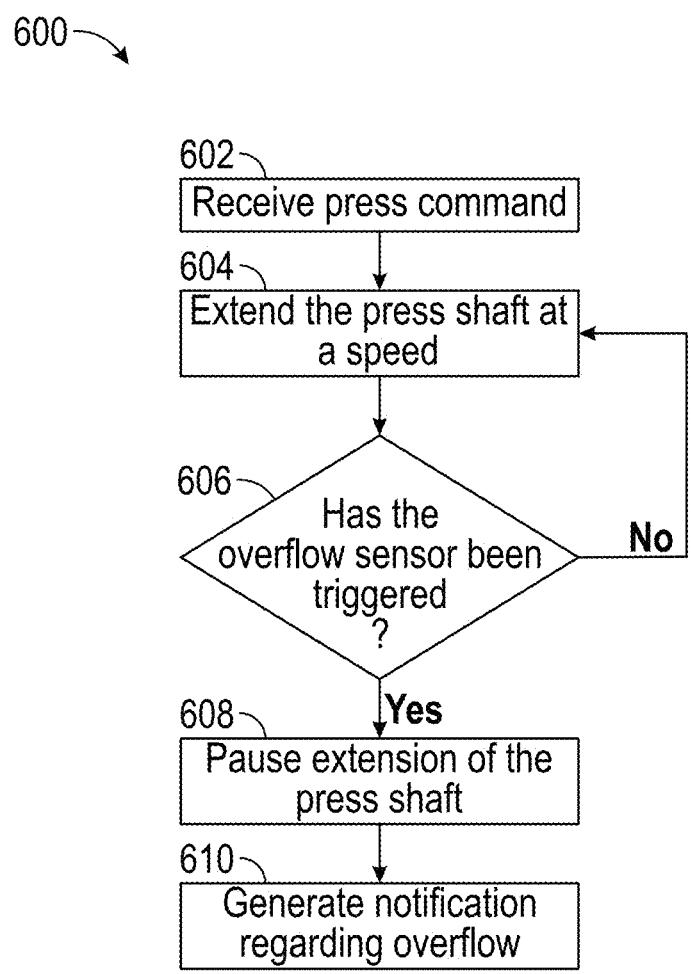
FIG. 18 illustrates a method of controlling a press cycle with input from an overflow sensor.

FIG. 18 illustrates a method 600 for controlling a press cycle with an overflow sensor of the juicing device 100. The method can be performed under the control of the electronic hardware 396. The flow diagram is provided for the purpose of facilitating description of aspects of some embodiments. The diagram does not attempt to illustrate all aspects of the disclosure and should not be considered limiting.

The method 600 can begin at block 602, which can be the same as block 402. The method 600 can proceed to block 604, which can be the same as block 404. The method 600 can proceed to decision state 606 and determine if the sensor for the overflow guard 128 has been triggered. As described herein, the overflow guard 128 can detect if ground food material in the interior 136 of the press chamber assembly 112 is overflowing (e.g., flowing out the top of the press chamber 114). The overflow guard 128 can be positioned over an opening into the interior 136 of the press chamber assembly 112. The overflow guard 128 can be rotatably coupled to the hopper 106, such as the support stand 132 of the hopper 106, so that overflowing food material pushes up against the overflow guard 128 to cause the overflow guard 128 to rotate up. The upward rotation of the overflow guard 128 can be detected by an electronic sensor, such as a magnetic switch, to signal to the juicing device 100 that the press chamber 114 is overflowing. For example, the overflow guard 128 can include a magnet 190. With the overflow guard 128 rotated downward, the magnet 190 can be disposed proximate a balanced magnetic switch, which can be in the motor unit 104, to hold the switch closed to complete an electrical circuit. When the overflow guard 128 is rotated upward, the magnet 190 can be moved away from the balanced magnetic switch such that the magnet 190 does not hold the switch closed and the electrical circuit is not complete. The incomplete electrical circuit can indicate to the juicing device 100 that an overflow is occurring. If the sensor of the overflow guard 128 has not been triggered, the method 500 can return to block 604.

If the sensor of the overflow guard 128 has been triggered, the method 500 can proceed to block 608 and reduce the speed or pause the extension of the press shaft assembly 308. The method 500 can then proceed to block 610 and the juicing device 100 can activate a response action. The response action can include, for example, generating an audible or visual alert for the user, generating a notification (such as on the user input device 130 or by sending a wireless communication, such as to a user's phone).

In some embodiments, the method 500 includes automatically retracting the press shaft assembly 308. This can increase the space in the press chamber and allow at least some of the overflowed material to flow back into the press chamber. In some variants, the press shaft assembly 308 is retracted until the sensor of the overflow guard 128 is no longer triggered.

Q. Method of Detecting a Bag Rupture and Notifying a User—FIG. 19

Figure 19:
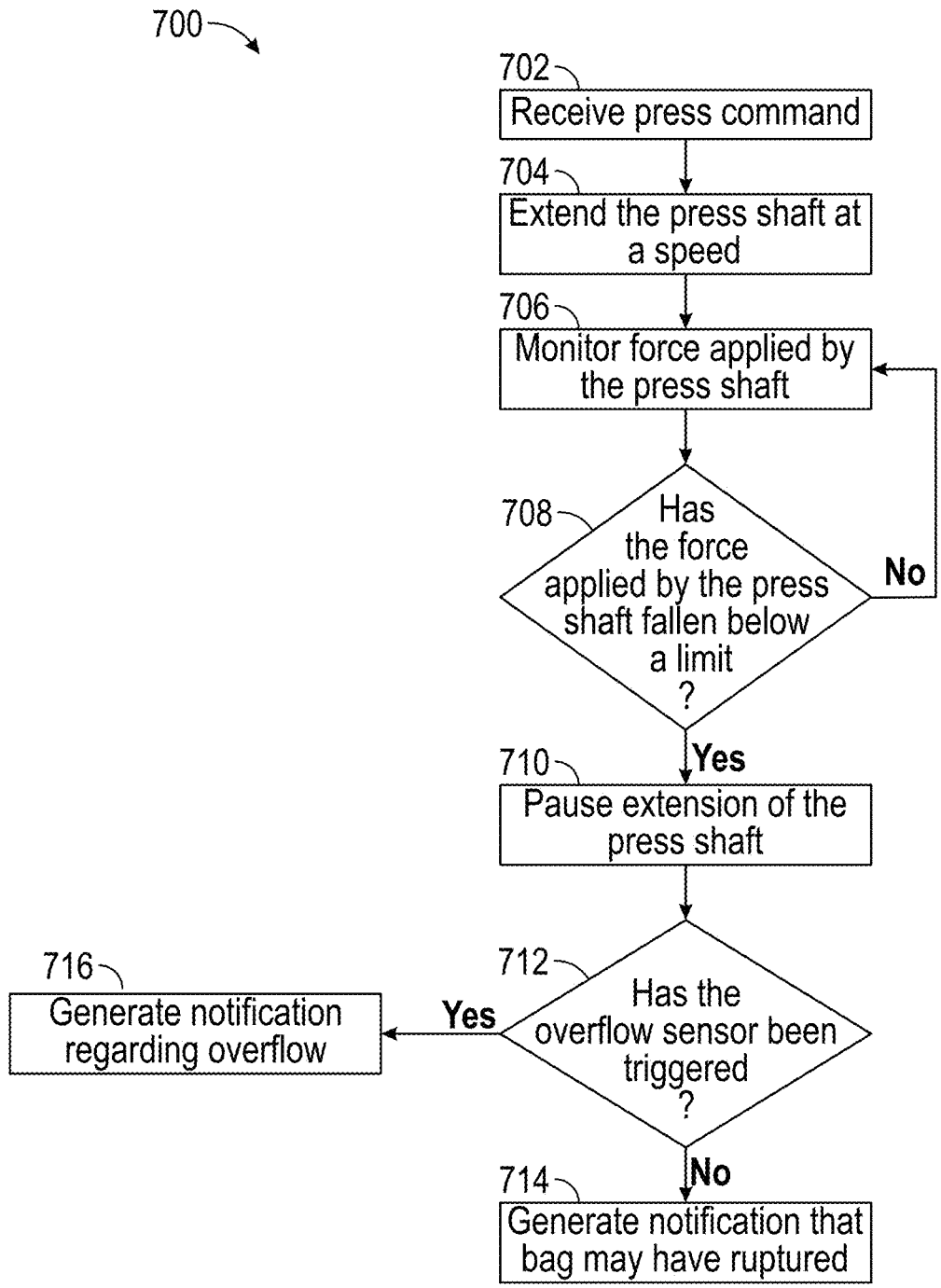
FIG. 19 illustrates a method of detecting a bag rupture and notifying a user.

FIG. 19 illustrates a method 700 for detecting a bag rupture and notifying a user. The method can be performed under the control of the electronic hardware 396 of the juicing device 100. The flow diagram is provided for the purpose of facilitating description of aspects of some embodiments. The diagram does not attempt to illustrate all aspects of the disclosure and should not be considered limiting.

As previously discussed, the juicing device 100 can monitor the force applied during a pressing operation. A curve of force vs. time can be produced from this data. The force during a press cycle should generally increase during pressing. The curve should be generally continuous and not include discontinuities (e.g., sudden spikes or drops in force). A sudden decrease in force during pressing can be indicative of a disposable filter bag rupturing during the press cycle, which the user would want to know to avoid ingesting particulates such as insoluble fiber.

The method 700 can begin at block 702, which can be the same as block 402. The method 700 can proceed to block 704, which can be the same as block 404. The method 700 can proceed to monitor the force applied by the press shaft assembly 308 as detailed herein. The method 700 can proceed to decision state 708 and the juicing device 100 can determine if the force applied by the press shaft assembly 308 has fallen below a limit (e.g., a threshold). The limit can be a percentage drop off of the force applied by the press shaft assembly 308, such as less than or equal to about: 5%, 10%, 15%, 20%, 30%, 50%, or more or any value between any of the foregoing values. If the force applied by the press shaft assembly 308 has not fallen below the limit, the method 500 can return to block 706.

If the force applied by the press shaft assembly 308 has fallen below the limit, the method 500 can proceed to block 710 and the juicing device 100 can reduce the speed or pause extension of the press shaft assembly 308. For example, if the force applied by the press shaft assembly 308 is 1000 pounds and the limit is a 10% drop, the force falling to 900 pounds would cause the method 500 to proceed to decision state 712. In certain implementations, to proceed to decision state 712, the force is required to remain at or below the limit for a minimum period of time, such as at least three seconds, which can reduce or avoid false indications. In some embodiments, the juicing device 100 can detect a bag rupture by detecting a force drop below a limit and then a quick force recovery (e.g., returning to a force above the limit), which can include a force recovering within a time period.

At decision state 712, the juicing device 100 can optionally determine if the sensor of the overflow guard 128 has been triggered, which can indicate that the force drop was caused by an overflow as opposed to a bag rupture. If the sensor of the overflow guard 128 has been triggered, the method 700 can proceed to block 716 and the juicing device 100 can generate a notification, which can be audible and/or visual, regarding the overflow. If the sensor of the overflow guard 128 has not been triggered, the method 700 can continue to block 714 wherein the juicing device 100 can generate a notification, which can be audible and/or visual, regarding the bag rupture. Remedial action can then be performed, such as stopping or retracting the press shaft assembly 308.

R. Graphical User Interface—FIG. 20

Figure 20:
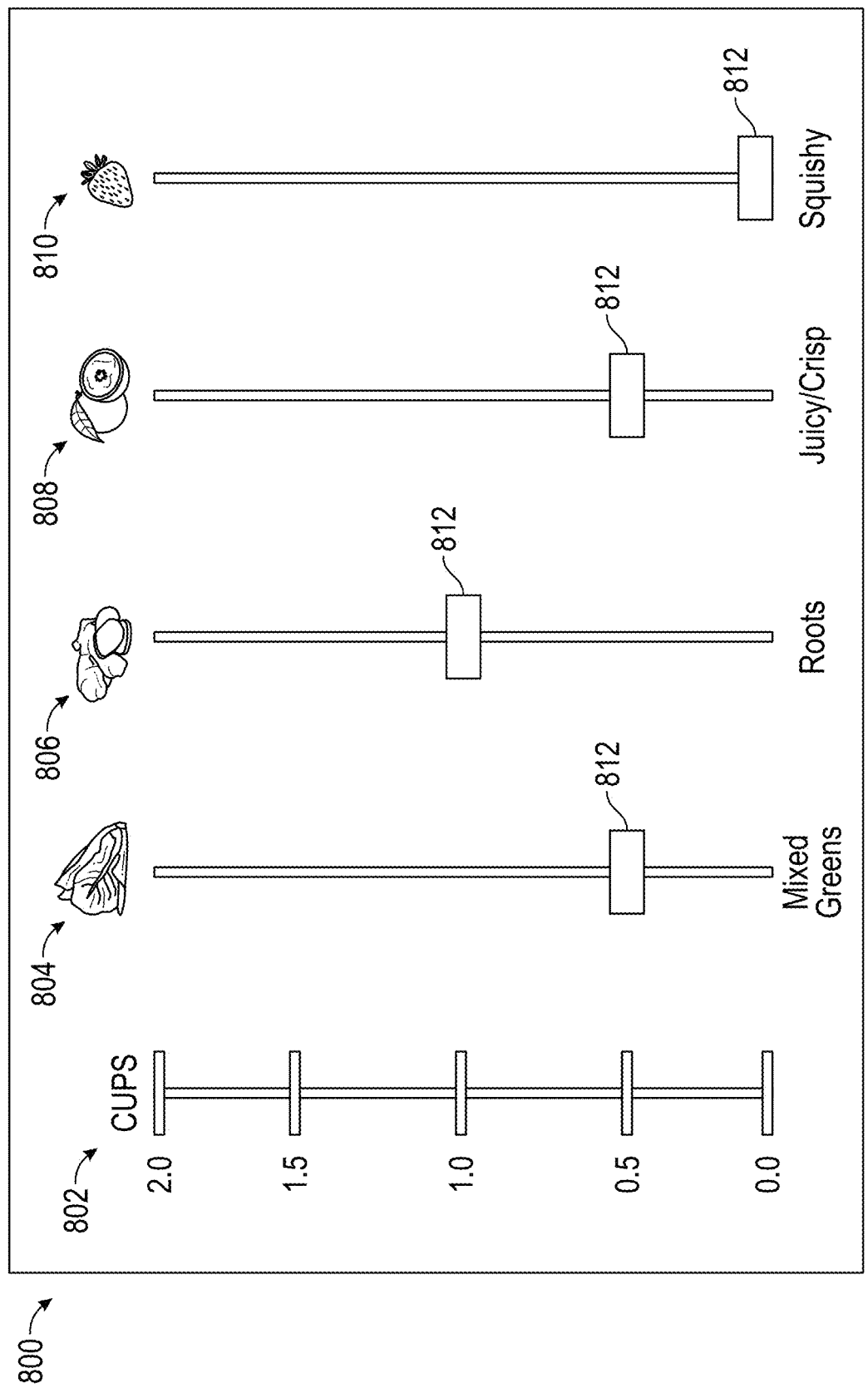
FIG. 20 illustrates a graphical user interface.

FIG. 20 illustrates a graphical user interface 800 that can be used with the juicing device 100. For example, the user interface 130 can include a touchscreen that can display the graphical user interface 800. The graphical user interface 800 can be controlled by the electronic hardware 396.

The graphical user interface 800 can enable the user to communicate to the juicing device 100 the quantity and type of food material to be juiced. For example, the graphical user interface 800 can include a quantity axis 802 indicating an amount (e.g., cups) of food material to be processed. The graphical user interface 800 can include several inputs for different types of food material to be processed, which can at least include a mixed green input 804, roots input 806, juicy/crisp input 808, and/or squishy input 810. Each of the foregoing inputs can include an indicator 812 that can be moved (e.g., slid) along an axis of the input to indicate the quantity of that type of food material to be processed. For example, as shown, the indicator 812 for the mixed green input 804 has been moved to 0.5 cups, the indicator 812 for the roots input 806 has been moved to 1.0 cups, the indicator 812 for the juicy/crisp input 808 has been moved to 0.5 cups, and the indicator 812 for the squishy input 810 has been moved to and/or remained at 0.0 cups.

The juicing device 100 can control aspects of the grind cycle and/or press cycle based on the inputted quantity and type of the food material to be processed. For the grind cycle, the juicing device 100 can drive the motor unit 104 of the grinder assembly 102 at a faster speed, slower speed, longer duration, slower duration, etc. based on the inputted quantity and type of the food material to be processed. For the press cycle, the juicing device 100 can adjust the speed of advancement of the press shaft assembly 308 based on the inputted quantity and type of the food material to be processed. For example, a total press time from fully open to fully pressed for: 90 seconds for 2 cups of a food material of 100% carrots, 120 seconds for 2 cups of a blend containing 30% pineapple and 70% carrots, etc. Some items, such as ground almonds, benefit from a long press cycle of 10 minutes or more. Some foods, such as Greek style yogurt, can benefit from a slow approach to full press of 10 minutes, a comparatively lower final pressure, and a comparatively long holding time of 30 minutes. On the other hand, carrots can be pressed with a 30 second approach time to full press, a 60 or 90 second pressure hold time, and a total pressure of 50 pounds per square inch or more.

The juicing device 100, in response to the user inputs, can operate with optimized and/or preferred speeds, pressures, and pressing times to effectively remove liquid and/or extract juice. In some embodiments, the juicing device 100 can be controlled with at least two user inputs, such as one for maximum pressure and one for total press time. In some embodiments, the user can control the juicing device 100 by setting various speed and pressure set points through the press cycle (e.g., by time, by rod extension length, by instantaneous press force, by total applied press force during a pressing operation, etc.).

S. Certain Terminology

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Terms of orientation used herein, such as "top," "bottom," "longitudinal," "lateral," and "end" are used in the context of the illustrated embodiment. However, the present disclosure should not be limited to the illustrated orientation. Indeed, other orientations are possible and are within the scope of this disclosure. The term "vertical" refers to a direction that is parallel to the direction of the Earth's gravity and the term "horizontal" refers to a direction that is perpendicular to the direction of the Earth's gravity. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

The terms "approximately," "about," and "substantially" as used herein represent an amount close to the stated amount that still performs a desired function or achieves a desired result. For example, in some embodiments, as the context may permit, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may permit, the term "generally parallel" can refer to something that departs from exactly parallel by less than or equal to 20 degrees and the term "generally perpendicular" can refer to something that departs from exactly perpendicular by less than or equal to 20 degrees.

T. Summary

Although the juicing devices, systems, and methods have been disclosed in the context of certain embodiments and examples, the scope of this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of the juicer. The scope of this disclosure should not be limited by the particular disclosed embodiments described herein.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations. The described components and systems can generally be integrated together in a single product or packaged into multiple products. Additionally, other implementations are within the scope of this disclosure.

Some embodiments have been described in connection with the accompanying drawings. The figures are drawn to scale where appropriate, but such scale should not be interpreted as limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

In summary, various embodiments and examples of juicing devices, systems, and methods have been disclosed. This disclosure expressly contemplates that various features and aspects of the disclosed embodiments can be combined with, or substituted for, one another. Accordingly, the scope of this disclosure should not be limited by the particular disclosed embodiments and examples described above, but should be determined only by a fair reading of the claims that follow.

The following is claimed:

1. A juicer machine comprising:
   housing containing a support;
   a press chamber removably coupled to the housing, the press chamber configured to receive a ground food, the press chamber comprising a movable platen and a fixed wall;
   a lead screw assembly fixedly connected with the support and engageable with the movable platen;
   an electric motor configured to drive the lead screw assembly such that the lead screw assembly applies a pressing force to the movable platen and such that a resulting force is transmitted through the lead screw assembly to the support;
   an electronic sensor connected to the support, the electronic sensor configured to detect a deflection of the support due to the resulting force and to output a signal indicative of the deflection; and
   an electronic processor configured to control the lead screw assembly using the signal.

2. The juicer machine of claim 1, wherein the support comprises a plate.

3. The juicer machine of claim 1, wherein the electronic sensor comprises a strain gauge.

4. The juicer machine of claim 1, wherein the lead screw assembly is fixedly connected with the support by a castle nut.

* * * * *